United States Patent
McZeal, Jr.

(10) Patent No.: US 6,763,226 B1
(45) Date of Patent: Jul. 13, 2004

(54) MULTIFUNCTIONAL WORLD WIDE WALKIE TALKIE, A TRI-FREQUENCY CELLULAR-SATELLITE WIRELESS INSTANT MESSENGER COMPUTER AND NETWORK FOR ESTABLISHING GLOBAL WIRELESS VOLP QUALITY OF SERVICE (QOS) COMMUNICATIONS, UNIFIED MESSAGING, AND VIDEO CONFERENCING VIA THE INTERNET

(75) Inventor: Alfred McZeal, Jr., Houston, TX (US)

(73) Assignee: Computer Science Central, Inc., Lafayette, LA (US)

( * ) Notice: Subject to any disclaimer, the term of this patent is extended or adjusted under 35 U.S.C. 154(b) by 0 days.

(21) Appl. No.: 10/210,480

(22) Filed: Jul. 31, 2002

(51) Int. Cl.$^7$ ................................................. H04B 1/38
(52) U.S. Cl. ................ 455/90.2; 455/550.1; 455/575.1; 370/354
(58) Field of Search .............................. 455/66.1, 90.2, 455/550.1, 575.1; 370/354, 395.32

(56) References Cited

U.S. PATENT DOCUMENTS

| | | | |
|---|---|---|---|
| 5,812,951 A | 9/1998 | Ganesan et al. | |
| 6,097,804 A | 8/2000 | Gilbert et al. | |
| 6,128,304 A | 10/2000 | Gardell et al. | |
| 6,141,341 A | 10/2000 | Jones et al. | |
| 6,240,449 B1 | 5/2001 | Nadeau | |
| 6,366,622 B1 | 4/2002 | Brown et al. | |
| 2002/0015391 A1 | 2/2002 | Kriaras et al. | |
| 2002/0072395 A1 * | 6/2002 | Miramontes | ................ 455/566 |

OTHER PUBLICATIONS

Nokia, Fastmobile, Walkie Talkie, Instant messaging, picture/video, email, fastmobile .com.*
Motorola Inc. "Motorola V Series 60G for Cingular Wireless" webpage data,, p. 1, 2 United States of America.
Satcom Systems, Inc. "Motorola 9500 Portable Telephone" webpage data, p. 1, United States Of America.
Sony Ericsson: "Specifications for the T68" Webpage data, p. 1, United States of America.
Nokia Inc, "Nokia 6310,", "Mobile Streaming" "Technologies" "Wireless Access Protocol" "Bluetooth" and "Java" webpage data, p. 1, 2 United States Of America.
Intel ; "Mobile Intel Pentium 4 Processor—M", webpage data, p. 1, 2, United States Of America.
NET2PHONE, "OEM Opportunities" and "Partnership". webpage data, p. 1, 2 United States Of America.
Dialpad Communications, Inc "Overview" webpage data, p. 1, United States Of America.

(List continued on next page.)

*Primary Examiner*—Lee Nguyen

(57) ABSTRACT

World-Wide-Walkie-Talkie, a high speed multifunction interstellar wireless computer/instant messenger communicator, Personal Digital Assistant (PDA), coupled with a resilient, robust, VoIP data network and internet server method, deploying multiple wireless networks and protocols such as Voice Over IP, GPRS, WAP, Bluetooth, PCS, I-Mode, comprising a high speed Intel Pentium 4 Mobile™ or compatible Processor, to formulate a internet gateway system (99) and network bridge (150) for establishing instant low cost, real time global communications to the Public Switched Telephone Network via the internet (54). A PUSH-TO-TALK-WORLDWIDE button (21) instantly initiates global bisynchronous communications, or videoconferencing sessions. Fax, VideoMail, and unified messaging services are immediately available. GPS and mass memory provides global navigational tracking and data storage. Internet users, telephones, and cellular/satellite phone users can intercommunicate with the invention via VoIP/IM services. The invention provides uniformed global wireless communications, eliminates traditional long distance costs, and operates anywhere on earth.

12 Claims, 42 Drawing Sheets

OTHER PUBLICATIONS

Cisco Systems. "Cisco AVVID Network Infrastructure—Cisco Systems" webpage data, p. 1.

Motorola's V60G GSM World Phone Internet URL: http://home.cnet.com/wireless/0-1923403-8-7691533-1.html.

Iridum Motorola 9500 Satellite Phone Internet URL:http://www.infosat.com/services/iridium/index.html.

Nokia 6310 World Phone Internet URL: http://www.nokia-.com/phones/6310/.

Ericsson T68 GSM World Phone Internet URL: http://www.1800mobiles.com/newert68worg.html.

Mobile Intel ® Pentium ® Processor Internet URL: http://www.intel.com/home/mobile/pentium4-m/.

Net2Phone (tm) Internet Url Address: http://www.net2phone.com.

Dialpad (tm) Internet Url Address: dialpad.com.

Cisco Network Architecture for Voice, Video and Integrated Data Internet URL: http://www.cisco.com/warp/public/779/largeent/avvid_sol/cani.html.

* cited by examiner

Fig. 10 - Microchip Logic Design

Fig. 20 - Personal Digital Assistant

Fig. 21   BlueTooth Wireless Link
PC Wireless Upload/HotSync Program

Fig. 25 - New User Registration Program

Fig. 26 - UNIT ACTIVATION

Fig. 30 - Send Voice Mail Program

Fig. 31 - Send Video Mail Program

Fig. 32 - Record Memo Program

Fig. 33 - Send-Rec Fax Program

Fig. 34 - Send EMAIL Program

Fig. 35 - Talk-Internet Program

Fig. 36 - INSTANT MESSENGER

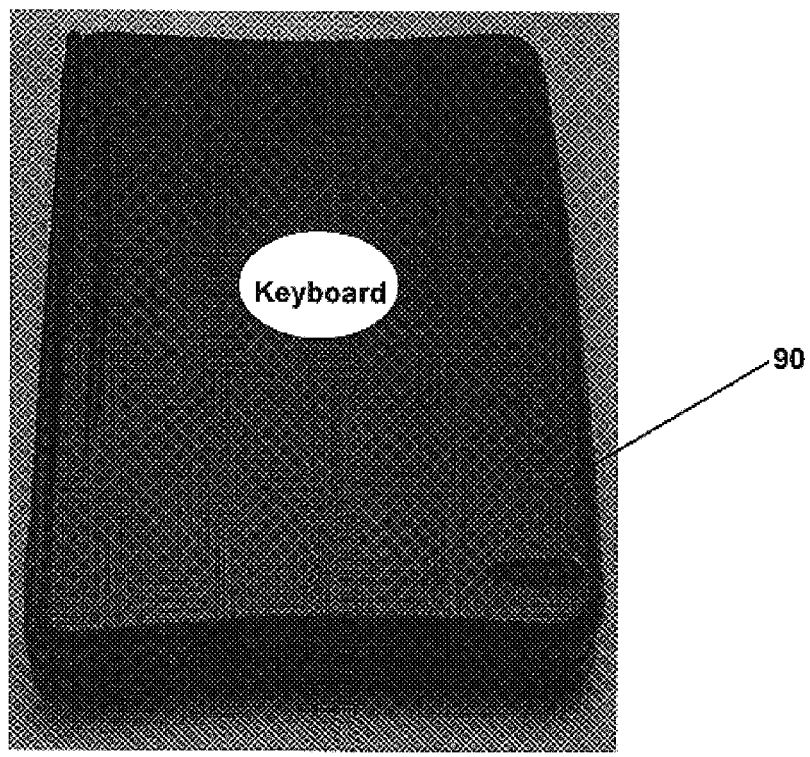
Fig. 39 - Fully Folded Portable Keyboard

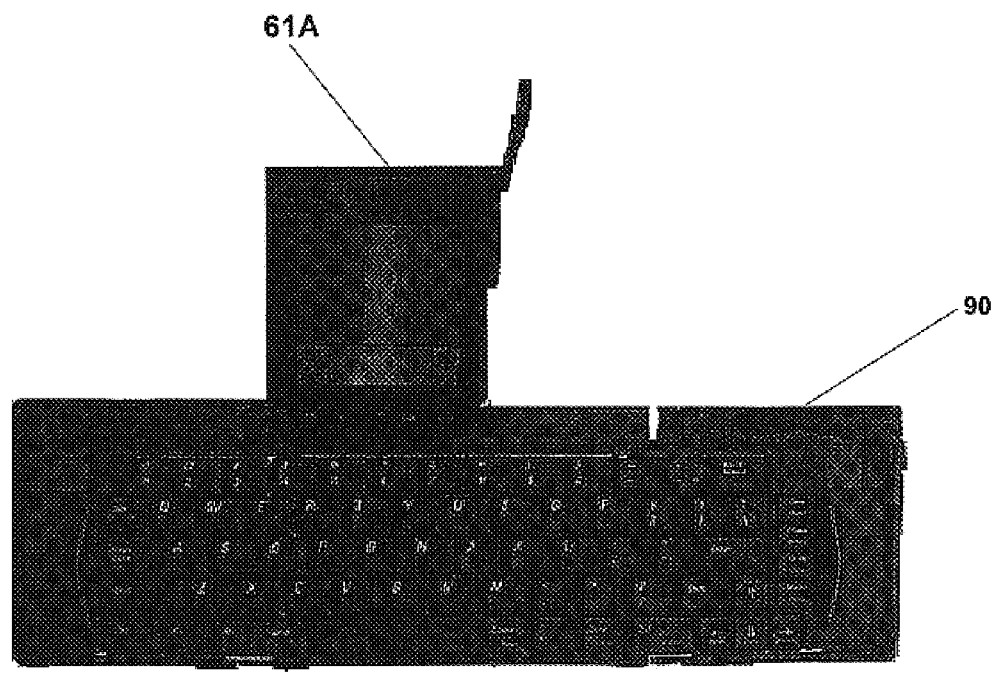
Fig. 39A - Wireless Device Mounted On Portable Keyboard

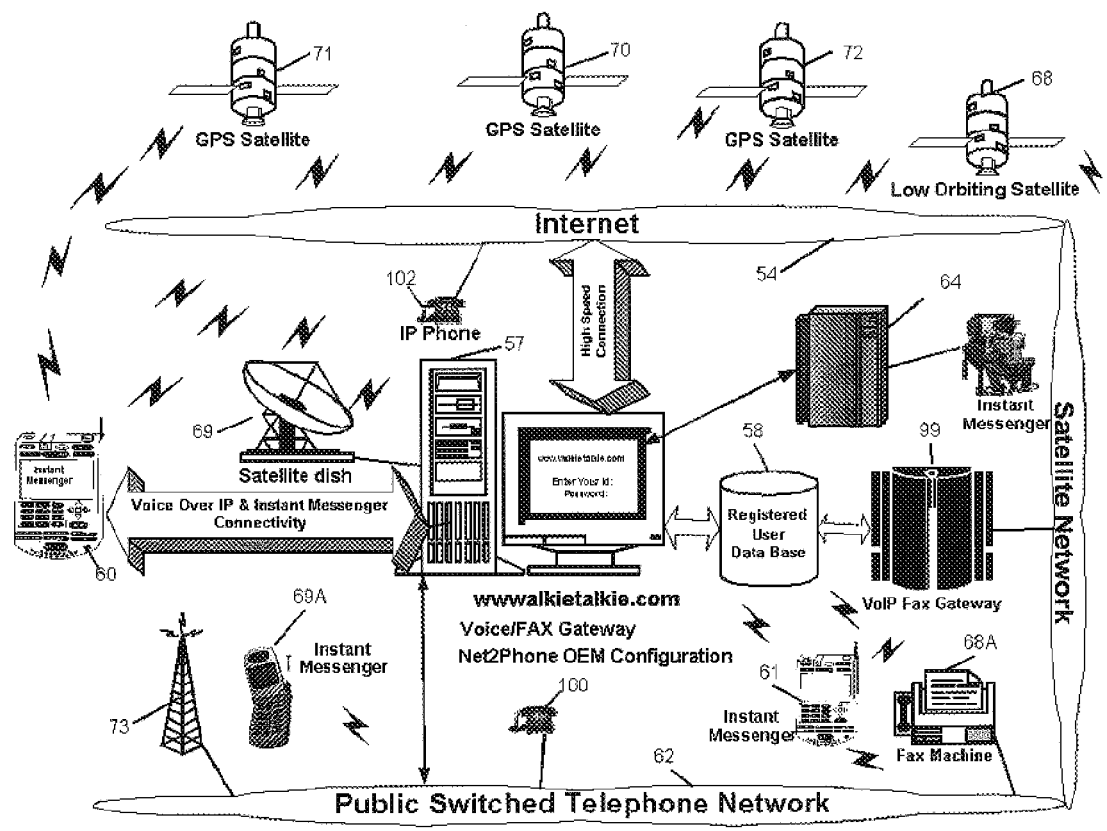
Fig. 40 - Overview Of The Invention

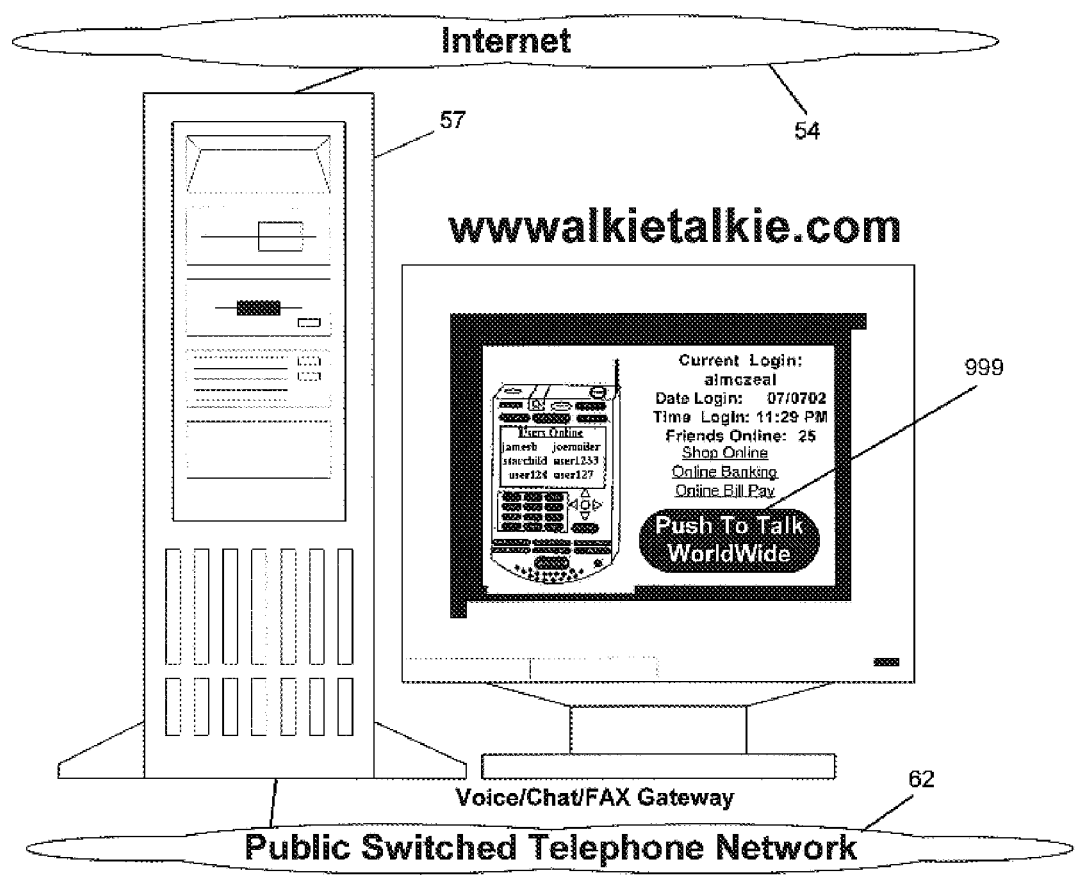
Fig. 41 - Virtual World-Wide-Walkie-Talkie Server Program

MULTIFUNCTIONAL WORLD WIDE WALKIE TALKIE, A TRI-FREQUENCY CELLULAR-SATELLITE WIRELESS INSTANT MESSENGER COMPUTER AND NETWORK FOR ESTABLISHING GLOBAL WIRELESS VOLP QUALITY OF SERVICE (QOS) COMMUNICATIONS, UNIFIED MESSAGING, AND VIDEO CONFERENCING VIA THE INTERNET

CROSS REFERENCES TO RELATED APPLICATIONS

Not Applicable.

STATEMENT REGARDING FEDERALLY SPONSORED RESEARCH OR DEVELOPMENT

Not Applicable

REFERENCE TO SEQUENCE LISTING A TABLE, OR COMPUTER PROGRAM LISTING APPENDIX

A brief description and sequence listing of computer programs have been included and are part of the drawings and made a part of the specification herein. The computer programs are represented as flowcharts. This listing of is not meant to be all-inclusive as the invention allows for the design of an unlimited amount of computer programs that can be run as java™ or other computer applications on the computing platform of the invention.

BACKGROUND OF THE INVENTION

1. Technical Field
2. Field of The Invention

The "World-Wide-Walkie-Talkie" invention disclosed herein relates to the field of computer science and telecommunications. It is specifically founded upon wireless computer technology, satellite communications, and digital cellular communications and is directly related to local/wide area networks and internet protocol (IP) telephony communications. This invention presents a multi-functional, high speed, hand held wireless communicator and computing device capable of automatically connecting to any data network such as the internet.

A specialized high speed device, resilient network, and internet based web server are presented which provides voice and text based INSTANT MESSENGER communications services, and enhanced Quality of Service (QOS) over a wireless network utilizing Voice Over Internet Protocol technology.

Group Packet Radio Service Protocol (GPRS), Wireless Access Protocol (WAP), Bluetooth specification, Global System for Mobile Communications (GSM), Internet communications, Japan's I-mode service, and a variety of other wireless communications protocols are deployed in the invention which provide communications between the internet and the public switched telephone network. The resulting invention and network connects users of the internet to users of wireless networks, the Public Switch Telephone Network and can be used worldwide on any continent and from anywhere in the world.

The wireless device and high speed network presented provides a robust and enhanced architecture for delivering real time voice, video, fax, and integrated data intercommunications to internet users and customers of the Public Switched Telephone Network (PSTN) at more efficient and cost effective means.

Along with the INSTANT MESSENGER system, a high speed Mobile Intel® Pentium® 4 Processor chip, and other enhanced network communications is also used in order to over come many of the communication problems with Quality Of Service (QoS) such as delay, accumulation delay, echo, processing delay, and network delay problems, associated with Voice Over Internet Protocol applications.

Enhanced Voice & Video Quality & Open Standards

The invention is unusual in that it surpasses normal cellular and satellite telephone technology by providing enhanced internet voice, video quality, open standards, and network methods which set a precedent for "a world-wide standard" for wireless intercommunication using the internet, wireless telephone networks, and the Public Switched Telephone Network. The invention comprised of both the wireless device and high speed resilient, robust network system, and wireless telephone networks, delivers an Internet ecosystem which thrives on opens standards, and encourages the development and interoperability of multi-vendor, multi-product solutions that are generally accepted by both the telephone and computing industry.

The high powered wireless invention provides customers with instant and convenient "push button" program functionality providing efficient unified messaging. The transmission of voice, data, and video communications in real-time or offline communications via the internet, to the Public Switched Telephone Network (PSTN) and from anywhere in the world is accomplished.

The invention also deploys a special PUSH-TO-TALK-WORLDWIDE button which when depressed, initiates instant global communications between two or more devices connected to the internet a wireless network, or the public switched telephone network allowing the invention to instantly communicate with computer based internet users or any telephone, fax machine, or computer connected to the world wide telephone network.

The computer invention converts into a Personal Digital Assistant (PDA) and provides unlimited mobile applications, and telecommunications on a world-wide basis and also deploys a self-charging solar battery system, and other standard power systems to keep the system up and running when needed.

The invention adopts all the interfacing standards adopted by the telecommunication industry such as Telephony Applications Programmable Interface (TAPI) and the Java Telephony Application Programmable Interface (JTAPI).

The elimination and need for costly PBX systems is possible by deploying a high speed microprocessor enhanced high speed Voice Over Internet Protocol network. The Private Branch Exchange (PBX) system can now be completely eliminated and replaced with efficient wireless IP telephony that is able to provide call-control functionality over a converged data network. When used in conjunction with IP telephone sets or software telephone applications will also provide services which exceed that of a normal PBX system and will continue to provide PBX functionality in a distributed and scalable fashion.

A super speed Mobile Intel® Pentium® Processor, or compatible processor, is introduced to the design in conjunction with an operating system, real time Java™ virtual environment, and provides for new and innovative applications such as unified messaging including instant fax, voice mail, video email, video conferencing, and email applications that can be launched at the press of a button.

The invention provides for end-to-end IP wireless telephony that provide a high quality-of-service (QoS) and enabled IP infrastructure that can be used worldwide on any data network including the internet. The invention integrates both cellular and satellite telephone technology with highly optimized data networks such as Net2phone networks, and Cisco™ AVVID (Architecture for Voice and Integrated Data system). The system embraces the concept of a local or wide area network in order for customers to instantly contact each other at minimal cost, from anywhere in the world, and without the high cost normally associated in long distance or international communications.

Advanced instant messaging and communications software system automatically connects to the internet at high speeds, and stays connected allowing customers to "stay online" in order to be in contact with the network and each other twenty four hours a day.

Customers and users of the system can make instant wireless contact initiate video conferences, chat sessions, and voice chat sessions with other internet users such as Yahoo™, America Online™ and other internet users. This feature adds a powerful functionality, and features not obvious in the prior art.

The powerful use of global positioning satellite (GPS) technology, internet technology, and the ability to communicate directly or indirectly with low orbiting satellites, and other satellites puts the invention in a totally separate class from the normal cellular or satellite telephones generally offered by the telephony or computing industry.

The nature and technical field of this invention provides for unlimited mobile computing power and computer applications with the implementation of the Java™ based environment and a Personal Digital Assistant that deploys either of two of the most widely used handheld operating systems: the Palm VII™ or the Windows Pocket PC 2002 operating systems™.

Finally, full access and interconnectivity can still be maintained to a wireless network, and the Public Switched Telephone Network allowing users with normal telephones, cellular telephones, satellite telephones, computers or other compatible devices to intercommunicate with the invention and customers of the wireless World-Wide-Walkie-Talkie data network. The invention in essence provides a world wide wireless telecommunications system, that can be used from anywhere in the world without network compatibility problems.

Description of Prior Art

Prior to this invention, there are some network methods and inventions as described below, which uses Voice Over Internet Protocol (VoIP) and network access technology. However many of these inventions fail to address critical issues associated with voice quality or quality of service related to the methods presented in those inventions. Many of these inventions accomplish only a limited purpose and scope. For example, a most common general purpose is to provide communications between the internet and the public switch telephone network. Some are presented only on a conceptual and non-practical basis but in reality do not take into consideration the actual working effect and application that the invention would have when actually implemented in the real world.

Also as stated, many of these inventions and methods provide a means of communications between the public switch telephone network and the internet, but fail to address critical issues which affect performance when using Voice Over Internet Protocol technology. For example, problems such as delay, algorithmic delay, processing delays, network delays, jitter, lost packet compensation are all problems that cause degradation or loss of voice quality when using VoIP implementations. Moreover, these inventions fail to provide an adequate solution for a wireless world wide device and network that customers can readily use for everyday practical use. Some of these inventions are discussed below.

Current Cellular World Phones & Telephone Technology

There are many digital cellular telephone inventions on the market which use GSM communications and which also take a limited advantage of the internet. The limited inventions provide services to digital cellular networks or satellite networks using GSM technology. However, there is presently not a device which takes full advantage of the internet and instant messaging for voice quality purposes and which uses the idea of a computer data network for voice and other communications purposes. This is partially due to the problems associated with Voice Over Internet Protocol (VoIP) applications. Because of these problems associated with VoIP technology, (e.g. such as delay, echo, etc) manufacturers have generally pursued only wireless telephony devices that work over digital cellular networks, thus avoiding the problems that are inherent with voice over internet protocol technology. There are also other political and economic implications of using a purely voice over internet protocol network.

Additionally, the traditional Public Branch Exchange (PBX) system has evolved over many years to a device perceived as highly reliable. However the PBX performs basically one and only one function: which is the switching of voice calls. Some added services such as transfer and conference are also available. However a problem that exist for each specific vendor is that the vendor maintains proprietary architecture to ensure that once a customer is using a particular branch of switch, the customer will need to continue using that same brand of switch to maintain feature parity.

From a technical perspective, this is really an "old world" or old way, limited approach to telephony technology and for purposes of this specification can be termed as the "Old World—Box Reliability". This way can also be very expensive considering services, maintenance, and hardware systems used in a particular implementation. People including manager, executives of business, and every day users are always open to cost effective, less expensive, and more reliable means for distributed communications. This is not only fair, but the most intelligent expectation that any manager can hope to achieve, and of course, this affects the "bottom line" (profits) of the organizaton.

Network Availability—The Now World

The inherent power of computers, compilers, computer networks, general telecommunications, and IP networking makes this old world box reliability obsolete. Additionally, customers want more for the money, and customers are keenly aware that computer technology would in fact afford them the power and services that they desire with the use of computers and networking technology.

Due to the recent advances in computer technology and micro chip design, the "Old World—box reliability" will soon disappear in our society. This is largely due to high cost, and limitations placed on telephony equipment when a PBX system is used. It is no secret that much lower cost and higher efficiency systems may be attained with computers and IP networking technology which can be deployed over a data network at much lesser cost and equipment.

This can be termed as the "New World—Network Availability. As stated, this New World's—Network Availability is much more efficient, more cost effective and offers services that PBX systems could not hope to offer without resulting in unwarranted high cost and inefficient implementations.

In short, PBX systems simply cannot perform the functions of a high speed computer and software, and thus cannot compete with the processing power of a central processing unit. In fact, many if not all PBX system move towards a CPU based structure supporting the assertion that PBX system's will one day soon disappear.

In contrast to the above PBX Box reliability model (the old world) the new world of Network Availability and data networking presents a new picture and vision wherein availability is designed into a distributed system rather than a PBX. The "new world" of network availability of communications is more flexible and offers more technology for less. For example, Redundancy is available in the individual hardware components for services such as a power and supervisor modules. Network redundancy is, achieved with a combination of hardware, software, and intelligent network design practices. The Internet also extends network availability and communications on a worldwide basis.

It is very important to note that organizations and individuals around the world want to reduce rising telecommunications cost and many resort to increased Internet usage for communications. This is especially true for companies that have international operations and customers and have a need to communicate daily and on a frequent basis.

The consolidation of separate voice and data networks offers an opportunity for significant savings. The elimination of expensive unwarranted telephone PBX equipment also justifies alternative means of Internet Protocol (IP) communications.

Therefore, the challenge of integrating voice and data networks is quickly becoming a rising Priority for many network managers.

These organizations and individuals are pursuing high-tech solutions which enable them to "stay connected" and also enable them to take full advantage of excess capacity on broadband networks, and computing devices for Voice, data, and video transmission. They also want to utilize the Internet and company Intranets as alternatives to costlier mediums.

And of course the unauthorized charges or fraud charges which appear on telephone bills are forcing companies and individuals to look for other alternatives for effective communications. Many companies, manager, and even consumers are aware of fraudulent accounting practices when billing for telephone or long distance services and they venture to find methods to avoid this type of activity.

At present there is no high speed mobile computing handheld diverse computing device that has the equivalent power of a high speed desktop computer that would enable a customer to accomplish the same computing and communications tasks he/she could accomplish from the office or home computer or with a standard telephone and/or computer. Therefore, customers really need a solution to address their present tele-computing needs, and the invention presented herein addresses those needs.

The World-Wide-Walkie-Talkie invention uses an advanced microprocessor, hardware, software and other high speed resilient wireless robust, network methods and Voice over Internet Protocol (VoIP) to meet the challenges of combining legacy voice networks and packets networks. This is accomplished by allowing both voice, video, signaling information to be transported over a high speed resilient packet network and wireless device which is able to deliver the high Quality Service (QoS) and multimedia desired by individuals and companies. Multimedia and high speed computing services are generally unavailable to the Public Switched Telephone Network or normal telephone equipment, but available in the present invention. The invention has the capability of simultaneously connecting to both a wireless telephone network and a voice over internet protocol gateway server which provides normal wireless telephone services and wireless voice over internet protocol services.

Advances in cost effective computer technology, and advances in Voice Over Internet Protocol systems will enable companies and individuals to realize the high quality desired of a voice communications session.

Not only voice quality, but also other forms of communications such as video conferencing, fax messages sent via internet protocol and other communications are available with an advances of computer and network technology.

Accordingly a whole new world of wireless internet communications and opportunities for interfaces between the conventional telephone network and the internet opens up. Applications such as low cost wireless enhanced Quality of Service (QoS) voice, and instant messaging, and access to major computing networks (e.g. Yahoo™, America Online™, etc) and many other unlimited computer/telephony applications are now available.

Quality of Service Issues

It is appropriate to discuss Quality Of Service (QoS) technical issues related Voice Over IP technology. Voice Over Internet Protocol (VoIP) technology has advantages of reduced cost and bandwidth savings of carrying voice over packet networks. However, these advantages are associated with some quality of service issues unique to packet networks. In general these issues includes all of the the following problems:

Delay

Delay in VoIP technologies can cause two problem: echo and talker overlap. When using Voice Over IP applications, many times a caller on the other side of the conversation can hear his/her voice echo when speaking to the party on the opposite side of the conversation. This echo is normally caused by the signal reflection of the speaker's voice from the far end telephone equipment back into the speaker's ear. None-the-less, this echo is unacceptable for good quality voice conversations and can become a significant problem when the round trip delay becomes greater than 50 milliseconds.

This echo is presently not a problem with the standard public switched telephone network. Individuals engaged in telephone conversations are generally used to hearing clear telephone conversations without an echo. Echo then is generally perceived as a significant quality problem, that Voice Over Packet systems must address. There needs to be an echo control or means of echo cancellation.

The problem of echo has caused many cellular telephone manufacturers to shy away from voice over Internet protocol at least to the extent when providing normal telephone or wireless services. These manufacturers design equipment and products that generally use the normal digital cellular networks and public telephone system. These manufacturers also add some Internet functionality to these devices (e.g., email, and text messaging) in order to provide customer's with some communications back to the internet.

Echo is clearly annoying and will not be tolerated by companies and individuals desiring clear channel voice communications.

Accumulation Delay Problems in the Prior Art

Accumulation delay is another type of technical problem associated with Voice Over Internet Protocol Applications. Accumulation is sometimes referred to as algorithmic delay and is caused by the need to collect a frame of voice samples to be processed by a voice decoder. Any type of accumulation delay also cannot be tolerated in Voice communications.

Accumulation delay can be improved by an enhanced network infrastructure, algorithms, and computing equipment. The present invention solves this problem by a robust data network, computing equipment, and more efficient means of voice decoding.

Processing Delays Problems in The Prior Art

Processing delays: is another problem associated with Voice Over Internet Protocol applications. Processing delays are delays that are caused by the actual process of encoding and collecting the encoded samples into a packet for transmission over the packet network.

This encoding delay is a function of both the processor execution time and the type of algorithm used. These delays can be kept to a minimum by the using multiple voice coder frames to be collected in a single packet to reduce the packet network overhead. For example, it is possible for three frames of G.729 codewords, equaling 30 milliseconds of speech to be collected and packet into a single packet. A high speed processor and network method as defined in the present invention will adequately address this problem and will provide extremely clear voice communications.

Network Delays Problems in the Prior Art

Network delay is also a potential problem that can affect performance in Voice Over IP and QoS implementations. Network delay is generally caused by the physical medium and protocols used to transmit the voice data, and the buffers used to remove packet jitter on the receive side.

This type of delay is a function of the capacity of the links in the network and the processing that occurs as the packet transit the network. Jitter buffers can also add delay which is used to remove the packet delay variation that each packet is subjected to as it transmits the packet network. Again a robust network, computing equipment, and other methods as addressed in the present invention will adequately address this problem Jitter Delay Problems in the Prior Art Jitter is another form of delay problem when implementing VoIP and QoS systems. Jitter is a type of delay problem that actually compounds the delay problem and there is a need to remove this jitter. Jitter can be viewed as a variable inter-packet timing caused by the network that a packet traverses.

Removing jitter is also critical for enhanced Quality Of Services and this process requires the collecting of packets and holding them just long enough to allow the slowest packets to arrive in time to be played in the correct sequence. This in of itself can also cause additional delay.

In considerations of these delay problem, the data network described in the present invention and the internet based server system, must be configured and managed to provided minimal delay and jitter, enabling a consistent quality of service which is comparable to voice communications over the public switched telephone network.

Lost Packet Compensation Problems in the Prior Art

Lost Packets: The Lost packets on an Internet Protocol (IP) network can also be seen as an even more severe problem, depending on the type of packet network that is being used. A configured network for purposes of this invention cannot be allowed to lose packets. The loss of packets obviously will result in a broken or corrupt voice communication session.

Because IP networks do not generally guarantee service, they will usually exhibit a much higher incidence of lost voice packets than ATM networks. In some IP networks, all voice frames are treated like data. Under peak loads and congestion, voice frames will be dropped equally with data frames. However, as stated, the issue of lost voice packets must be dealt with in an efficient manner in order to accomplish the QoS service desired by customers. Lost voice packets can mean the loss or partial loss of important voice communications. This simply cannot be allowed to happen.

The Problems Addressed

The present invention takes into account and addresses all of these problems with increased enhanced unit design (a high speed Intel® Mobile Pentium® 4 processor) software architecture, and advanced network infrastructure such as provided by Net-2-phone communications™ (located on the internet at net2phone.com) or the Cisco AVVID™ network. (Architecture for Voice, Video, and Integrated Data). These techniques and methods are described below. Additionally other companies have improved and have discovered enhanced communications using Voice Over Internet Protocol communications and these robust methods if configured properly would work equally as well as with the preferred embodiment.

Universal Instant Messenger

Another major problems in the computing and telecommunications industry is the fact that end users or customers lack the ability to instantly connect to a specific network server, cell phone, device, or computer attached to the internet in a standard manner using an instant messenger. As previously stated, most manufacturers prefer to avoid the problems of voice over ip in wireless devices and hence use a standard digital wireless telephone network. The Internet then is only used on a limited basis such as web page access and for email purposes. Voice over Internet Protocol is generally avoided with wireless cellular or satellite telephones due to the previous problems discussed.

The concept of a Universal Instant Messenger system allows end users and customers to stay connected and seen on the internet. People on the Internet use this concept everyday and this instant messenger process keeps people in touch with their friends and family all over the world.

The prospects of global ability of wireless instant access to another user connected to the same network and the power to initiate voice communications with users of the internet and large internet service providers like Yahoo™ and America Online™ network users while still having the normal capabilities of a global cellular or satellite telephone is very promising. In general the type of network used in voice communications is transparent to the customer and end user. In general, people care very little about the type of network they communicate over as long as the device and network on which it communicates produces a quality of service which is clear and which can be easily heard and understood.

Network Processes and Methods—Prior Art Discussion

The following patents and prior art forms a background for the instant invention. None of the cited publications are believed to detract from the patentability of the claimed invention.

U.S. Pat. No. 6,097,804 issued to Gilbert, et al on Aug. 1, 2000, relates to a method and system for completing a voice connection between first and second voice terminals in a switch telephone network. This system deploys a Virtual Switching Point (VSP) in a switched telephone network having a connection to a data network such as the internet to make and receive Voice Over Internet Protocol (VoIP) telephone calls to establish a voice connection between a calling party which initiates the call request and a called party number in each call request message. The Call request message may include a plurality of called party numbers and the VSP completes calls to each number in sequence without terminating the voice connection with the calling party, until an attempt to connect with each of the called numbers has been made or a call control option is exercised by the calling party. The call connections are established by the VSP using common channel signalling, (CCS) messages. The call connections are controlled by the calling party using data messages passed to the VSP via the data network.

This patent provides for Voice Over Internet Protocol communications, but the principle disadvantage of this patent is that it fails to address the issues discussed herein associated with Voice Over IP Communications. It also does not allows for the instant messenger communications an other multiple novel features of the World-Wide-Walkie-Talkie device and network invention claimed herein.

The issued patent also lacks the high speed network and built-in computing functions such as Personal Digital Assistance (PDA) inherent to the World-Wide-Walkie Talkie invention claimed herein.

Additionally, the issued patent does not allows for the independent mass storage of voice mails or other storage, and does not allows for the controlled and independent transmission of voice mail, video mail or other data transfer without independently without going through a third party service cellular, data network provider, or Internet Service Provider (ISP).

Similarly, U.S. Pat No. 6,128,304 issued to Steven E. Gardell, et al on Oct. 3, 2000, relates to a method and apparatus for providing traditional telecommunications service capabilities in a packet based computer network. The system and method of this invention automatically provide such service capabilities in the event a terminal end-point is unavailable to receive an incoming call, based upon predetermined associations between the terminal end-point and one or more of the available services. As discussed above in the previous Gilbert patent issued, this patent also lacks all of the previously discussed advantages, methods, and functionality used by deployed by World Wide-Walkie-Talkie and high speed network.

Most importantly, this invention further fails to addressed the problems and technical issues as discussed herein above and does not provide the bandwidth or functionality required to accomplish Quality of Service (QoS) required by individuals and organizations Similarly U.S. Pat. No. 6,141,341 issued to Wesley Stuart Jones, et al, et al on Oct. 31, 2000 lacks the functionality of the World-Wide-Walkie-Talkie wireless invention and network. This issued U.S. patent discloses an Internet Protocol telephone system and method which uses a telephone to place and receive voice over Internet Protocol (VoIP) based telephone calls and public switched telephone network (PSTN) based telephone calls.

An off-hook condition with the telephone is detected and a sequence of signals generated by the telephone is received. At least a first signal generated by the telephone is buffered while the system attempts to detect a predetermined signal that signifies a VoIP based call. Upon detection of the predetermined signal, the system intercepts subsequent signals in the sequence, absent at least first signal that was buffered, and places the VoIP-based call via an internet. Otherwise, the system places the PSTN based call via a PSTN.

Similar to the other issued patents, this patent lacks the all of the functionality offered by the present invention. Moreover this inventive process does not address the technical problems of delay and other technical issues as previously discussed herein.

Another similar patent U.S. Pat. No. 6,240,449 issued to Raymond Nadeau on May 29, 2001 also lacks the functionality and methods used by the World-Wide-Walkie-Talkie wireless computing invention and network. This U.S. patent issued to Nadeau discloses a method and a system for managing communication sessions originating in either one of a telecommunications network, such as the PSTN network or a mobile telephone network, and a data communications network such as the Internet.

The system discussed in this patent includes a service logic controller supporting a data structure that holds a plurality of communication session disposition program records. The service logic controller connects with the telecommunications network and with the data communication network through respective gateways that transmit communications session disposition inquiry messages. In response to those messages, the service logic controller retrieves the appropriate communication session disposition program. If the program is instructive to establish an Internet domain connection, the service logic controller transmits to a gatekeeper functional element an Internet address request. The service logic controller then generates an instruction to the entity that originated the inquiry message in accordance with a response from the gatekeeper functional element. If the program does not require an Internet connection, the service logic controller generates an instruction to the entity that originated the inquiry message in accordance with the program itself. The communication session is then processed according to the instruction.

Similar to all of the previously discussed patents, this patent also fails to address the Voice Over Internet protocol delay issues and lacks all of the program functionality and features, especially the instant messaging capabilities previously discussed and offered by the present invention. This invention would simply not provide a Quality of Voice (QoS) as required by the voice communications industry.

Again a similar U.S. Pat. No. 5,812,951 issued to Ganesan ,Kalyan; Pant, Ranjan; Liau, Victor, Fischler, Robert, Goh, Kim, Saunders, Barry, Khan, Tayyah, Johnson, Harry, Coghlan, Desmond ("the inventors") on Nov. 23, 1994 lacks the features and functionality presented in the present invention.

This particular patent discloses a similar Wireless personal communication system (WPCS) having several features embodied in several forms. A similar feature of this particular patent indicates a preferred embodiment that provides for a walkie-talkie option where the first subscriber unit (SU) communicates directly with the second subscriber unit (SU), preferably over an unlicensed frequency.

However, it should be well noted by the patent examiner or reader that the walkie talkie options discussed in this particular patent is similar only in wording, but very different in the manner in which that invention and technological approaches used in the present invention claimed herein. This invention does not use the internet or a data network to communicate, but in fact uses an unlicensed frequency. This invention appears to be similar to the present invention because of the words "Walkie talkie". This invention is totally different in functionality from the present claimed invention. However, the inventor of the present invention thought it wise to address this particular invention since it address the word "walkie talkie".

Another U.S. Pat. No. 6,366,622 issued to Brown, Stephen Joseph, Estrada Andrew Xavier, Bourk, Terrance R, Norsworthy, Steven R., Murphy Patrick, J, Hull on Apr. 2, 2002) discusses an Apparatus and method for wireless communications relating mainly to Radio Frequency (RF) and a wireless Personal Communications system. This invention addresses issues mainly related to Radio Frequency based communications and Personal Communications systems, but again, like the previously discussed invention lacks the program functionalities, methods, and features of the World-Wide-Wide Walkie Talkie.

One main important aspect for the patent examiner or reader to note in this invention is that it does not implement Voice Over Internet Protocol technology, or Instant messaging over a data network such as the internet as claimed in the present invention. U.S. patent application Ser. No. 20020015391 by Kriaras, Ioannis, Palat, Sudeep Kumar, Yamin, Hatef, Yang Jin ("the inventors") filed on or about May 14, 2001 also fails to provide the functionality and methods of the invention claimed herein.

This invention also does not address the critical delay issues which is apparent with the use in Voice Over Internet Protocol applications This application filed by the inventors on May 14, 2001, in general discloses a Real time data transmission system and method used in a network in which a real time media gateway is provided to allow access to the internet backbone in addition to the usual GPRS specific gateway.

The method involves changing the header in a real time data stream as it passes through the network so that it can pass directly to the real time gateway without passing through the GPRS specific gateway. This ensures that the data stream travels along a more direct route and shortens the headers used in the data stream in the process.

This invention addresses some Voice Over Internet Protocol technologies and methods as previously discussed here. However as with the other previously addressed prior art, this invention fails to address the critical delay issues and other technical issues related to VoIP telephone calls. Moreover, it also lacks the many high features and methods used by the present invention as discussed herein.

Other Network Related Prior Art

Other Voice Over Internet Protocol methods consist of major Internet Protocol (IP) network services such as NET2PHONE (located at net2phone.com), Dialpad (located at dialpad.com) and paltalk (located at paltalk.com) which offer reduced rates or even FREE services on Voice Over Internet Protocol platforms. Due to the recent developments and advances in Voice Over Internet Protocol Technology, there are several other companies which offer IP based telephony services. Many of these companies offer only a network, which means that customers must use their own equipment to interface with the provider's network.

Net2Phone IP Advanced Network Services

Net2phone™ in particular is the world undisputed leader in Voice Over Internet Protocol technology and have effectively addressed many of the previous technical issues discussed herein related to delay.

However, Net2phone™ specializes in VoIP network technology and does not presently offer a wireless computing device to use over its network such as the World-Wide-Walkie-Talkie invention presented herein. The company does offer some land based telephony products that can be used in the home or the office, but presently does not offer any wireless computing devices that would interface with it's network. The company does offer the opportunity for manufacturers, and inventors to develop products to work over its network and has an OEM program which encourages such development.

Notwithstanding, the net2phone™ service would be an excellent IP based network for the development and deployment of the World-Wide-Walkie-Talkie invention due to its high Quality of Service currently being offered to computer and telephone users.

A high-bandwidth resilient network service such as Net2phone™ coupled with the World-Walkie-Talkie high speed computing device would in fact produce a high quality voice service consistent with the design of the World-Wide-Walkie-Talkie hand held computing platform.

As previously stated, it is very important to note that Net2phone™ is driving the development of next generation VoIP equipment enabled for advanced voice service such as the World-Wide-Walkie-Talkie invention and does offer an OEM development for manufacturers interested in capitalizing on the exploding market for telephony-enabled devices. Java applets, servlets, or other compatible software programs can be developed with ease and designed for an invention to effectively interface with the Net2phone™ Voice Over Internet Protocol service.

Net2phone OEM development provides an accelerated solution to develop IP telephony products and services to manufacturers. The solution includes the tools and support needed to integrate the Net2Phone Protocol and VoIP components into a variety of broadband and narrowband devices. These telephony-enabled devices such as World-Wide-Walkie-Talkie invention herein can take advantage of instant access to Net2phone's managed IP network, leading edge services and back office support.

Dialpad™ and Paltalk™ are also two other managed IP network providers of Voice over IP technology and services which offer voice over internet protocol service. However, much like the Net2phone™ service provider, these companies presently only offer Voice Over IP network services but do not offer a wireless communications computing device such as the World-Wide-Walkie-Talkie invention claimed herein. Additionally not all of these companies offer third party OEM development of products to interface with their networks.

As with Net2phone or any popular Voice Over IP services, java applets or programs can be easily designed to interface with these large services providers. As stated none of these major IP network providers presently offer an INSTANT MESSENGER world device such as the World-Wide-Walkie-Talkie invention.

Cisco Network Architecture for Voice, Video and Integrated Data

Cisco Systems Inc. the undisputed router manufacturer also offers the Cisco AVVID (Architecture for Voice, Video and Integrated Data) The Cisco AVVID brings to multi-service networking a standards-based, open-systems architecture for converged networking.

Cisco's AVVID technology eliminates in many cases the need for legacy systems entirely and has introduced new and innovative applications such as unified messaging. Cisco IP Contact Centers, end-to-end IP telephony, and video are now possible over a quality-of-service (QoS) enabled IP infrastructure. This network architecture comprises three distinct building blocks: (a) infrastructure such as switches and routers, (b) applications such as call control, and clients such as fixed and wireless IP telephones (such as World-Wide-Walkie-Talkie invention), H.323 videoconferencing equipment, and (c) Personal Computers.

The end result of this model is a multi-service ecosystem that is scalable, highly available and resilient, open and adaptable. By using the Cisco CallManager™ a PBX can be eliminated and replaced with IP telephone over a converged network using the Cisco solution. This type of network coupled with the claimed invention could also possible be a suitable network for the support of the wireless invention claimed.

However, like Net2phone, and the other VoIP network providers, Cisco's powerful network AVVID network architecture does not provide the device and INSTANT MESSENGER functionality of the World-Wide-Walkie-Talkie invention claimed herein. However, it should be noted that for development purposes, the Cisco AVVID network architecture would also be a possible reliable solution for Voice Over IP network services for the World-Wide-Walkie Talkie invention disclosed herein.

J2™ Global IP Communications

Also of interest in the subject of network communications prior art is J2's advanced internet protocol communications services (j2.com) which allow users the capability to send and receive faxes and voice mail over the internet similar to the network capability of the present invention. The company extends it's unified messaging service offering mostly to Personal Computer Users.

The network based IP service even allows for fax broadcasting and Voice Conferencing similar to the World-Wide-Walkie-Talkie data network and invention. As stated, the service offered by J2 are primarily IP based Internet Services.

However, as with the other network service providers discussed herein, this service is limited and does not offer the same capabilities of the World-Wide-Walkie-Talkie wireless invention and also does not offer the INSTANT MESSAGING services offered by the device and many of the features claimed in the invention. However, the network of the claim invention could be configured similar to j2's network or software interfaces can be easily developed to interface with this network.

Other Telephony Prior Art

Other physical telephony devices exist which have some of the characteristics of the World-Wide-Walkie-Talkie, but these lack the bandwidth, push button and networking features, and especially the built-in INSTANT MESSENGER special feature offered by the World-Wide-Walkie-Talkie invention. However these devices are addressed here to give the reader a better understanding of the World-Wide-Walkie-Talkie invention as an independent tri-frequency cellular and satellite telephone. The patent examiner or reader should note that all of the devices discussed below are either cellular or satellite based, but not both such as the present invention. Additionally, these telephones are not Internet Protocol and use a telephone based network for voice communications However, these devices deserve a discussion in the prior art because some of the features are similar to the present invention, at least to the extent that the present invention is able to also communicate over a telephone network in a similar manner.

Motorola's V60G GSM World Phone

Motorola's V60G GSM World Phone is a world phone offering GSM 900/1800/1900 Mhz GRPS (such as the present invention) and which was introduced in 2001. It has an impressive array of features such as Full graphic display, up to 500 numbers stored, and also features SMS (Short Message Service) Mobile Originated and Mobile terminated and also has an internal data book.

The wireless phone is generally used as a cellular telephone compatible with networks in the United States, Asia, Europe, and Japan.

However this telephone is not Internet Protocol based. The device similar in nature to the present invention does not use the networking features of the World-Wide Walkie-Talkie does not utilize Voice Over IP implementation, and most importantly does not have the built-in INSTANT MESSENGER feature, the Personal Digital Assistant computing features, and does not connect to a data network in the same manner as the present claimed invention to provide the chat or high speed VoIP multimedia services offered by the World-Wide-Walkie computing invention.

Iridum Motorola 9500 Satellite Phone

Motorola's iridum 9500 Satellite phone is a powerful and reliable satellite phone from Motorola and like the World-Wide-Walkie-Talkie device, it provides reliable communications from anywhere to anywhere in the world. The phone comes with 10 dedicated control key for easy operation of the device, a clock which displays home and travel time, and a Removable Satellite Antenna and weights less than 16 ounces.

However this telephone is also not Internet Protocol based. The device similar in nature to the present invention does not use the networking features of the World-Wide Walkie-Talkie, does not utilize Voice Over IP implementation, and most importantly does not have the built-in INSTANT MESSENGER feature, the Personal Digital Assistant computing features, and does not connect to a data network in the same manner as the present claimed invention to provide the chat or high speed VoIP multimedia services offered by the World-Wide-Walkie computing invention

NOKIA 6310 World Phone

The Nokie 6310™ is also a world phone device and it also has tri-band features—world phone with downloadable applications via Java™, WAP, GPRS, HSCSD, wireless connectivity via Bluetooth, wallet.

It also operates on EGSM 900, GSM 1800/1900 telephone networks worldwide. The tri-band connection provides coverage on five continents and its Java™ technology lets users download applications to customize the phone to the user's needs.

However similar to the previous wireless telephones this telephone is not Internet Protocol based. The device similar in nature to the present invention but does not use the networking features of the World-Wide Walkie-Talkie. This telephone does not utilize Voice Over IP implementation, and most importantly does not have the built-in INSTANT MESSENGER feature, the Personal Digital Assistant computing features, and does not connect to a data network in the same manner as the present claimed invention to provide the chat or high speed VoIP multimedia services offered by the World-Wide-Walkie computing invention

Ericsson T68 GSM World Phone

The Ericsson T68 GSM World Phone™ is another similar device offered as a cellular telephone and like the preceding telephony devices discussed offere tri-band world compatibility and GSM 900/1800/1900 compatibility for world operations. Like the World-Wide-Walkie-Talkie, it also offers advanced Bluetooth wireless technology that allows it to connect to other devices without cables. With all of its impressive features, it is used only as a compatible cellular telephone and voice communications is restricted to a telephone network.

As with the previous inventions this telephone is not IP based. The device similar in nature to the present invention does not use the networking features of the World-Wide Walkie-Talkie. It does not utilize Voice Over IP implementation, and most importantly does not have the built-in INSTANT MESSENGER feature, the Personal Digital Assistant computing features, and does not connect to a data network in the same manner as the present claimed invention to provide the chat or high speed VoIP multimedia services.

As shown herein, all the devices presented herein are devices designed to function on a cellular or satellite telephone network Some of these devices work with the Internet but only designed for limited functions such as email and web surfing and do not provide Voice Over Internet Protocol Services.

These inventions do not function as a powerful computing device such as the World-Wide-Walkie-Talkie invention claimed herein, and do not utilize Voice Over IP communicating. Rather they all use a telephone network. Moreover these inventions do not support the advance concept of INSTANT MESSEGING that is built-in to the World-Wide-Walkie-Talkie invention claimed herein.

However, it is fair to say that the World-Wide-Walkie-Talkie invention claimed herein does adopts many of the features of these world class telephones, but goes much further to offer Quality of Service (Qos), Voice Over Internet Protocol, and specialized on-the-go computing applications providing customers with low cost effective worldwide communications to telephones and computers attached to the internet.

The powerful IP managed network offered by Net2phone and other Voice Over IP service providers also do not offer a high bandwidth wireless Internet telephony device providing Quality Of Service (QoS) and having all the novel functions and features of the World-Wide-Walkie-Talkie claimed invention.

It then becomes apparent from the prior art that a high-speed wireless computing device which can be embodied as an INSTANT MESSAGING device in a variety of configurations is needed by users of computer and telephony technology and which can be utilized over a data network, the internet, and a telephone network.

Having a Mobile Intel® Pentium® 4 Processor as its main processor, or compatible processor, the World-World-Walkie-Talkie wireless invention will offer the mobility users need and the power and performance of a desktop processor in a lighter package at speeds up to 2 Ghz with a 1'2KB on board cache, fast system bus, and performance enhancements like Data Prefetch Logic, and Rapid Execution Engine, that guarantee the power to handle the most data-intensive and graphic rich applications The benefits of mobility with this processor also offer extended battery life with SpeedStep® technology which dynamically optimizes application performance and power usage. The added convenience of Intel mobile technology enhances end user and customer ability to work within networks such as network methods disclosed herein. The efficient power management and lower idle power states improve the device's battery life while using wireless LAN/WAN connections with speeds up to 2 Ghz providing the performance needed for faster data transfer and increased bandwidth.

BRIEF SUMMARY OF THE INVENTION

Objects and Advantages

Accordingly several objects, advantages, and new uses of the present invention exists that provide low cost enhanced Quality Of Service (QoS), and instant voice messaging over an internet protocol (IP) enabled Voice Over Internet Protocol Services (VoIP) network or internetwork. The ability to communicate in cellular and satellite mode and which uses both the internet, and a telephone network provides functionality added functionality unobvious in the prior art.

On the go mobile computing power, push button unified messaging, and other services such as digital Voice Mail, Video Mail, real time video conferencing, and the transmission of data between two or more interconnected devices on a world wide basis (over any type voice or data network) independently of service providers are central to the objectives of the invention.

The ability of the battery solar charging system will guarantee power even in remote places on earth where electrical outlet or power sources are not available.

Many other objects and advantages of the present invention exists and are described below as follows:

a. An object of the invention is to provide a means of high quality voice and data communications between Internet users and customers of the worldwide Public Switched Telephone Network at minimal cost using the Internet or any data network.

b. Another objective of the invention is to provided customers with a multifunction hand held computer and alternate various means of wireless instant messaging and telecommunications enabling digital communications from or to anywhere in the world without distance limitation or the normal high cost associated with the use of long distance or international telecommunications normally charged with the use of the Public Switched Telephone Network (PSTN).

c. Another objective of the invention is to provide integration of internet voice and data services with services to the Public Switched Telephone Network which would open the door to a new generation of digital and cost effective communication services that combine Web-based data with voice and data calls.

d. Another objective of the invention is to provide wireless high Quality Of Service (QoS) via the internet or data network and a central gateway interface where end-users on the internet are able to instantly communicate through various means with other users on the internet or the public switched telephone network.

e. Another objective of the invention is to provide material cost reduction to companies or individuals involved in long distance telephone, facsimile, and data communications, which is extremely important to most companies and individuals particularly to those with international market and contacts.

f. Another objective of the invention is to provide secured private telephone conversation through VoIP communications and to prevent the unauthorized monitoring of telephone calls by governments or other unauthorized persons not authorized to participate in telephone conversations.

g. Another object of the invention is to provide more simplification of technology by deploying integrated voice/data networks that will reduce total cost and equipment requirements.

h. A further objective of the invention is to provide consolidation or the ability to eliminate points of failure, consolidate accounting systems and combine operations on one diverse platform providing for enhanced communications and efficiency.

i. Still yet another objective of the invention is to provide for Advanced Computer applications and support for multimedia and multiservice VoIP applications, and software advantages which today's Private Branch Exchange (PBX) or public telephone system simply cannot compete with.

j. A further objective of the invention is to provide a world wide compatibility device and method which can connect to Japan's I-mode service allowing any user of the internet to communicate with devices that use the I-mode service in Japan.

k. Still yet another objective of the invention is to provide Wireless Access Protocol (WAP) compatible services, and General Packet Radio Services (GPRS) technology which maintain an "always on" connection between users, wireless devices, and other devices connected directly or indirectly to the internet via other data networks which will allows users of other cell phones or devices to communicate easily regardless of where the call is originated from.

l. Another objective of the invention is to integrate communications between the internet, users of the network, and users of the Public Switched Telephone Network (PSTN) with the use of a high speed Voice Over Internet Protocol enabled internet server, software, and wireless devices.

m. A further objective of this invention is to provide an open systems architecture so that future applications may be easily designed to take advantage of bandwidth and services offered by larger ip network providers such as Net2phone, or any third party IP service providers offering OEM or third party VoIP development opportunities.

n. Another primary objective of this invention is to provide a world standard for digital cellular communications using Global System for Mobile Communications (GSM) used in European countries using TDMS as its way of communications which operate in different frequencies and Personal Communications Services (PCS) that uses a digital cellular network normally operating in the United States in the 1900 Mhz band which and which offers a variety of communications services that analog systems cannot offer.

o. Still yet another objective of the invention is to provide a bluetooth wireless foundation for the invention and interconnectivity and integration of computing equipment such as laptops, desktop computers, printers, and scanners, which have the need to interface and exchange data and information between the invention and other computing equipment for increased customer productivity.

p. Still yet another objective of this invention is to provide 3G or "third generation" cellular technology combined with other technologies such as VoIP technologies, that will provide the basis for a world-wide network using computing equipment, and internet servers attached to the internet to or from more simpler foms of networks for communications at lower cost and more reliable forms of communications.

q. Another object of the invention is to provide a means of communications and computing physical location on earth using GPS satellites or low orbiting satellites connection technology and data networks such as the internet in order to reach any telephone, computer, or wireless device attached to the internet.

r. Still yet another object of the invention is to provide a direct or indirect means of communications between users of the Public Telephone Network and users of the internet so that users of the internet may also be able to reach users of the World-Wide-Walkie-Talkie invention and users of satellite telephones.

s. A further object of the invention is to provide advanced computing applications and on-the-go mobile computing services to customers that use hand held computers by providing a built-in Personal Digital Assistant that uses the Palm VII™ Operating System or the Windows Pocket PC™ 2002 operating system for hand held computers.

t. Still yet another object of this invention is to provide a means for sharing data and information between computing devices and the invention which will allow customers to synchronize data between a personal computer and the wireless invention.

u. A further object of the invention is to provide functionality of a hand-held wireless computer terminal which can access any network or computer in the world using the public switched telephone network or the internet.

v. Another object of this invention is to provide a real time functional digital web camera that will allow uses to create, and store, digital images and real-time Mpeg movies that can be shared or transferred to any email address or computer attached to the backbone of the internet.

w. Still yet another objective of the invention is to provide a central network or internet based web server that provides a wide spectrum of services including robust Quality of Services (QoS) and a host of consumer services, including e-commerce, m-commerce, which are available to registered users of the network.

x. Another object of the invention is to provide a means of internal MPEG-2 format that provides a method of compressing digital animation and Television Signals that reduce their size but still retain their high quality.

y. Another object of the invention is to lower cost by providing an alternate means of communications using worldwide connectivity between devices, users of the internet, and the public telecommunications system and by deploying an impressive array of Voice Over Internet Protocol (VoIP) protocols and QOS standards of communications which overcome the delays normally encountered with Voice Over Internet Protocol applications.

z. Still yet another object of the invention is to provide a means of transmitting crystal clear compressed digital voice and/or video communications on a world wide basis without distance limitation or reliance upon any telecommunications vendor.

aa. Still yet another objective of the invention is to provide customers with a means of accessing the internet and surfing the world wide web through one convenient mobile wireless device from anywhere in the world regardless of location.

bb. A further object of the invention is to provide a means to limit, or otherwise eliminate long distance fraudulent charges imposed by telecommunications or private telecommunications carriers.

cc. Another object of the invention is to provide cost effective fax transmission, and high quality video conferencing to any other compatible wireless unit, computer, or fax machine in the world.

dd. A further object of the invention is to provide extended battery life, enhanced multimedia applications, performance, and increased bandwidth with the use of a high speed built-in Intel® Mobile Pentium™ 4 microprocessor or compatible processor for enhanced communications.

ee. Another object of the invention is to provide a built-in operating system that control processes, functions, and methods of the invention to enable users to easily and effectively use applications inherent to the design of the invention.

ff. Another object of the invention is to provide an Artificial Intelligent interface which allows voice commands to be executed, and to enable customers to compose email or text messages from human speech that can be easily transmitted via email or by instant messaging services.

gg. Still yet another object of the invention is to provide mass data base storage for information storage and retrieval and storage for multimedia rich content data files which are generally unavailable to normal cellular or satellite telephones.

hh. Another object of the invention is to provide builtin Java® based virtual machine functionality and an environment for executing custom java applications and software programs that can be run and executed using the Java® specification.

ii. Another main objective of the invention is to provide instant "push button" convenience services that include but not limited to, SEND VOICE MAIL, SEND FAX MESSAGE, SEND EMAIL, SEND VIDEO MAIL, MESSAGE MEMO which services are easily operated and activated with the simple press of button.

jj. Another object of the invention is to provide an Open Standards Based Architecture and adoptions of standards so that gateways, applications, and clients produced may integrate and operate seamlessly with third party products.

kk. Another objective of the invention is to provide compatibility with standards adopted by the telecommunications industry including the Telephony Application Programmable Interface (TAPI) and the Java Telephony Application Programmable interface (JTAPI) which are used to communicate between applications and for providing unified messaging products and services.

ll. Yet another objective of the invention is to provide an independent wireless computer invention capable of automatically connecting the internet and which can also function as a "server" and independent device on the network for continuous communications in the unlikely event the main network server becomes unavailable on the network or internetwork.

The above objects and advantages provided hereinabove are not meant to be all inclusive of the advantages of the invention but provides the reader with a basic understanding of only some of the many objects and advantages that exist as a result of the invention. As with any computer, this invention will have virtually limitless applications.

Accordingly, many other objects and advantages of the present wireless internet invention will become apparent from the following descriptions taken in connection with the accompanying drawings, together with the foregoing are attained in the exercise of the method described wherein, by way of illustration and example, an embodiment of the present invention is fully and adequately disclosed.

BRIEF DESCRIPTION OF THE DRAWINGS

The drawings constitute a part of this specification and include exemplary embodiments to the invention, which may be embodied in various forms.

It is to be understood that in some instances various aspects of the invention may be shown exaggerated or enlarged to facilitate an understanding of the invention. Many novel and unobvious features of the present invention will become apparent from the following detailed description considered in connection with the accompanying drawings.

However, it is to be understood that the drawings are provided herein for purposes of illustrations only and is not meant as a definition of the boundaries of the invention, for which reference should be made to the appending claims.

Figure 1:
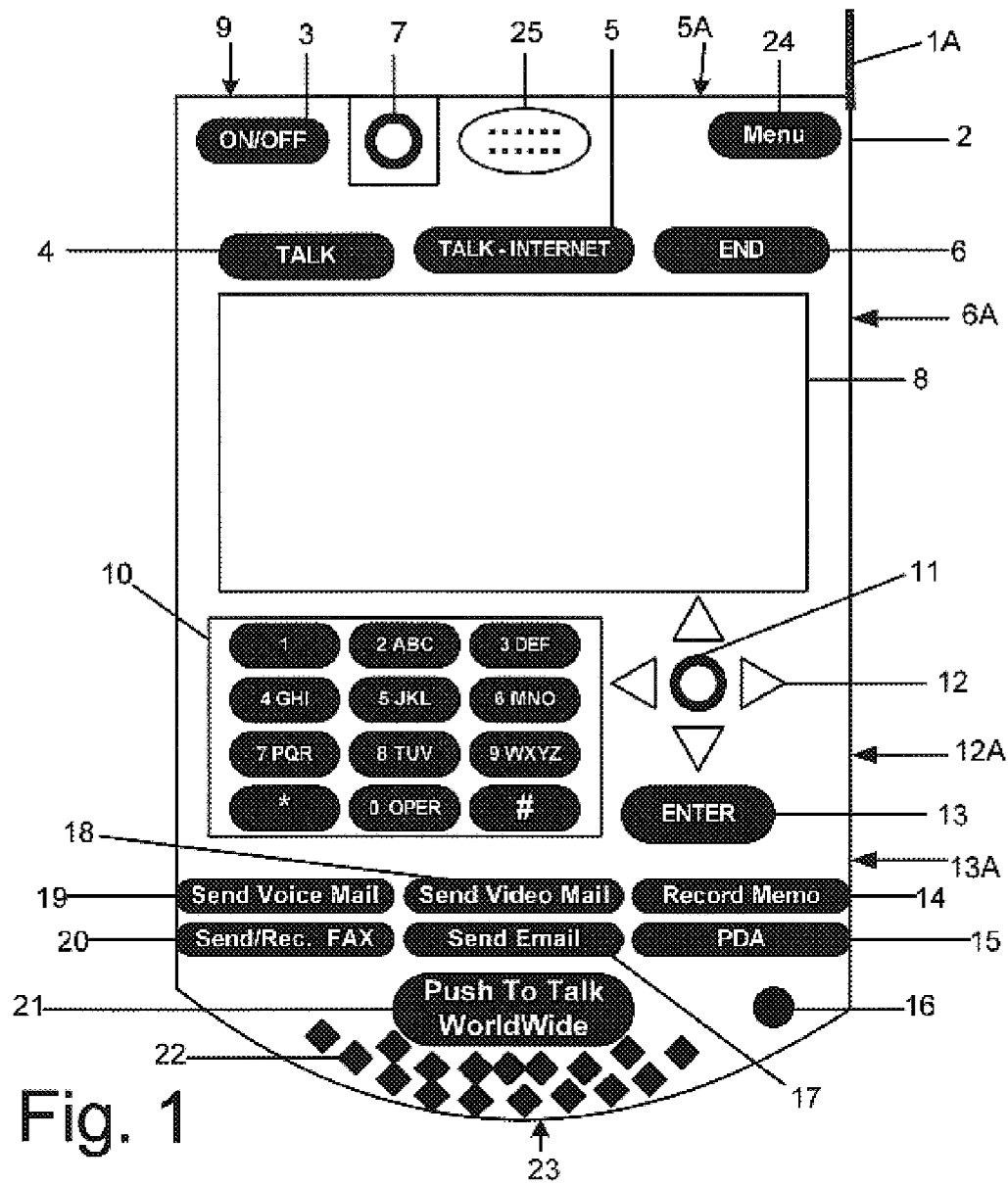

FIG. 1 shows a front view of the internet based wireless invention illustrating a generalized conception and multi-function model highlighting the different features and functions available in the design such as Talk-Internet, Video mail, Voice mail, Email, Fax, digital memo and the unique and powerful push-to-talk-worldwide function which initiates a communications chat session between two or more devices connected to the same network.

Figure 2:
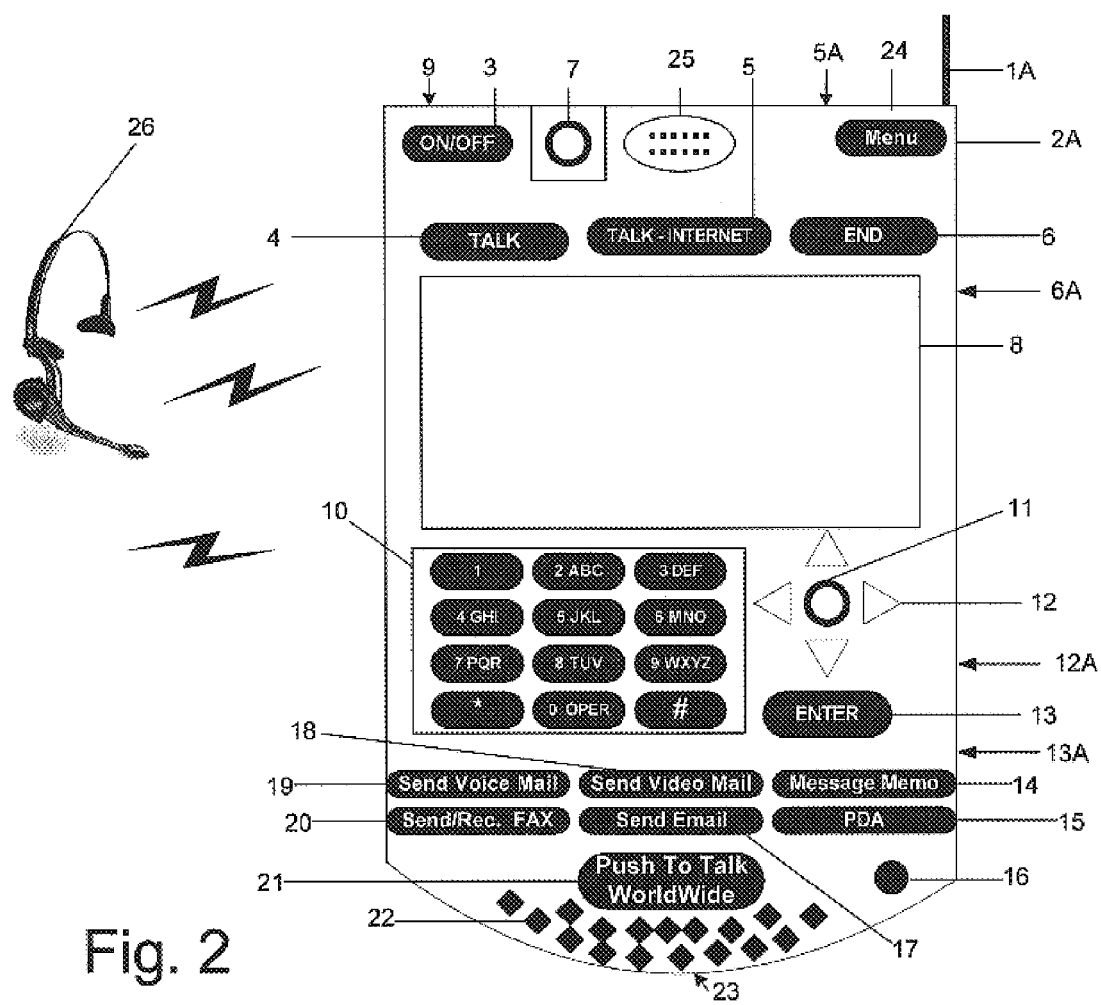

FIG. 2 depicts a front view of the instant messenger invention together with its accompanying intelligent bluetooth wireless voice command stereo headset which is a general purpose microphone and intelligent headset capable of transmitting voice commands directly to the invention and for providing a means of remote operations, remote control, and hands free telephone and chat conversations.

Figure 3:
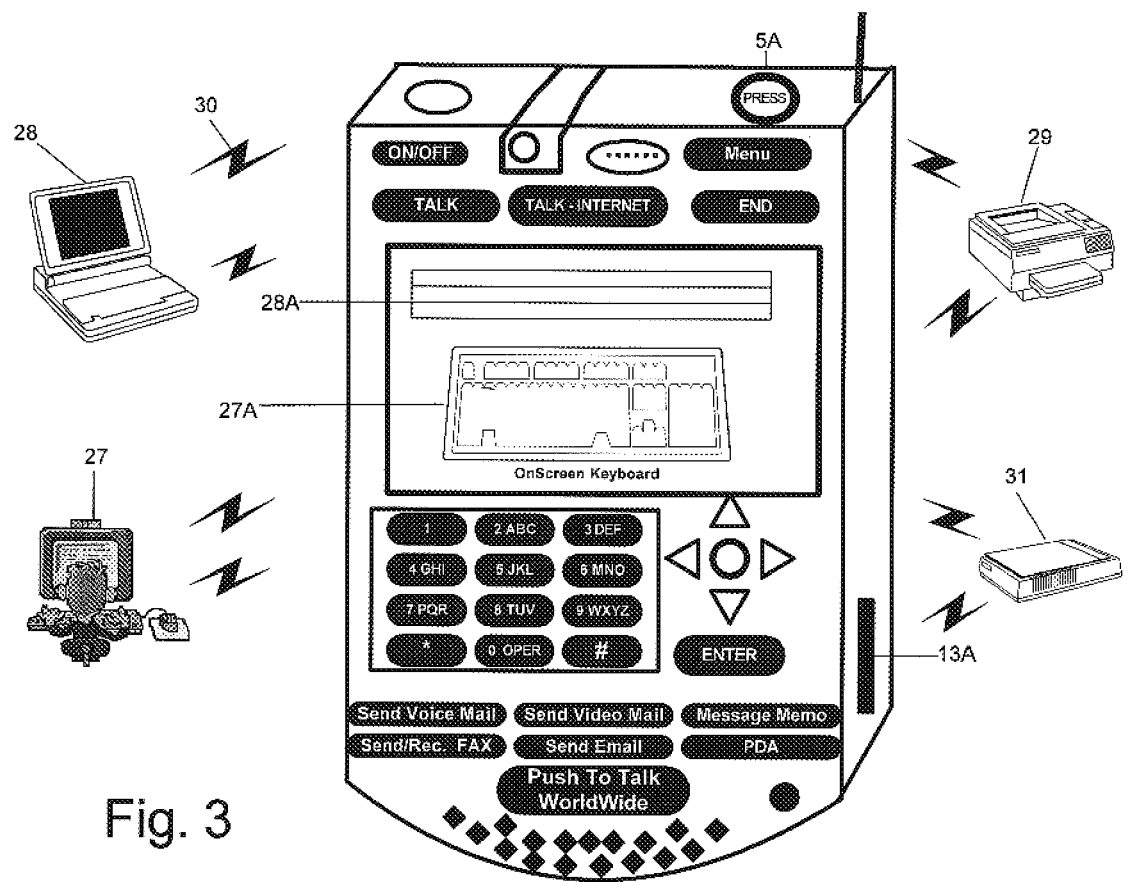

FIG. 3 is a perspective view of the wireless instant messenger device depicting the general purpose onscreen keyboard used for data entry and illustrating the bluetooth wireless connectivity capability of the invention between other compatible bluetooth computing devices such as a laptop computers, desktop computers, laser printers, and flatbed scanners and other compatible bluetooth devices (not shown) all of which may wireless connect to the device via bluetooth wireless link for the purpose of exchanging electronic information and data.

Figure 4:
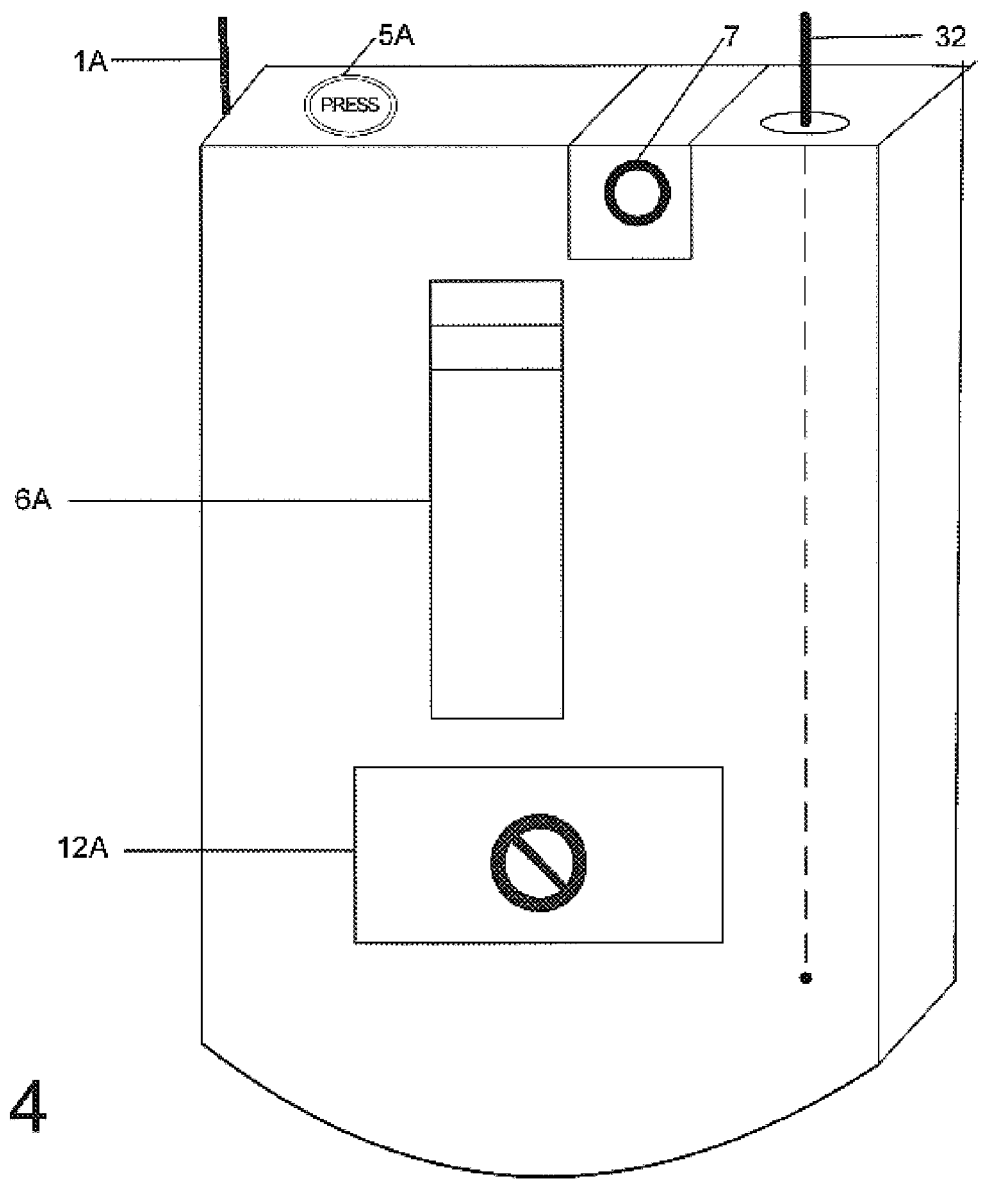

FIG. 4 is a rear view of the invention depicting the revolving built-in rotating real time web camera 7 along with a snap button 5A, a belt clip 6A, the battery compartment 12A and the stylus device 32 that is used when the invention is used as a Personal Digital Assistant (PDA).

Figure 5:
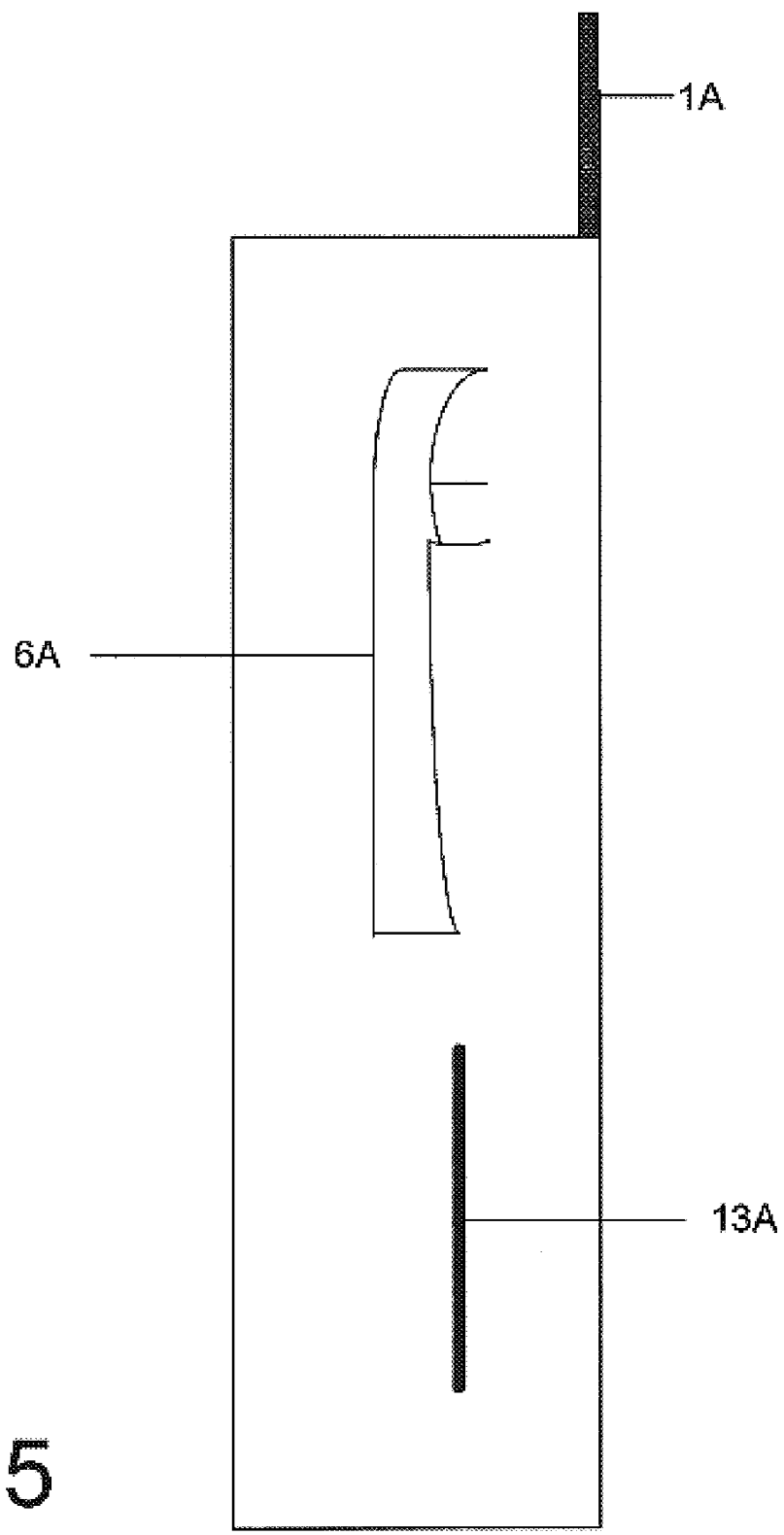

FIG. 5 shows a right side view of the invention depicting a side view of the cellular/satellite antenna 1A, the beltclip 6A and the Universal Serial Bus (USB) port 13A that is used for general purpose USB connectivity and for exchanging electronic information to and from the unit when wireless communication links are unavailable.

Figure 6:
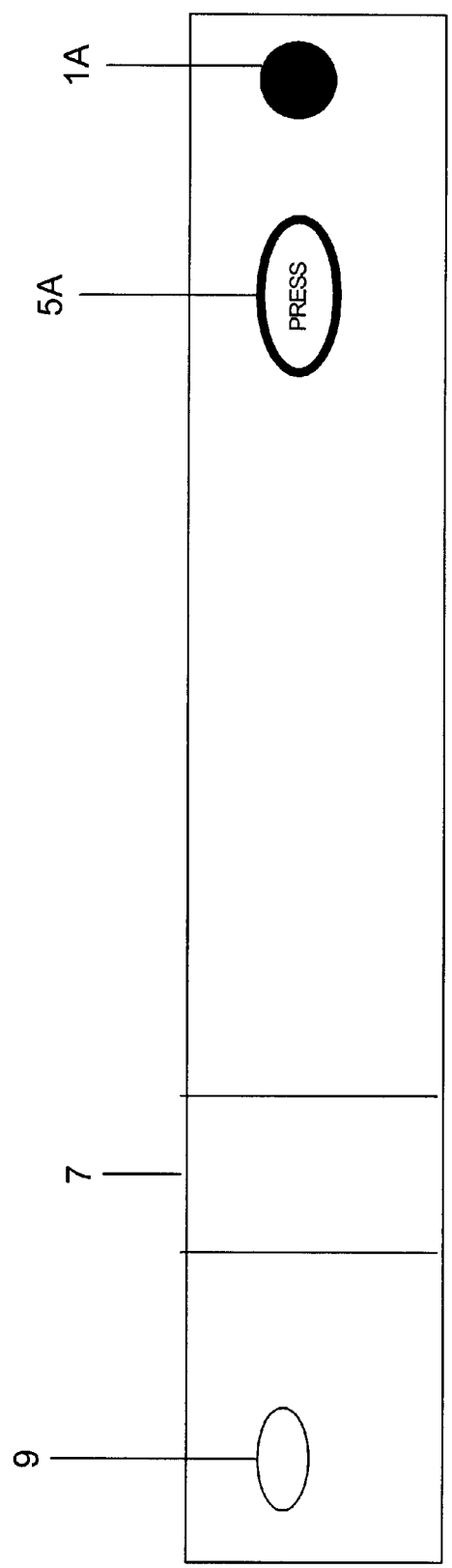
Figure 7:
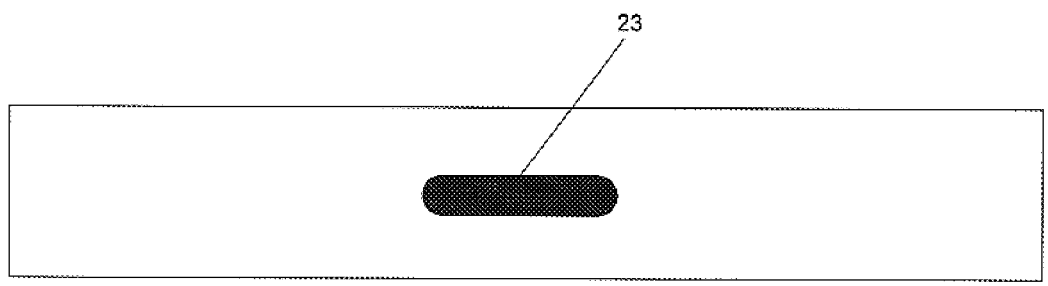

FIG. 6 is a top view of the invention and shown from left to right is the built-in stylus compartment 9 used to house the stylus pen, a sectional top view of the rotating or swivel web camera 7, a top view of the snap button 5A used to operate the built-in digital web camera, and a top view of the compatible satellite/cellular antenna 1A FIG. 7 shows a bottom view of the invention illustrating the AC/DC power/data port 23 used for providing AC/DC power or for recharging the invention and for connecting the full size portable keyboard (not shown) but is illustrated in FIG. 37 thru FIG. 39A.

Figures 8, 9:
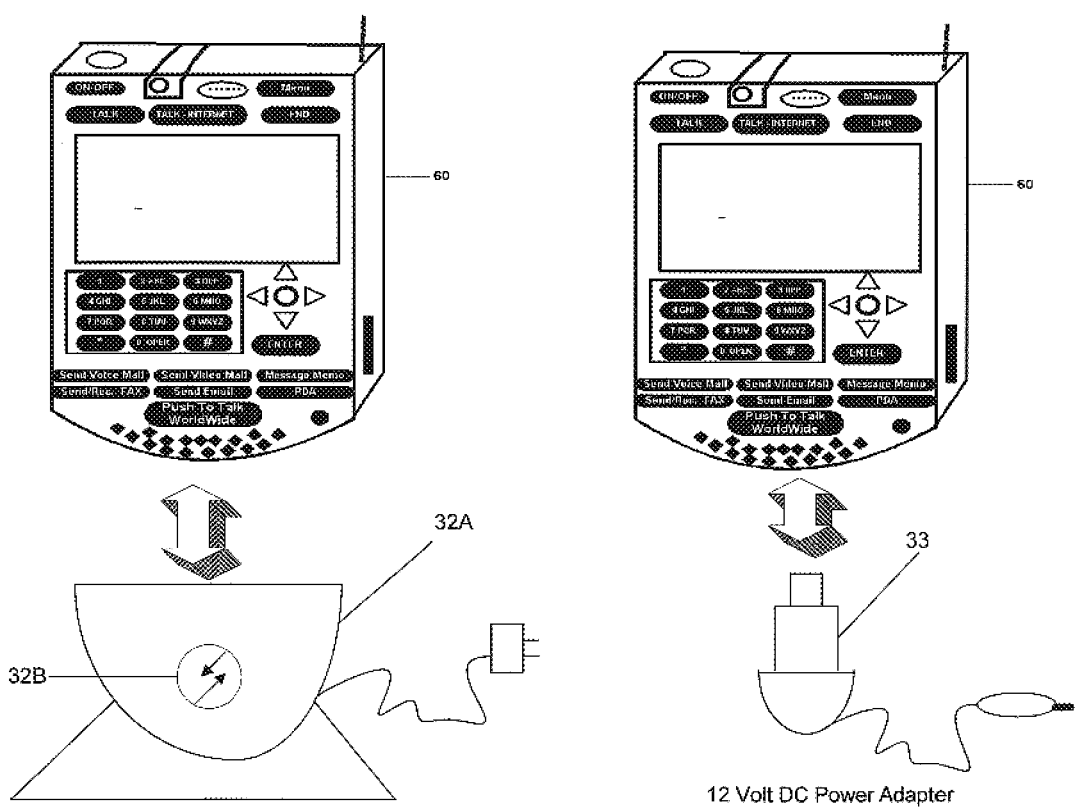

FIG. 8 is a perspective view of the invention together with the AC/DC 120v/220v power charger 32A that is used as an electrical charging power source the hotsync button 32B used to synchronize data with a personal computer.

FIG. 9 is a perspective view of invention together with the alternative power source namely the 12 volt DC power adapter 33 which plugs into a standard cigarette lighter to recharge or provide power to the device while in an automobile.

Figure 10:
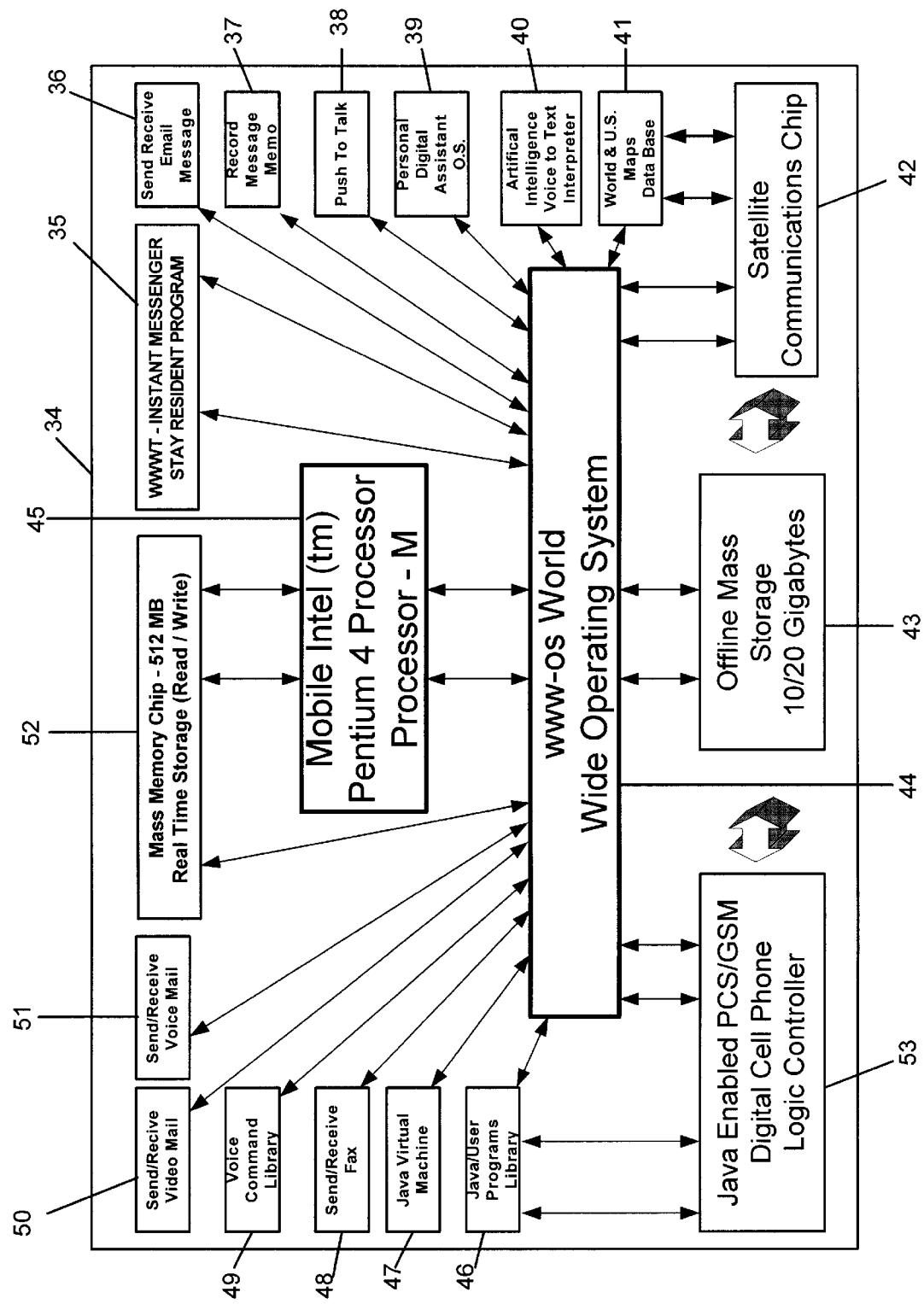

FIG. 10 is a conceptual view of the logic design and general microchip design and structure illustrating the powerful Mobile Intel™ Pentium™ 4 Processor 45, a built-in operating system named www-os 44, mass memory 52, offline mass storage 43, the instant messenger stay resident program 35 and a suite of powerful communication push button programs that enable worldwide intercommunications to any telephone, fax machine, email address or computer.

Figure 11:
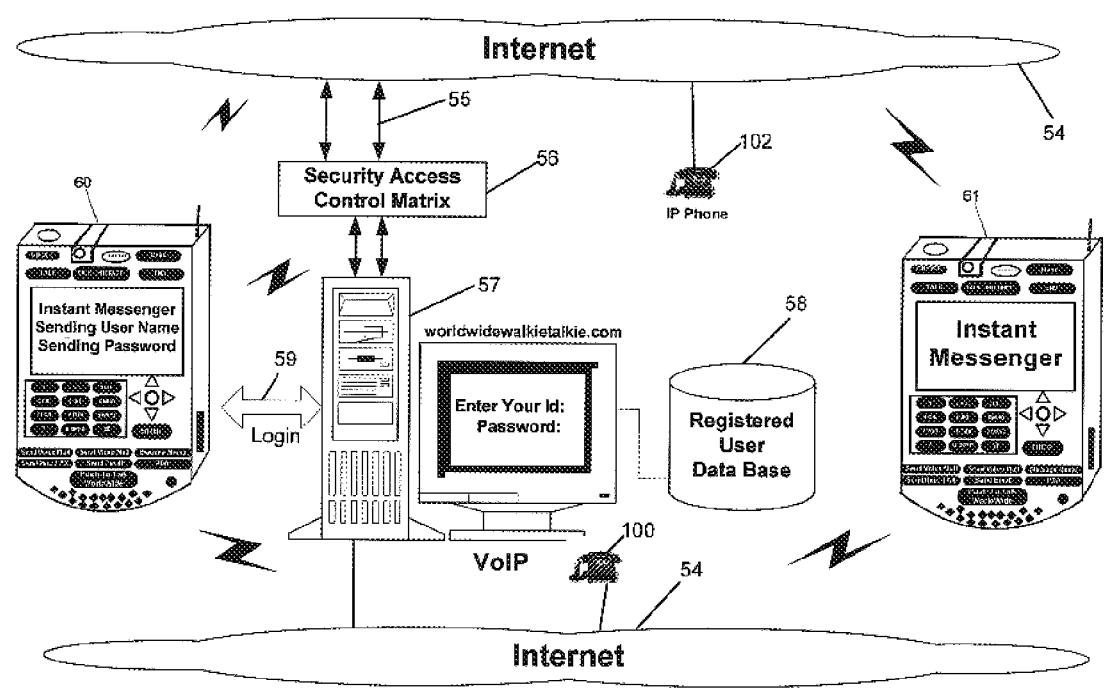

FIG. 11 shows a generalized view of the network structure and wide area data network together with a Voice Over Internet Protocol (VoIP) secured server 57, deployed over the internet 54 which illustrate how the wireless invention 60 maintains an ongoing high speed wireless connection to the internet using General Packet Radio Service (GPRS), Wireless Access Protocol (WAP) or other high speed continuous connection to an internet based server allowing another unit 61 to connect and communicate offline or in real-time via Instant Messenger, voice chat, or Voice Over Internet Protocol.

Figure 12:
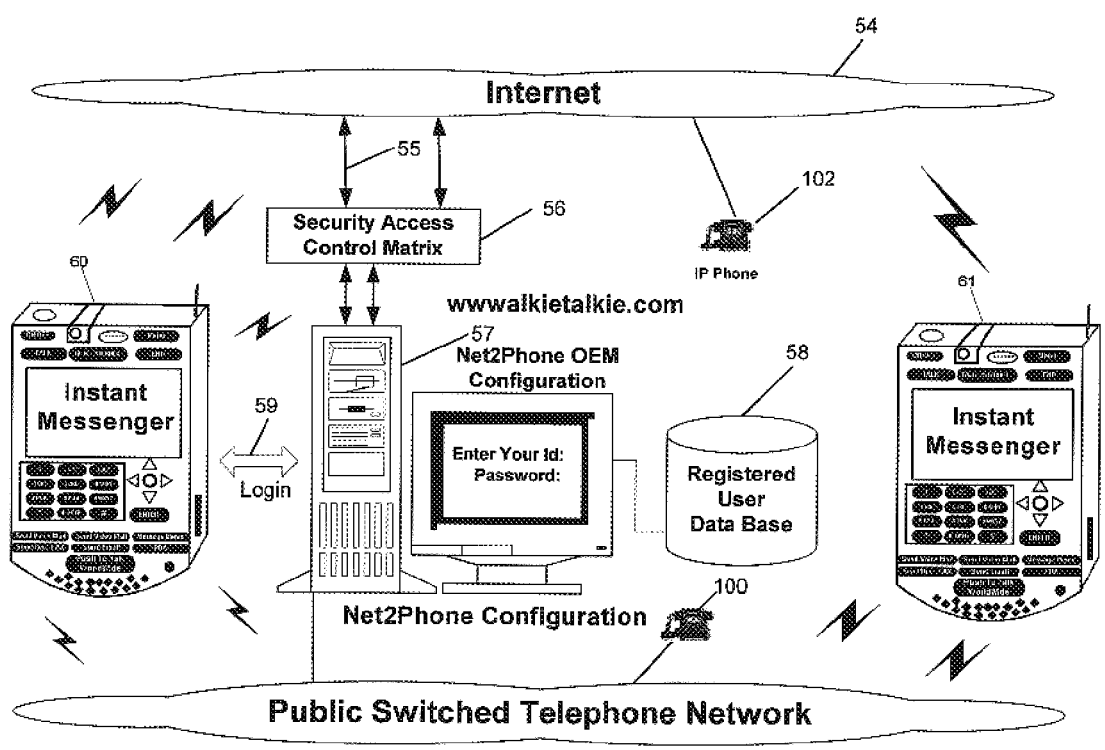

FIG. 12 shows illustration of a configured Net2phone OEM preferred data network embodiment configured over an internet domain name wwwalkietalkie.com and demonstrates how the invention automatically logs into a high speed network server via wireless connection, instant messaging, which also provides access the Public Switched Telephone Network 62 via wireless connection either directly by means of its independent built-in cell phone and satellite technology, or indirectly by means of internet, and Voice Over Internet Protocol systems and gateways.

Figure 13:
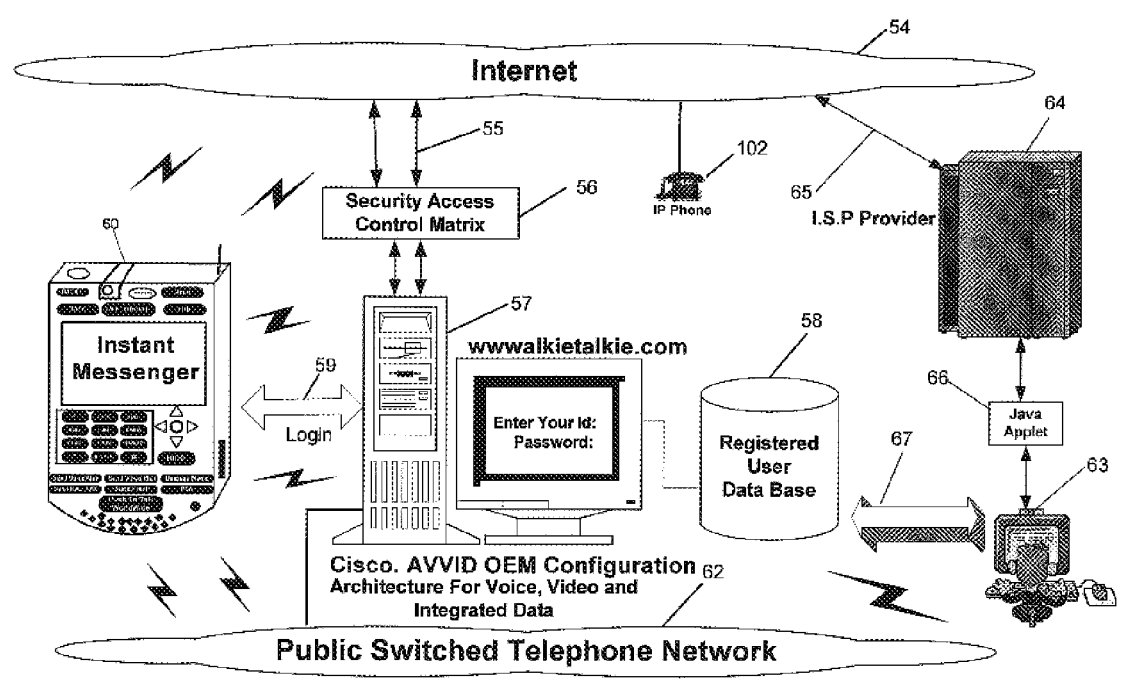

FIG. 13 is a generalized view of the high speed fully optimized networked system and method embodied using the Cisco™ AVVID OEM Configuration enabling registered internet end-users 63 connected to the internet via Internet Service Provider 64 (ISP) to instantly communicate with the World-Wide-Walkie-Talkie invention and the public switched telephone network 62 or the Internet by means of a java applet 66 or software program that runs on the personal computer that interfaces with the inter-network server.

Figure 14:
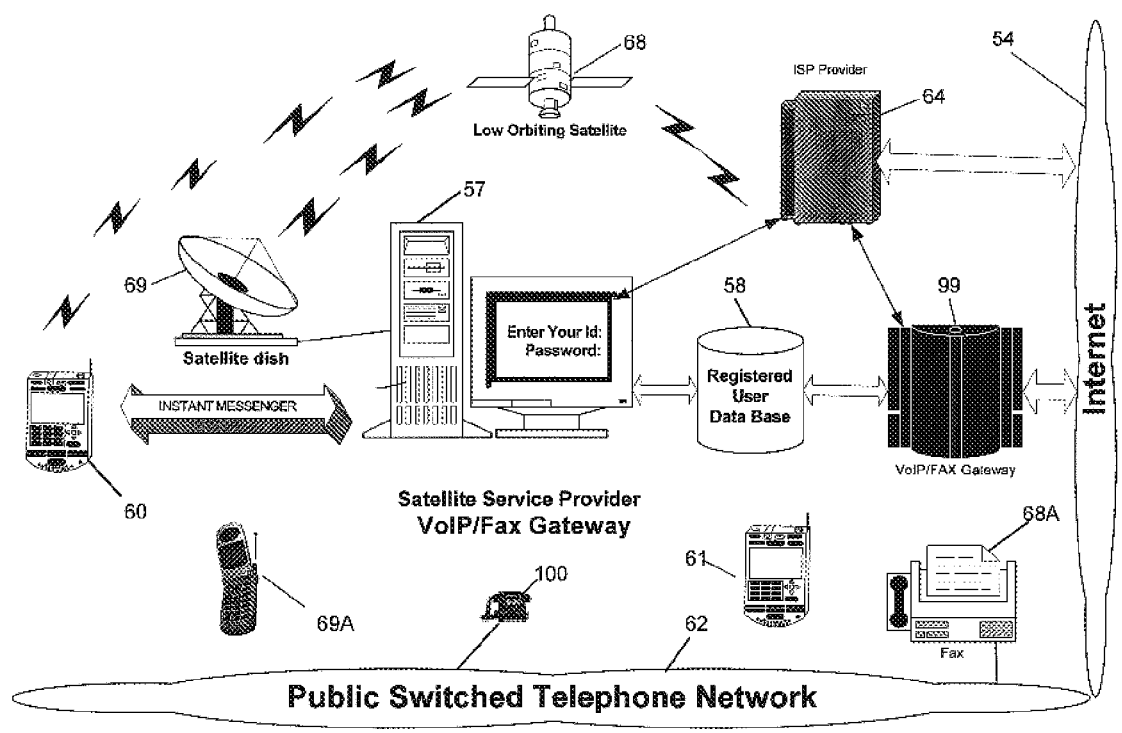

FIG. 14 shows a general view of the internetwork and illustrates how the World-Wide-Walkie-Talkie invention may directly or indirectly connect to a low orbiting satellite to provide the capability of talking to any other connected device or system including but not limited to telephones and fax machines on the Public Switched Telephone Network, a wireless network, or the internet.

Figure 15:
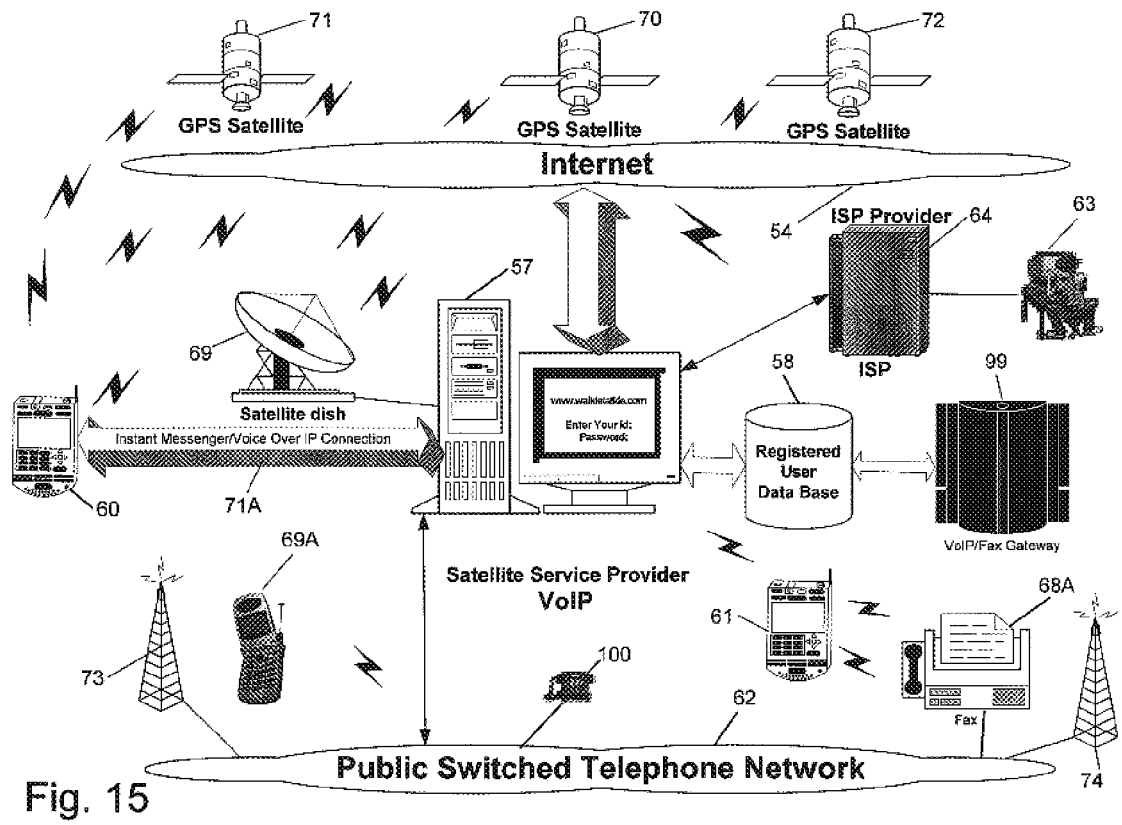

FIG. 15 shows a generalized view of the invention and internet protocol (ip) network interfaced with global positioning satellites (GPS) interconnected via the internet, or directly that provides a means to locate a device located on earth and which also provides intercommunications between the World-Wide-Walkie-Talkie invention, the data internetwork, computer users on the internet and the Public Switched Telephone Network.

Figure 16:
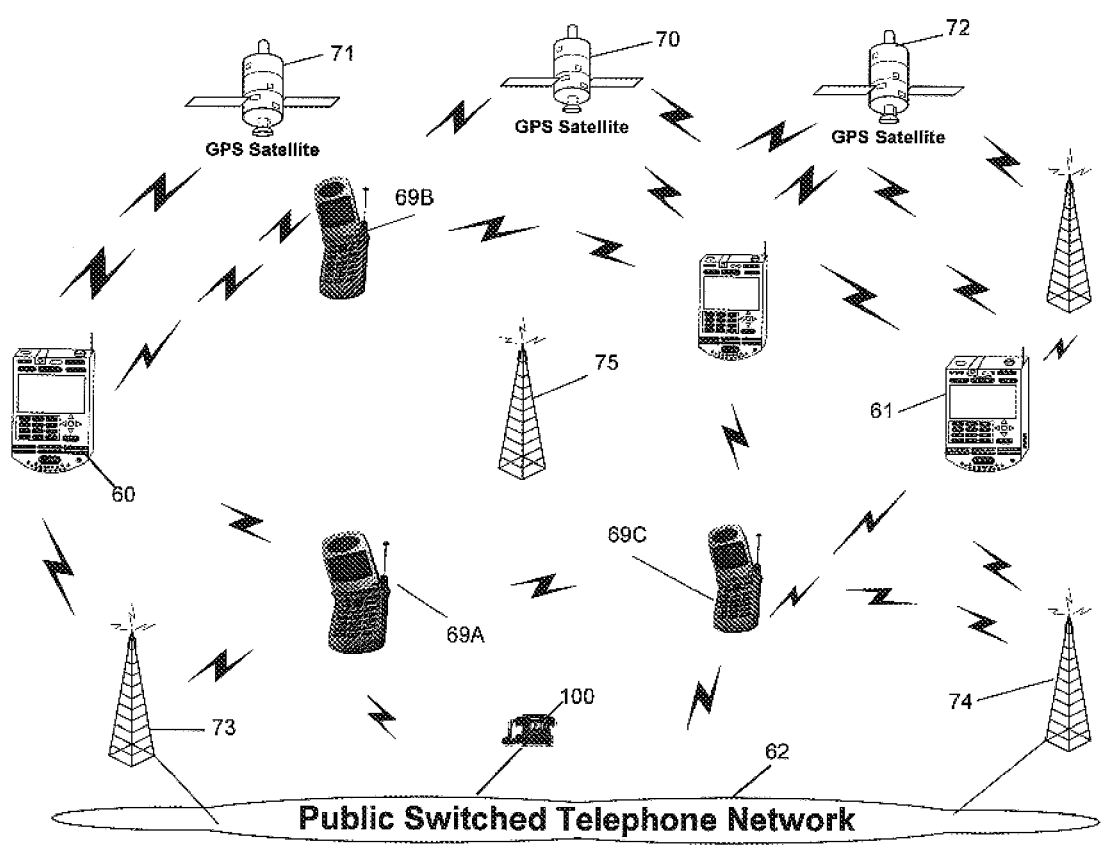

FIG. 16 shows the World-Wide-Walkie-Talkie wireless invention 60 communicating independently of the internet and which connects directly to satellites or earth based cellular towers and illustrating the capability of directly communicating with any other telecommunications device connected via the Public Switched Telephone Network or the Internet.

Figure 17:
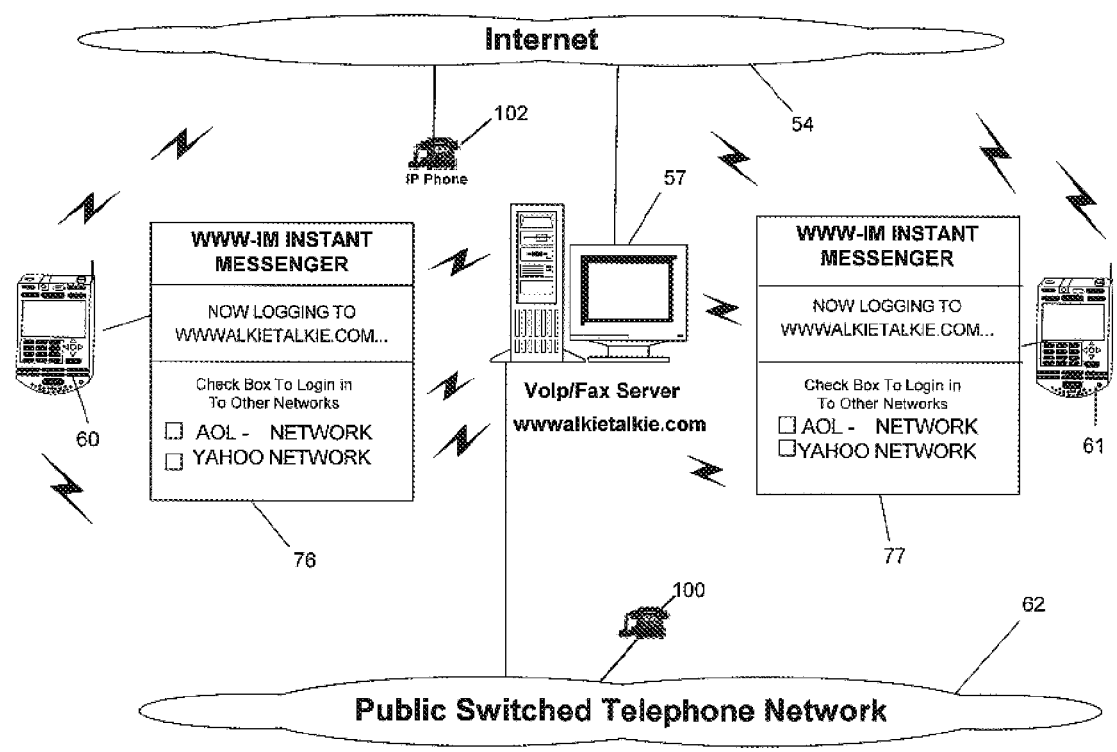

FIG. 17 is a depiction of how the World-Wide-Walkie-Talkie invention unit uses a wireless connection and the built-in internal WWW-IM INSTANT MESSENGERS 76 to log into the internet based network domain server 57 to enable network presence, voice chatting, and Quality of Service (QoS) Voice Over Internet Protocol (VoIP) to another device 61, the Public Switch Telephone Network 62, and the internet 54.

Figure 18:
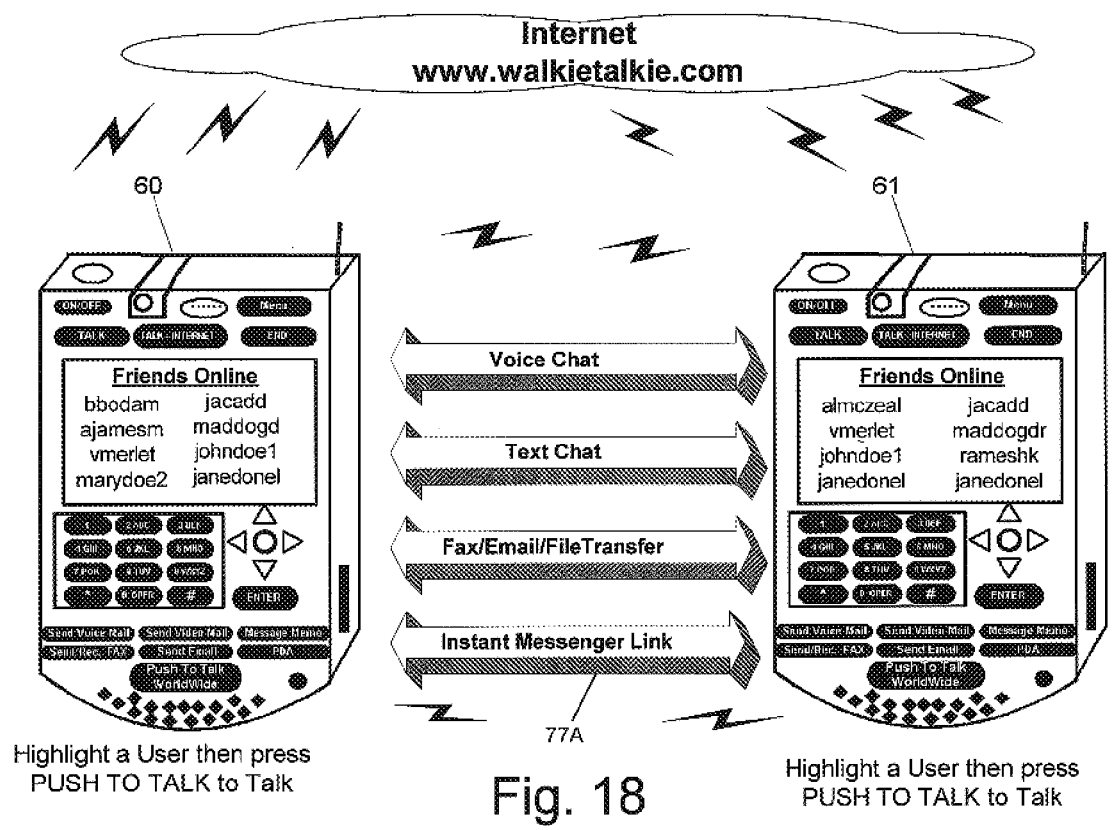

FIG. 18 is a conceptual view of how the invention utilizes a group packet radio protocol, Instant Messenger, and the Push-to-talk function button to commence a voice/text chat session in real time with any other selected user, device, or computer on the network which enables effective intercommunications via wireless Instant Messenger Link 77A between devices connected wirelessly via the internet.

Figure 19:
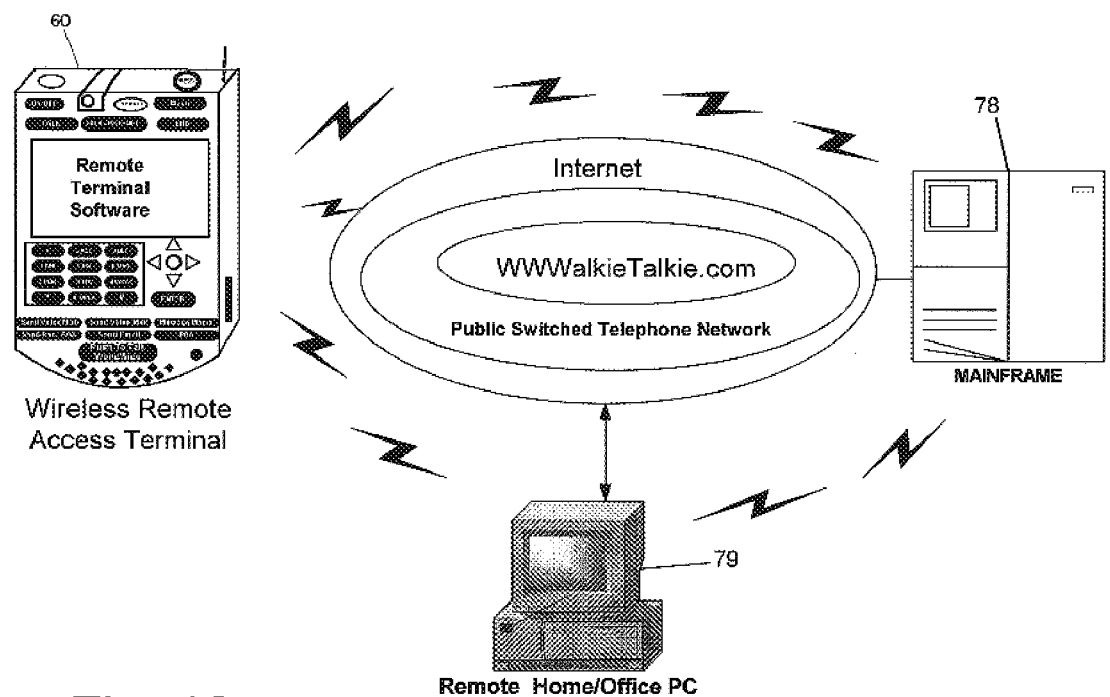

FIG. 19 is a conceptual or general view of how the high speed computing invention can operate over an internet domain and may be used as an independent computer terminal enabling high speed connections and access to remote computers such as mainframes, home, office computers and networks attached to the internet or the Public Switch Telephone Network or through on an ongoing VoIP server and internet domain called wwwalkietalkie.com.

Figure 20:
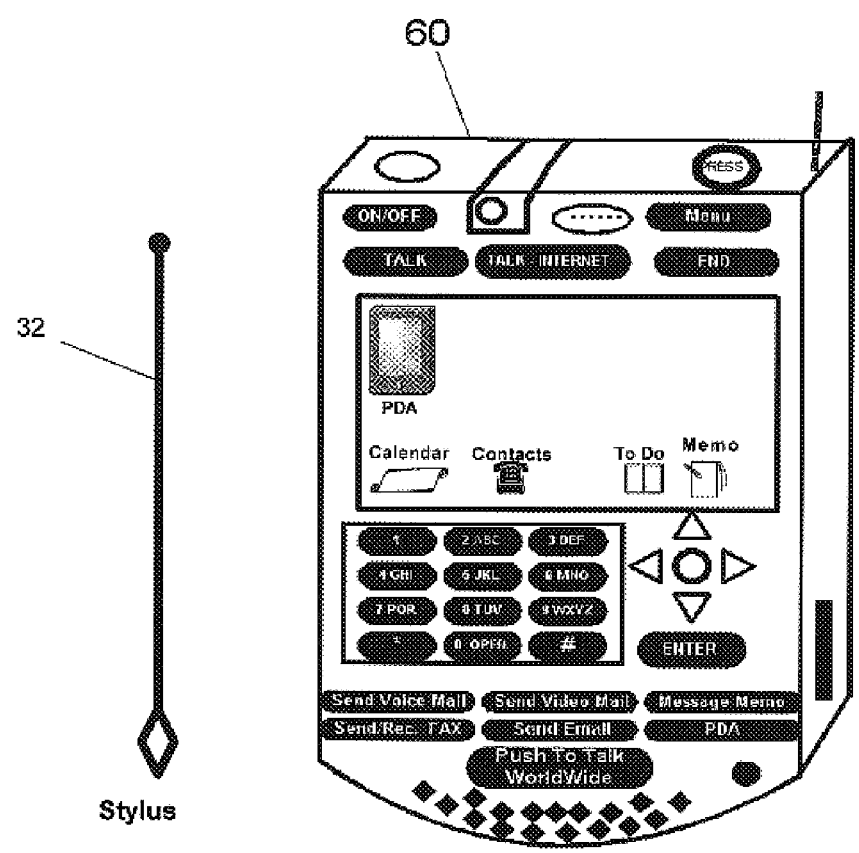

FIG. 20 shows a perspective view of invention 60 shown as a Personal Digital Assistant (PDA) together with the stylus pen 32 and illustrates the capability of the device to execute the Palm OS™. Operating System, the Windows CE™ operating system or the Windows Pocket PC 2002™ operating system.

Figure 21:
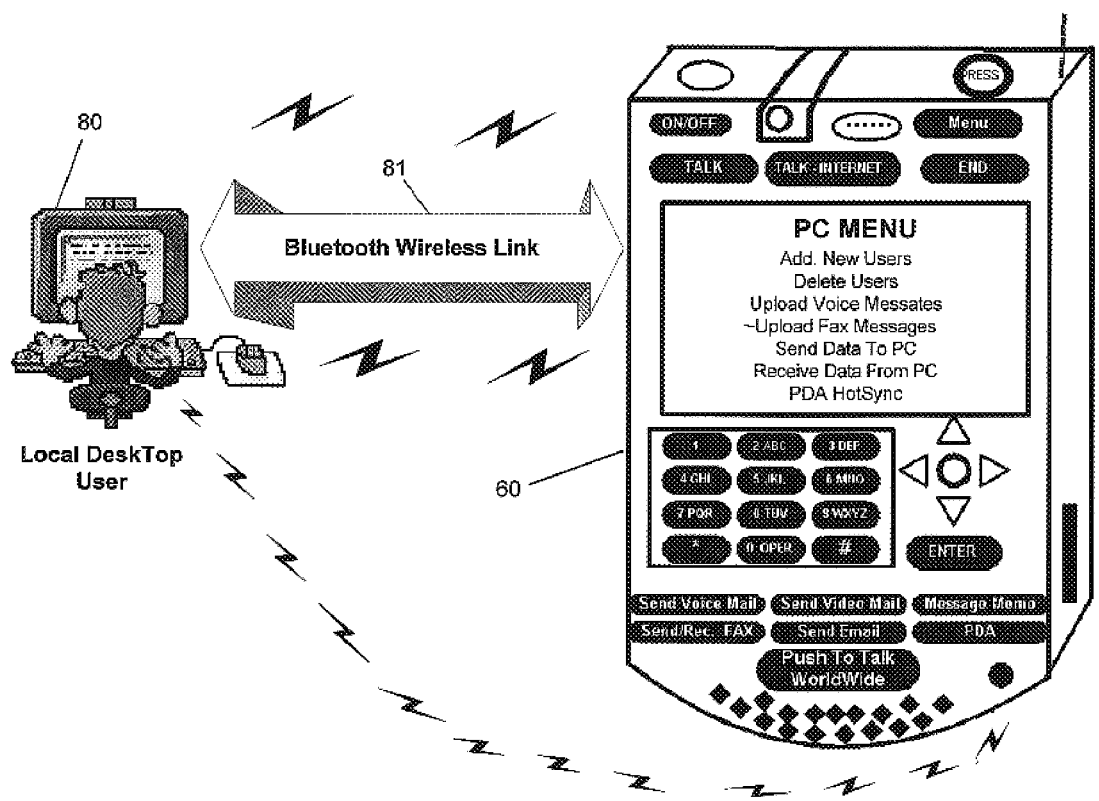

FIG. 21 is an exploded view 61 of the invention and illustrates how intercommunications may take place over a bluetooth wireless link between a desktop personal computer and the invention without the need for physical cables or wires to perform hot synch operations, run programs, and to upload, download, or exchange data and information between the Personal Computer and the World-Wide-Walkie-Talkie invention.

Figure 22:
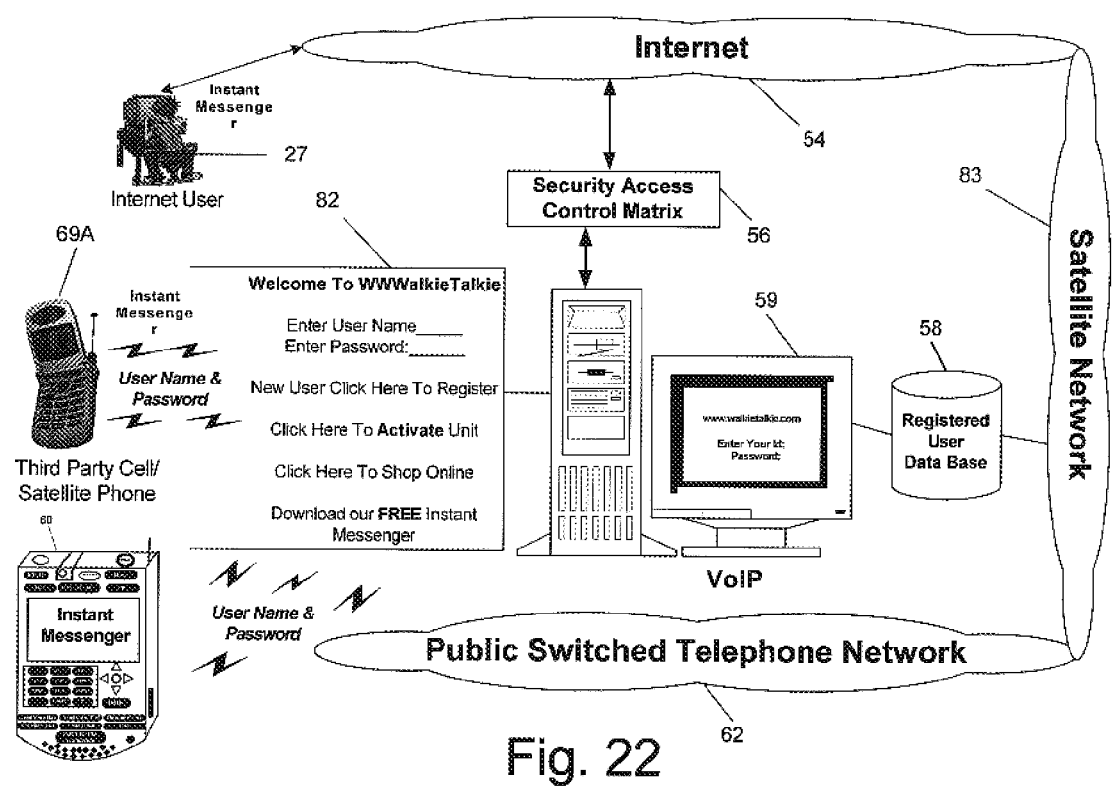

FIG. 22 shows an illustration of World-Wide-Walkie-Talkie high speed data network and illustrates how authorized devices equipped with instant messenger software may automatically connect to and automatically transmit log on information to a high speed internet based VoIP secure server enabling the devices to be instantly present on the network from anywhere in the world and available for instant messaging and enhanced Quality Of Service (QoS) telephone or inter-terminal conversations and data communications between devices and users of the internet and the Public Switched Telephone Network.

Figure 23:
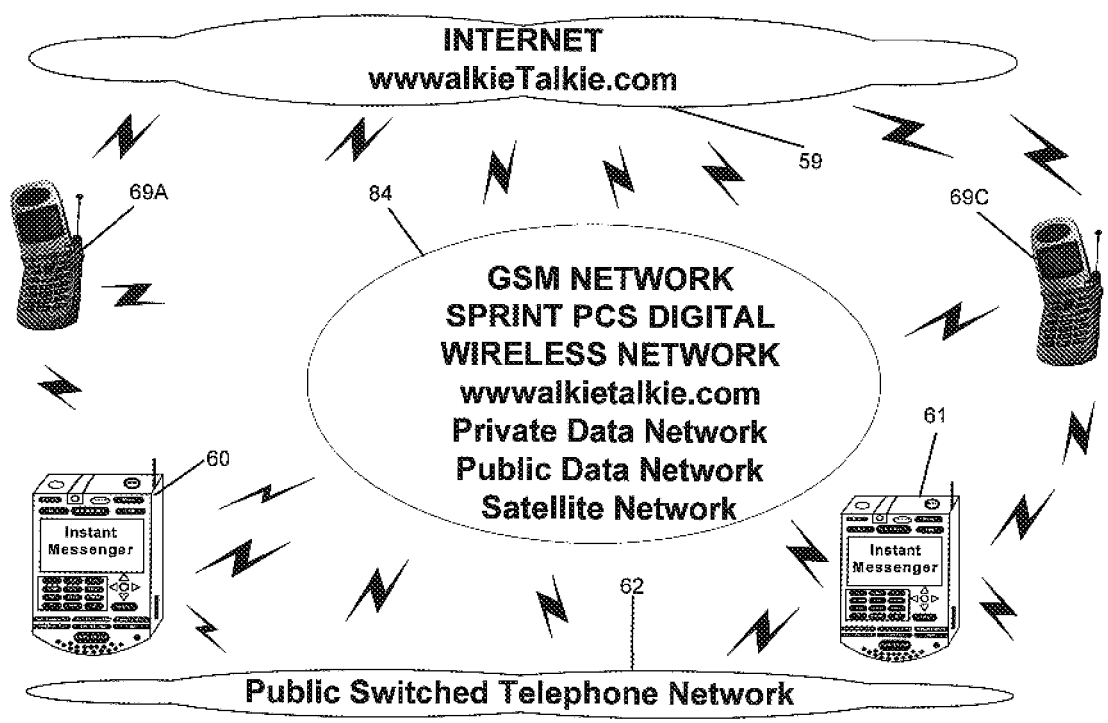

FIG. 23 depicts a general view of the wireless network and illustrates the worldwide compatibility and diversity of networks on which the invention is capable of operating including private data networks, heterogeneous telephone and public data networks 84 including the GSM network and the PCS digital network in the United States.

Figure 24:
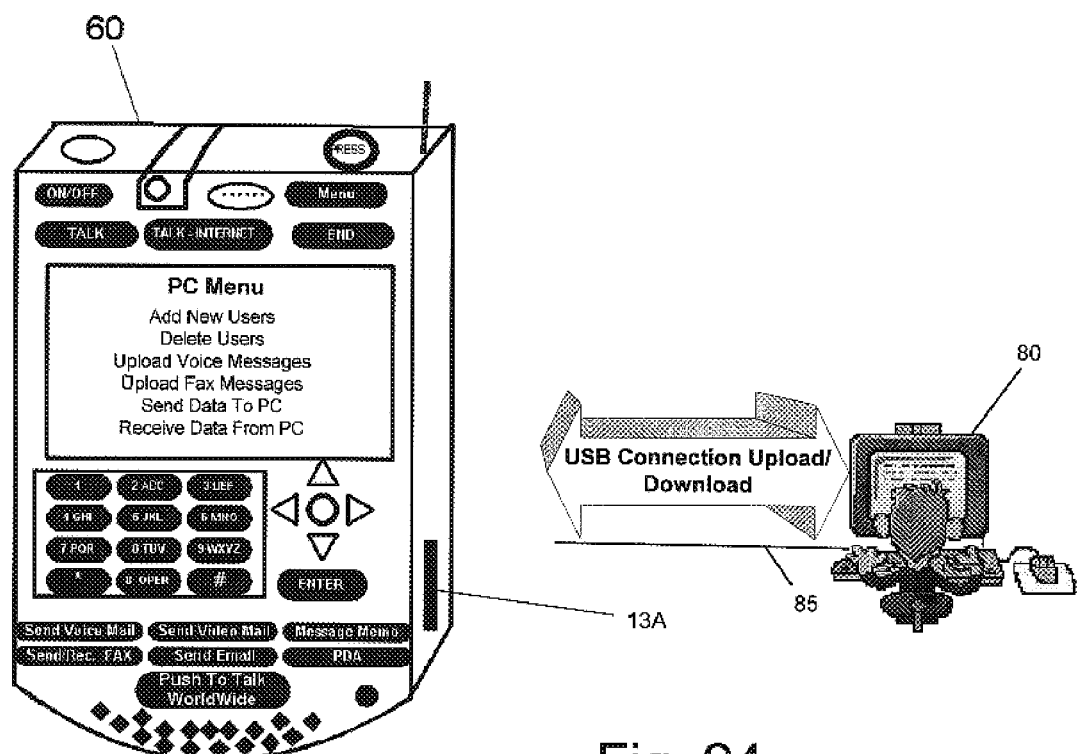

FIG. 24 is an exploded view of the invention illustrating the capability and use of the built-in Universal Serial Bus (USB) port and interconnection using a USB cable 85 to a user's desktop computer 80 available for connectivity to any compliant USB device.

Figure 25:
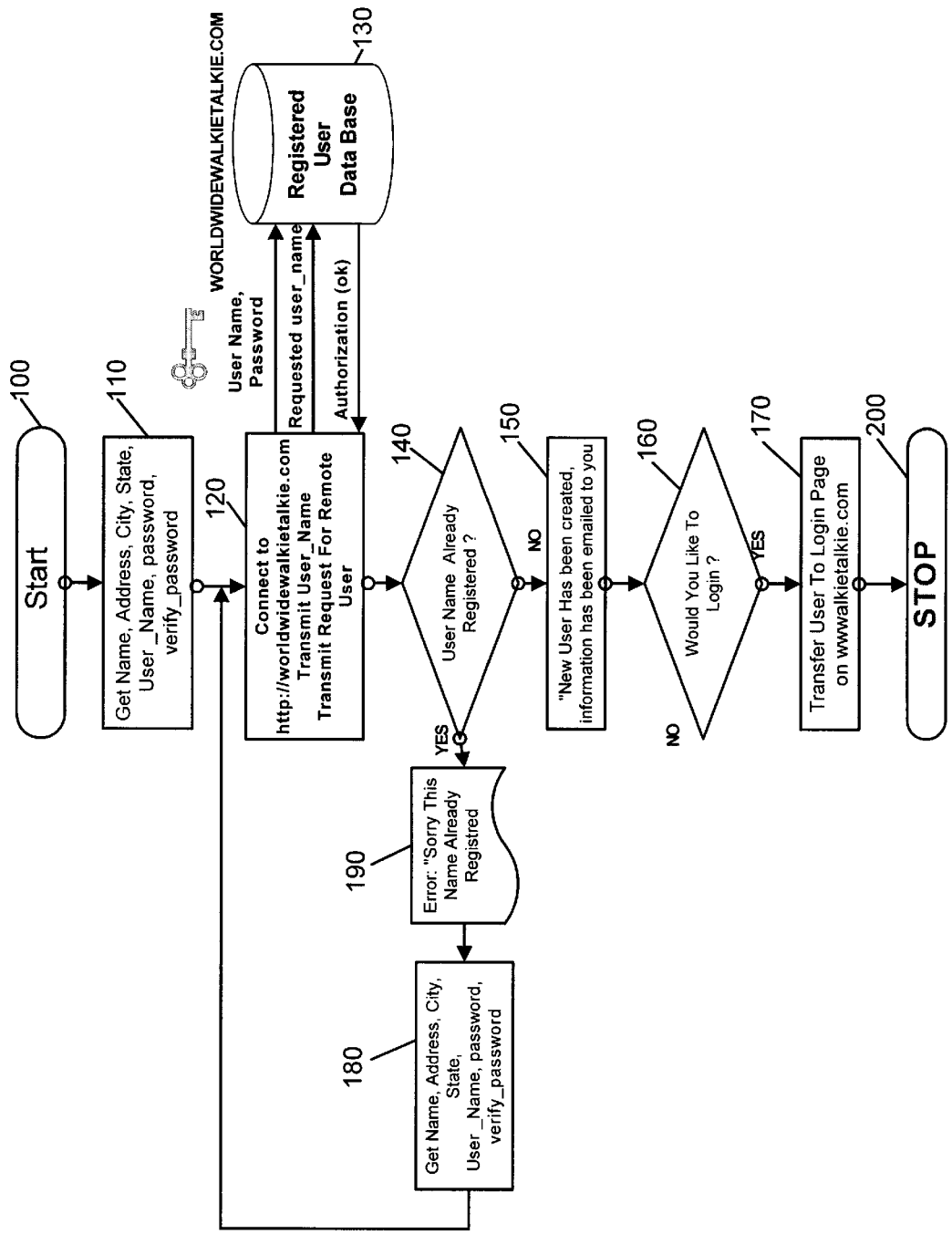

FIG. 25 is a flowchart illustration of the process of registering a new user or World-Wide-Walkie-Talkie unit with the data network responsible for distributing the Voice Over internet Protocol and chat services and which once successfully registered becomes a known user or device available to the network VoIP server for subsequent robust voice and data intercommunications to the Public Switched Telephone Network and registered users of the network.

Figure 26:
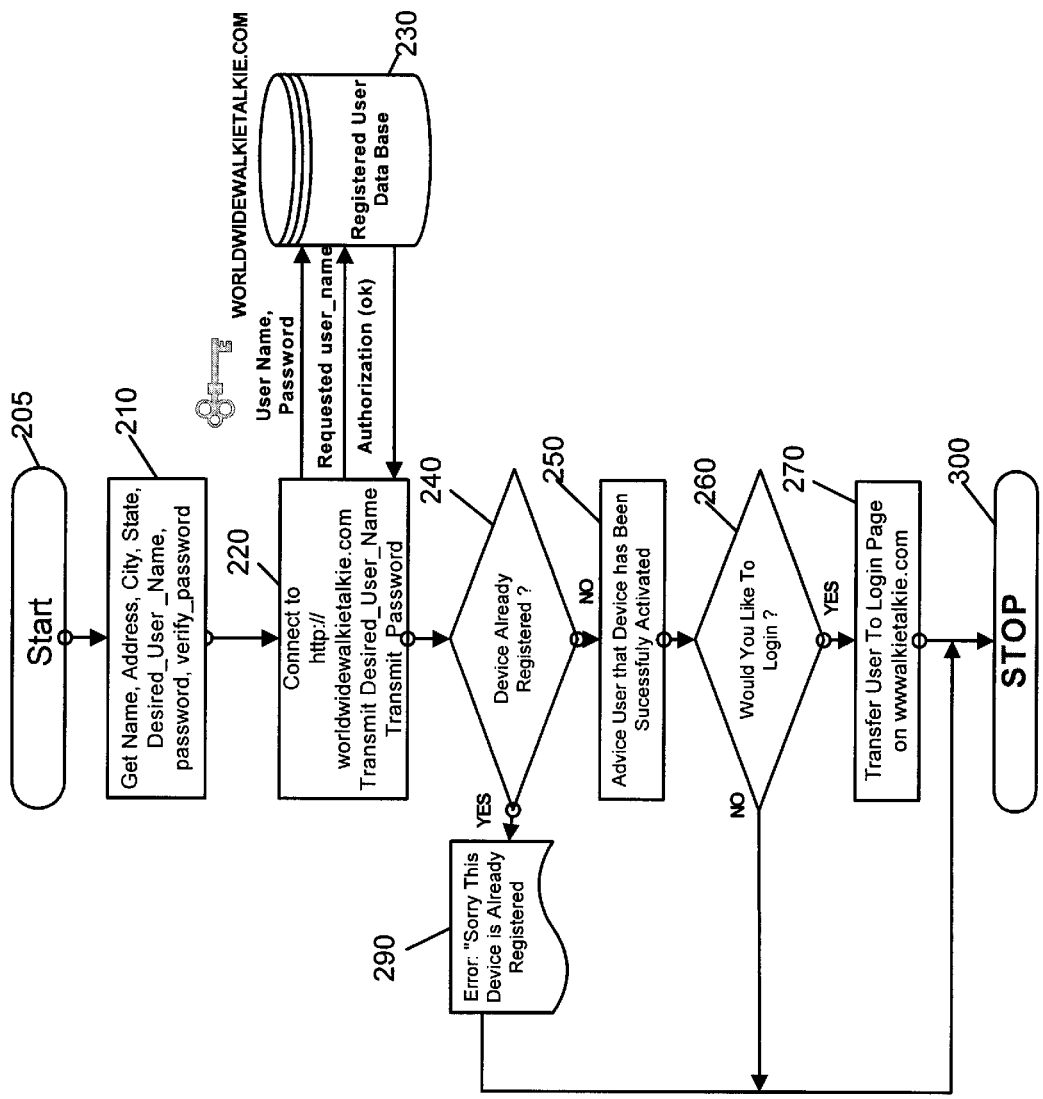

FIG. 26 is a flowchart illustration of the process of activating a new unit for use on the data network which once registered becomes a known device which may be assigned an internet protocol (ip) address by an internet VoIP server that enables the device to be authorized to connect, intercommunicate and utilized the special services of the network.

Figure 27:
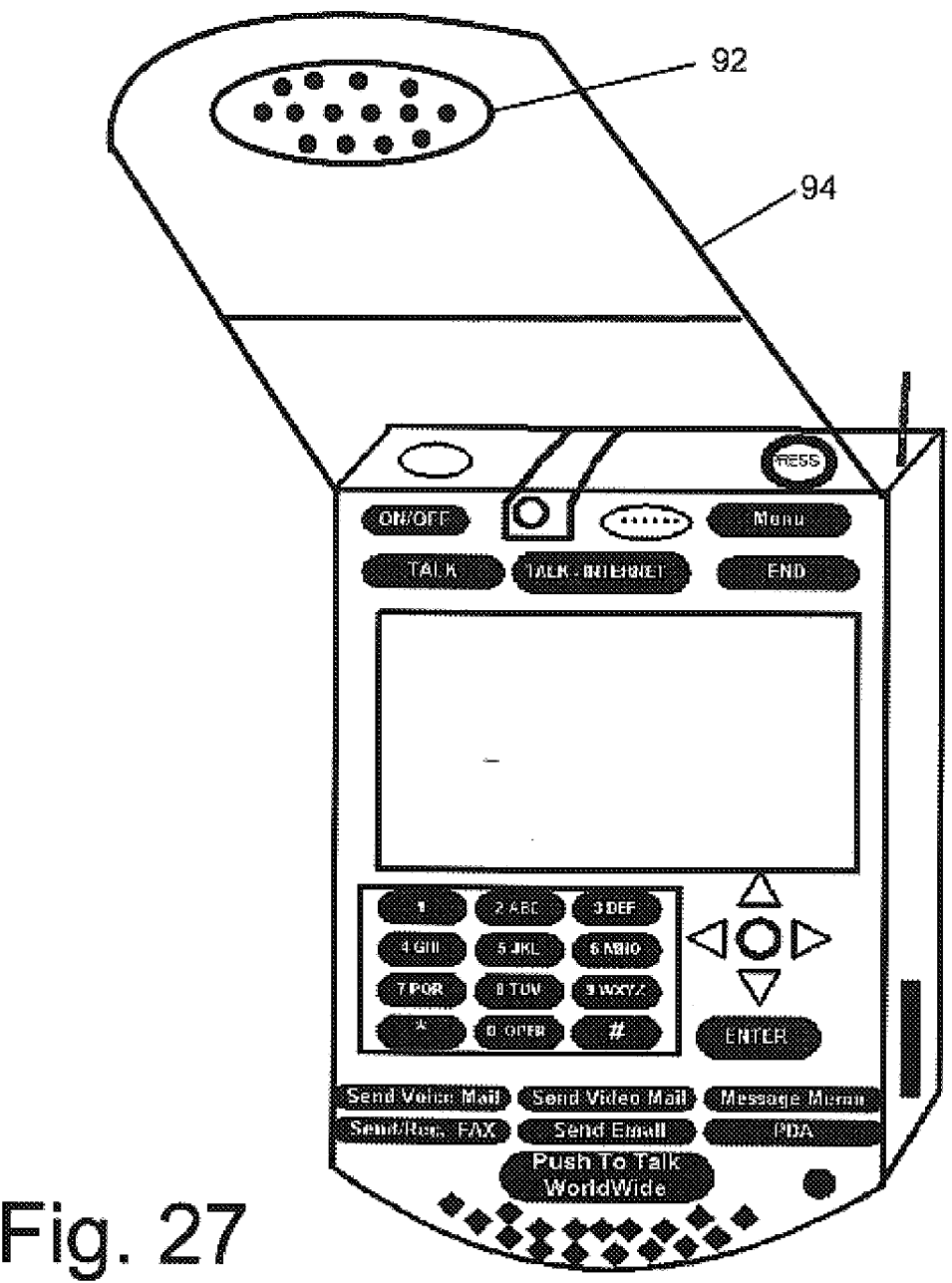

FIG. 27. is an alternate perspective view of the invention embodied as flip phone device which depicts the device with a flip cover 94 and built-in speaker 92 used for hearing telephone conversation from another telephone, computer, device or remote user of the data network.

Figure 28A:
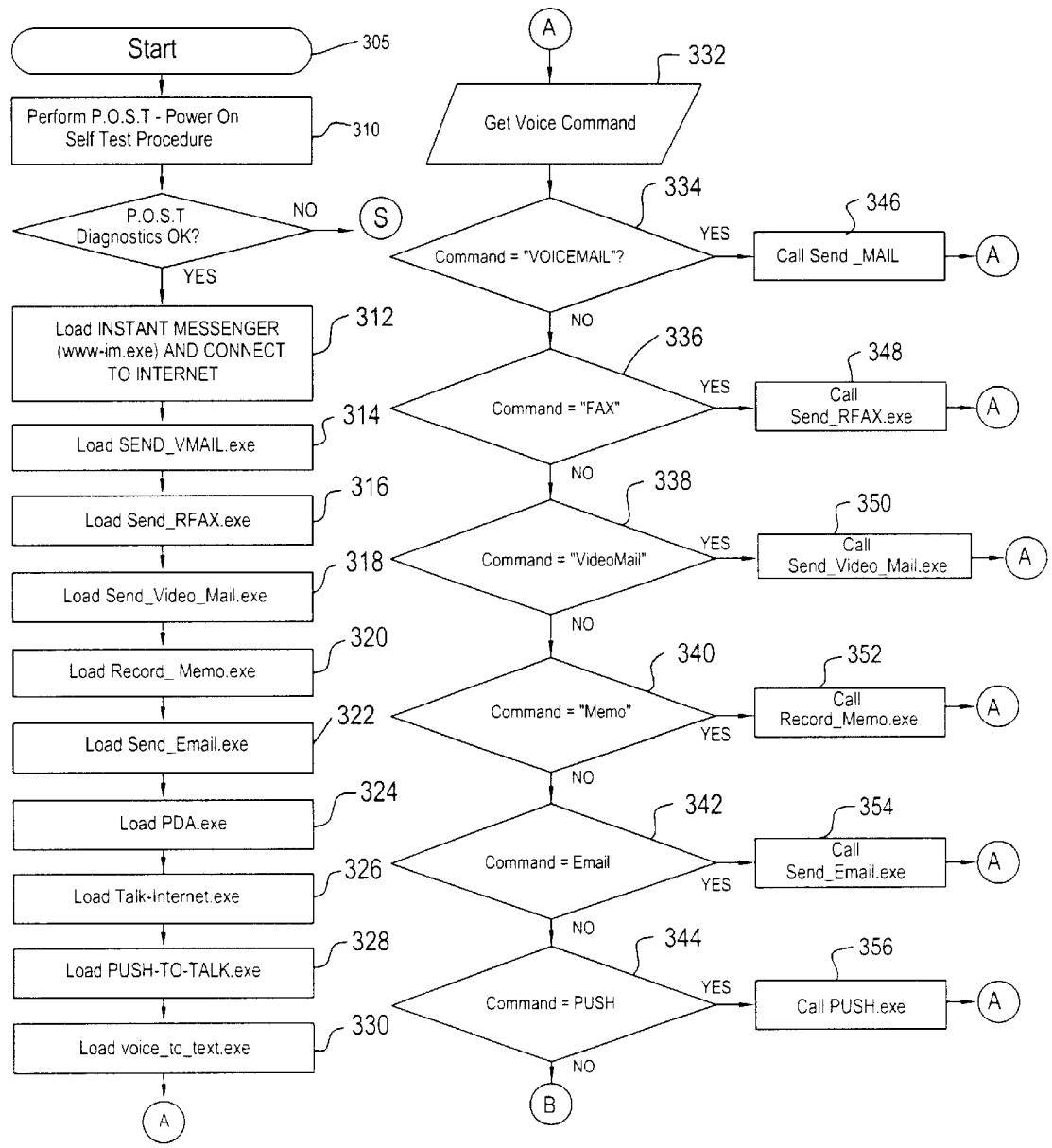
Figure 28B:
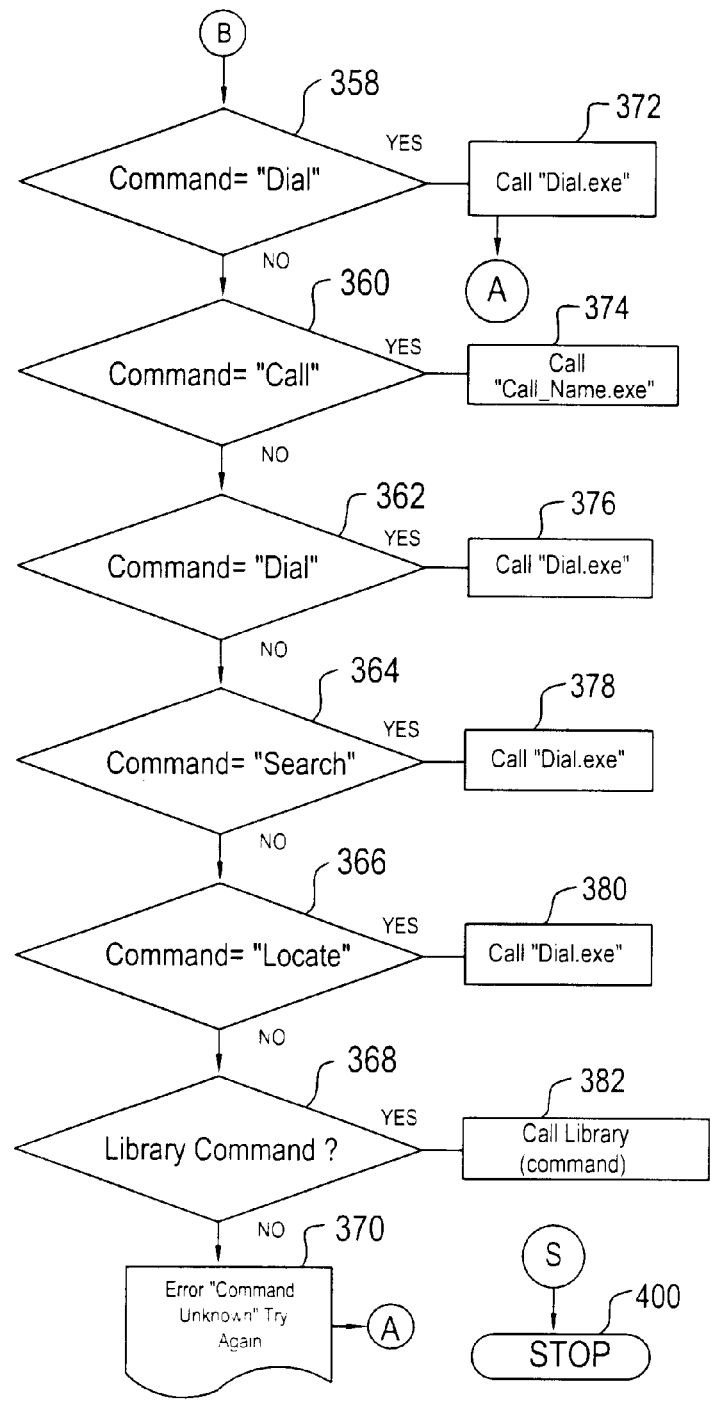

FIG. 28 is a flowchart representation and description of the built-in basic Operating System (WWW-OS) used to operate and control processes that invoke system and user programs within the invention and which also controls data connections to the remote internet server, telecommunications functions, Power On Self Test (POST) and other built-in program function inherent to the invention's design.

Figure 29:
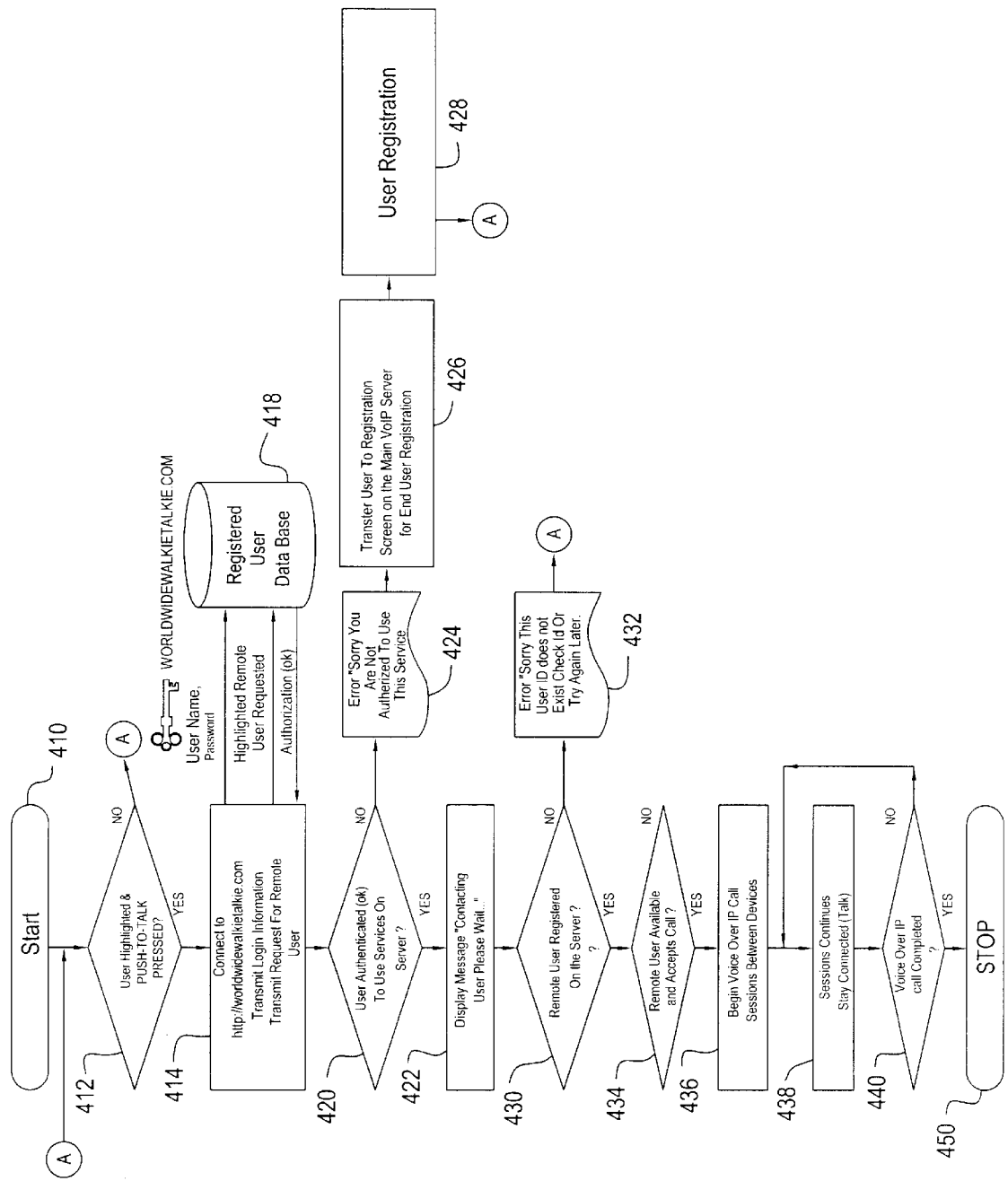

FIG. 29 is a flowchart representation of the built-in PUSH-TO-TALK function which interacts with the built-in instant messenger program used to immediately and instantaneously initiate a chat or talk session between two devices by automatically logging in and connecting to a VoIP internet chat server, authenticating users, and initiating two-way voice communication sessions between devices connected on the same network.

Figure 30:
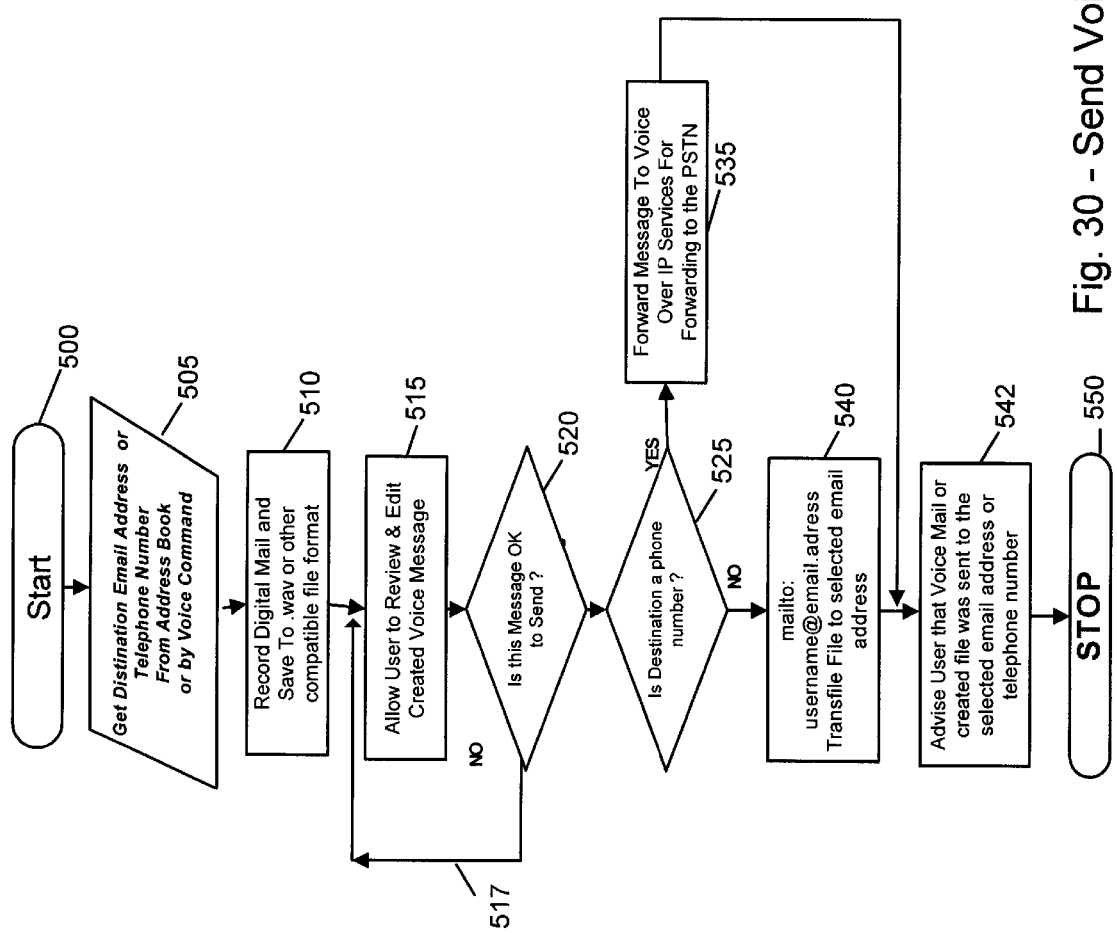

FIG. 30 is a flowchart and logical flow diagram of the SEND VOICE MAIL function activated when the SEND VOICE MAIL button is depressed on the unit that is capable of transmitting a pre-recorded digital message or email attachment message across the internet or other private data network using Simple Network Mail Protocol (SNMP), File Transfer Protocol (FTP),or any internet protocol or high throughput means to deliver a digitized message to internet users, or the Public Switched Telephone Network.

Figure 31:
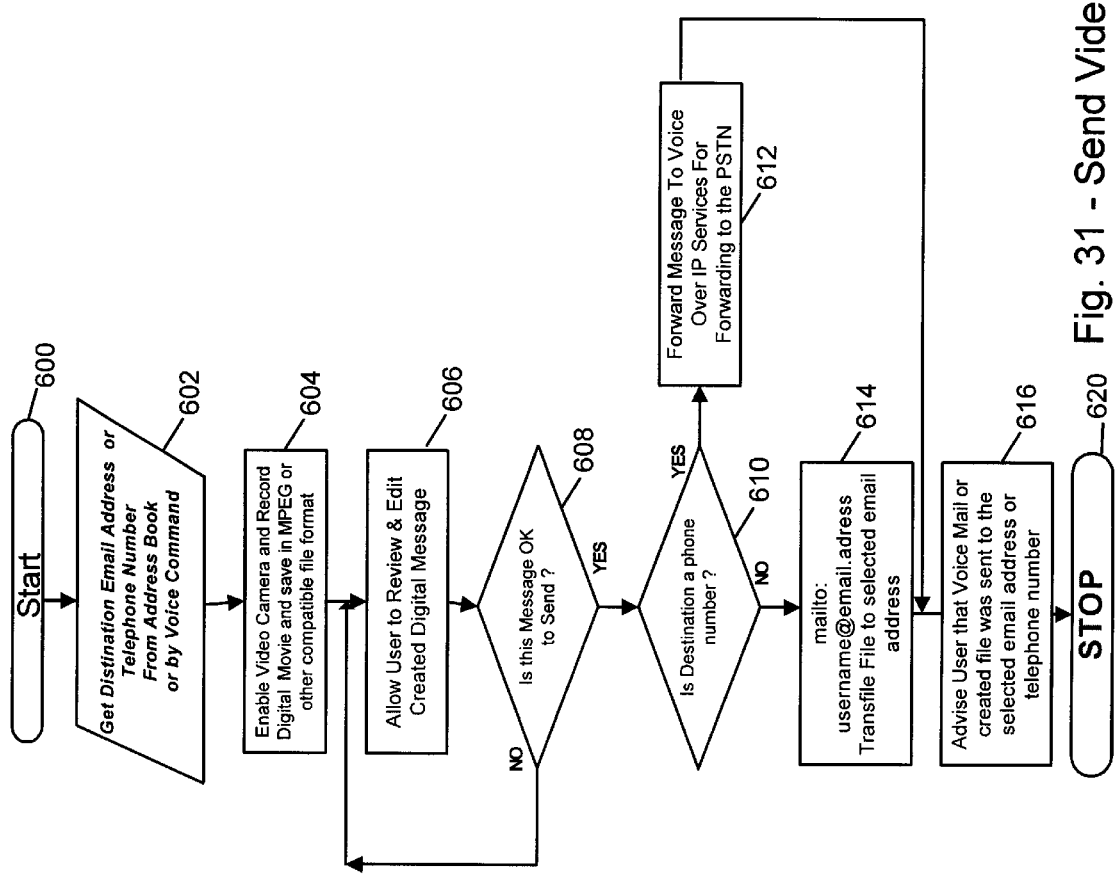

FIG. 31 is a flowchart illustration and logical program flow diagram of the SEND VIDEO MAIL program process activated when the SEND VIDEO MAIL button is depressed which in turn activates the built-in real time digital web camera which provides pre-recorded live video for subsequent data transfer to another unit, internet user, cell phone, email address or any other computing device capable of receiving MPEG, wav, or sound files.

Figure 32:
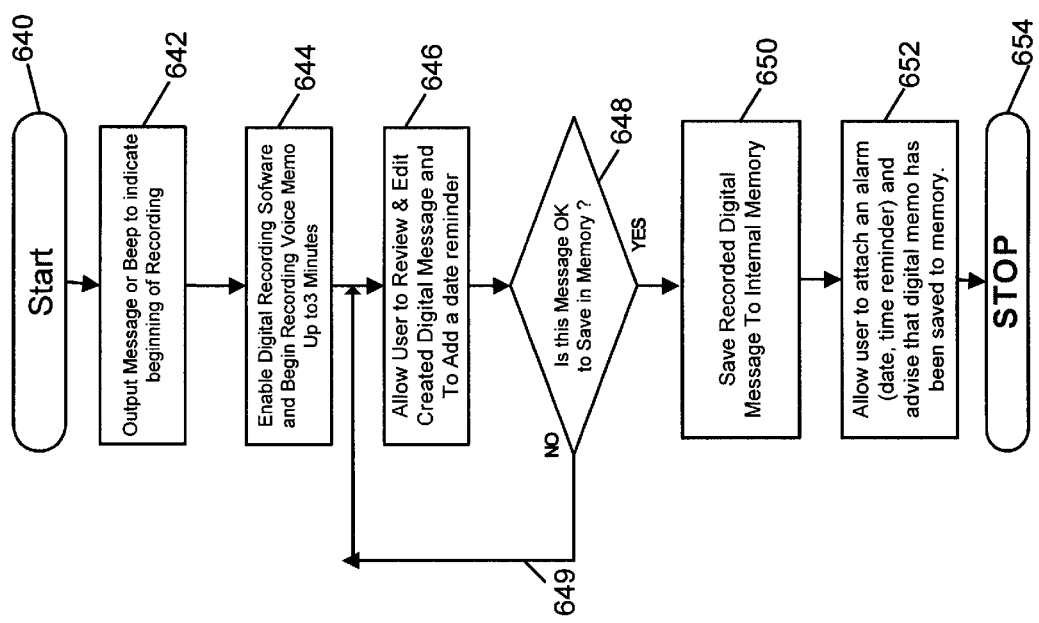

FIG. 32. is a flowchart illustration and logical program flow diagram of the RECORD MEMO program which allows an end user of the invention to record digitally produced voice memos and subsequently save the digitally produced recording to internal mass memory storage on the device for later retrieval and processing.

Figure 33:
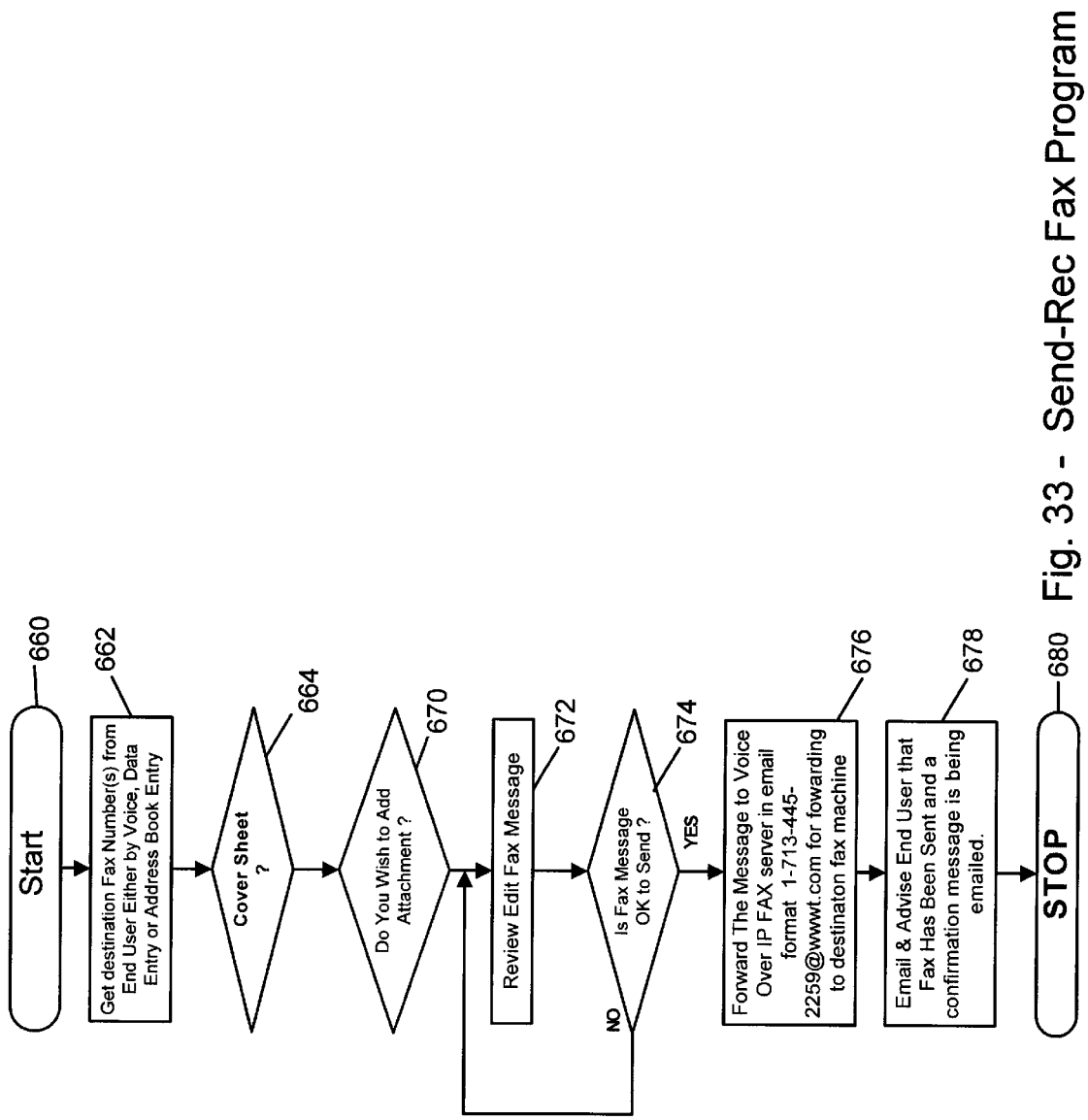

FIG. 33 is a flowchart and illustration and logical program flow diagram of the SEND/REC FAX program process activated when the SEND/REC FAX button is depressed which in turn activates an internal function used to wirelessly transmit and receiving faxes providing a means for fax messages to be forwarded to any fax machine in the world via VoIP/fax gateway server which host the network or which may also be transmitted via a third party fax server such as j2.com that allows for the fax transmission over an ip network to a remote fax machines located anywhere in the world.

Figure 34:
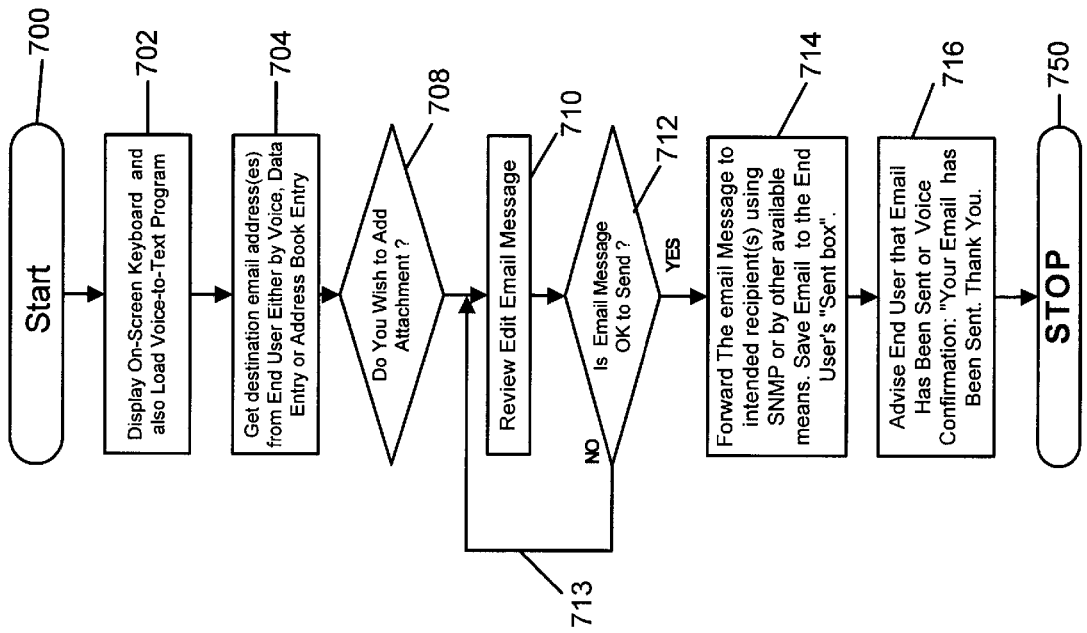

FIG. 34 is a flowchart illustration and logical program flow of the SEND EMAIL function program process activated when the SEND EMAIL function button is depressed on the invention that in turns launches a special built-in Voice-to-Text processor used for composing text based messages which may then be edited with the use of the built-in onscreen keyboard or portable keyboard (not shown) and subsequently transmitted to the final internet recipient via Simple Network Mail Protocol.

Figure 35:
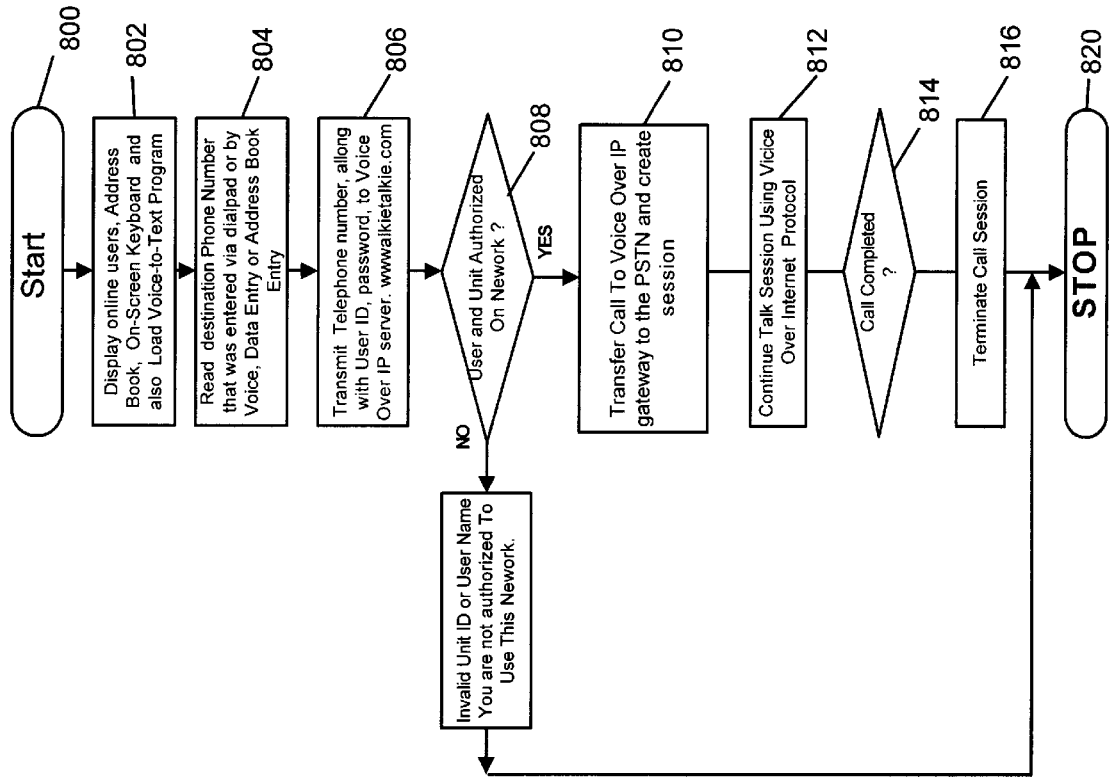

FIG. 35 is a flowchart illustration and logical program flow of the TALK-INTERNET function program process activated when a number is dialed on the invention's keypad and the TALK-INTERNET button is depressed which in turn activates an internal function used for wirelessly transmitting and receiving Voice Over Internet Protocol telephone calls via the internet server and which continues the VoIP session call until the telephone conversation or call session has been terminated by the user(s).

Figure 36:
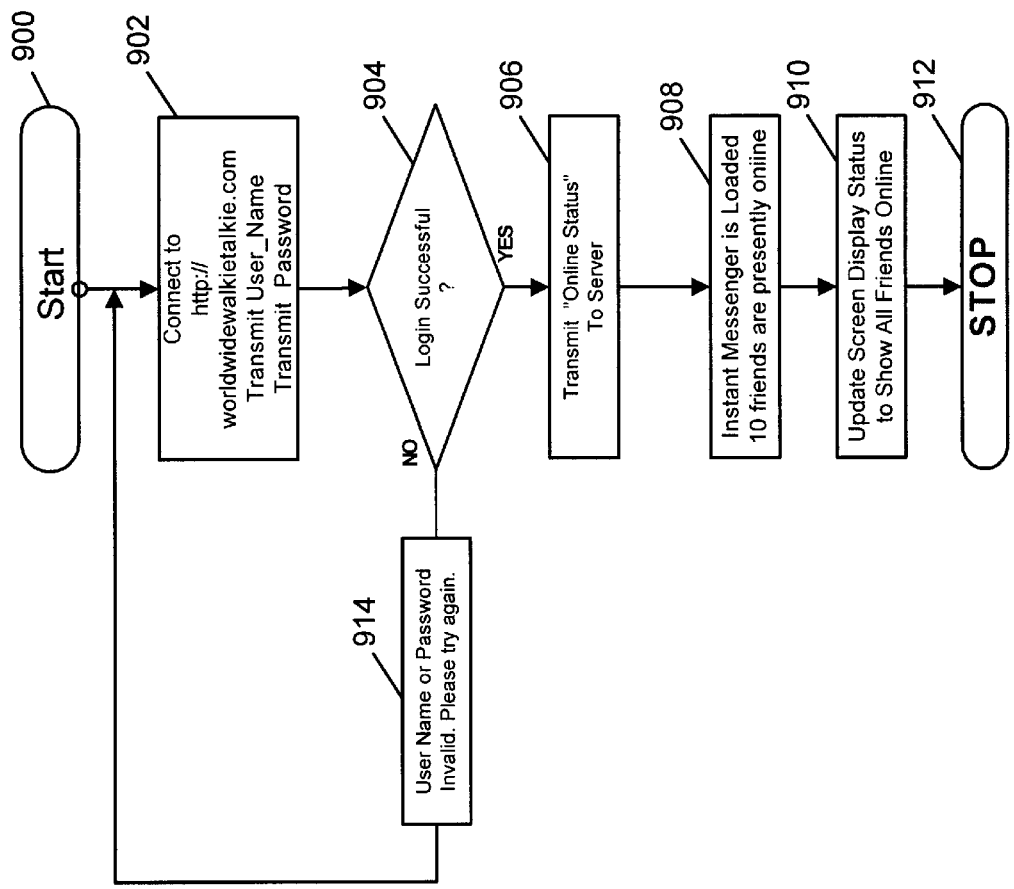

FIG. 36 is a flow chart illustrating the basic logic and functionality of the built-in INSTANT MESSENGER software that is automatically launched by the Operating System once the unit is powered on that makes a user and voice session available on the network for instant intercommunications between other world wide walkie talkie licensed instant messaging devices and registered users of the worldwide-walkie-talkie.com high speed data network.

Figure 37:
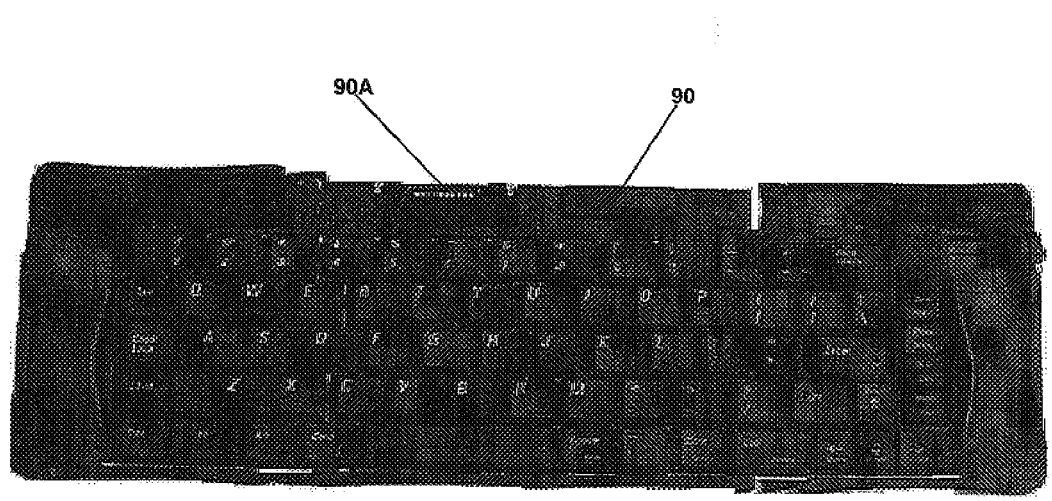

FIG. 37 is a photographic view of the fully expanded compact portable keyboard 90 that can be used with the hand held invention and which also provides a data/power port 90A connection for the keyboard interfacing and for applying power to keyboard.

Figure 38:
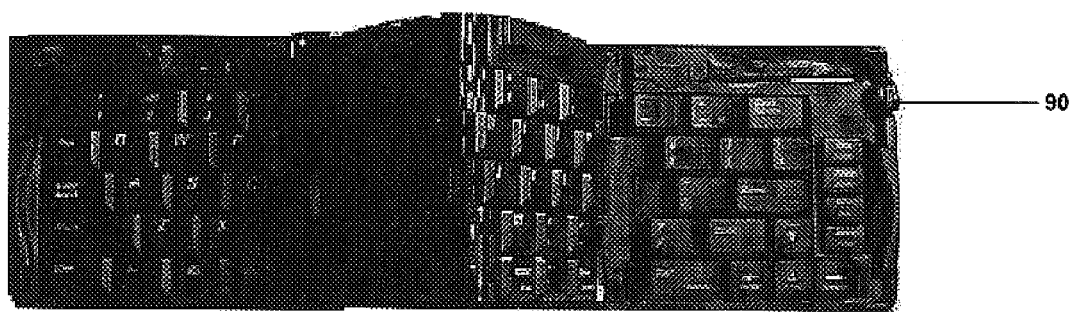

FIG. 38 is another photographic full view of the expandable portable keyboard 90 in a slightly folded position illustrating its flexibility to be folded and unfolded to a standard size computer keyboard.

Figure 38A:
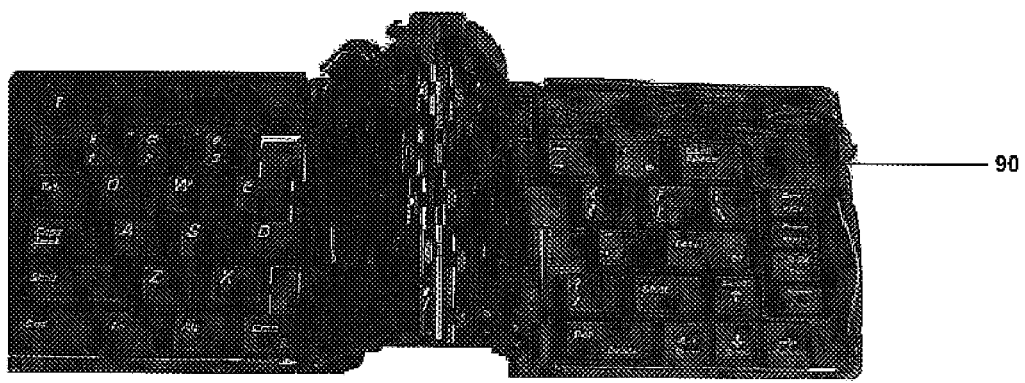

FIG. 38A is another photographic full view of the same expandable keyboard demonstrating yet a deeper folding position illustrating how the keyboard actually folds up for compact storage.

FIG. 39 is a photographic full view of the expandable portable keyboard 90 fully folded and ready for storage illustrating how a full size keyboard can be conveniently stored in a compact area such as a brief case or purse for future use.

FIG. 39A is a photographic view of the expandable portable keyboard 90 and a generic wireless device 61A similar to the World-Wide-Walkie-Talkie illustrating how the World-Wide-Walkie-Talkie invention would mount on the keyboard for full keyboard use for ease of typing or entering data to the invention.

FIG. 40 is an overall perspective view of the configuration of the high speed wireless invention deploying the enhanced Net2phone™ network quality VoIP infrastructure and illustrating the global intercommunications capability between internet users, the Public Switched Telephone Network and the World-Wide-Walkie-Talkie invention and data network.

FIG. 41 illustrates the graphical user interface program or virtual world-wide-walkie-talkie residing on a personal computer or the internet server side that authorized users would see once successfully logged into the data network and which generally provides internet and pc users with the communication services provided by the actual physical wireless device.

Reference Numerals

| Part Name | Part Name |
|---|---|
| 1A - cellular/satellite antenna | 22 - Multi-Media Loud Speaker Microphone |
| 2 - physical housing | 23 - Power source connection port |
| 3 - on/off power button | 24 - MENU Function Key |
| 4 - Talk button | 25 - mini listening speaker |
| 5 - TALK-INTERNET Function button | 26 - bluetooth wireless stereo headset |
| 5A - Snap Video Button | 27 - Internet User |
| 6- END Button | 27A - Onscreen Keyboard |
| 32B - HotSync Button | 28 - Bluetooth Compatible Laptop |
| 6A - Belt Clip | 29 - Bluetooth Compatible Laser Printer |
| 7 - rotating digital web camera | 30 - Bluetooth Wireless Connection Link |
| 8 - Liquid crystal display video screen | 31 - Bluetooth Compatible Scanner |
| 9 - Stylus storage compartment | 32 - Stylus; 32A AC Power Charger |
| 10 - dial pad | 33 - 12 Volt DC Power Adapter |
| 11 - revolving mouse ball | 34 - Microchip Circuit Board |
| 12 - Navigational keys | 35 - Instant Messenger resident program |
| 12A - Battery Compartment | 36 - SEND EMAIL program |
| 13 - ENTER function key | 37 - RECORD MEMO program |
| 13A - Universal Serial Bus (USB) Port | 38 - PUSH-TO-TALK program |
| 14 - RECORD MEMO function key | 39 - Personal Digital Assistant program |
| 15 - Personal Digital Assistant Function Key | 40 - A.I. Voice-to-Text interpreter |
| 16 - BlueTooth Infrared wireless port | 41 - World and U.S. Maps Data Base |
| 17 - SEND EMAIL function button | 42 - Satellite Communications Chip |
| 18 - SEND VIDEO MAIL function Key | 43 - Offline Mass Storage Memory |
| 19 - SEND VOICE MAIL functions Key | 44 - www-OS Operating System |
| 20 - Send/Rec. FAX function key | 45 - Mobile Intel Pentium 4 Processor |
| 46 - Java User Programs Library | 71 - Global Positioning Satellite #2 |
| 47 - Java Virtual Machine | 72 - Global Positioning Satellite #3 |
| 48 - Send/Rec. FAX program | 71A - INSTANT MESSENGER VOIP CONNECTION TO SERVER |
| 49 - Voice Command Library | |
| 50 - Send Receive Video Mail | 73 - cellular Communications Tower #1 |

-continued
Reference Numerals

| Part Name | Part Name |
|---|---|
| 51 - Send Receive Voice Mail | 74 - Cellular Communications Tower #2 |
| 52 - 512 MB Real Time Mass Memory Chip | 76 - Unit #1-Instant Messenger Program |
| 54 - The Internet | 77 - Unit #2-Instant Messenger Program |
| 55 - High Speed Connection To the Internet | 77A - Instant Messenger Wireless Link |
| 57 - High Speed Voice Over IP/FAX Server | 78 - Mainframe Computer |
| 58 - Online Registered User Data Base | 79 - Remote Home/Office P.C. Computer |
| 59 - Instant Messenger GRPS Wireless Login | 80 - Local Desktop User |
| 60 - WORLD-WIDE-WALKIE-TALKIE-unit #1 | 81 - Blue Tooth Wireless Link |
| 61 - WORLD-WIDE-WALKIE-TALKIE-unit #2 | 82 - Internet Server Login Program |
| 62 - PUBLIC SWITCHED TELEPHONE NETWORK | |
| 63 - REMOTE INTERNET USER | 83 - Satellite Network |
| 64 - INTERNET Service Provider | 84 - Multiple Heterogeneous Networks |
| 65 - High Speed Internet Backbone Connection | 85 - Universal Serial Bus (USB) Cable |
| 66 - Java Applet Program | 92 - Mini Loud Speaker for Flip Phone |
| 67 - High Speed GRPS Wireless Connection | 94 - Flip Cover |
| 68 - Low Orbiting Satellite | 99 - Voice Over IP Backup Gateway |
| 68A - Fax Machine | 100 - telephone |
| 69 - Earth Satellite Station | 102 - Internet Protocol (IP) phone |
| 70 - Global Positioning Satellite #1 | |

Theory Of Operations

In theory and concept, this wireless computing device functions exactly like a computer attached to the local or wide area network which has the capability of communicating with other users on the network (if their terminals are also attached and logged in to the same network). The invention also function over a standard telephone network, and may be either used as a compatible cellular and satellite telephone.

The Push-to-Talk or instant messaging idea is also a well known concept by the computing industry although it has never been embodied as in the present invention. This gives end users and customers the added functionality of simply pressing a button only once in order to initiate a communications sessions between devices attached to the network or any internetworks including but not limited to the internet. This push-to-talk button does not function like a standard radio frequency based walkie talkie. Rather, it is designed to be program that initiates a communications session over the internet or other network between two or more users.

Instant Messaging Freedom

Much of the functionality of the invention is based upon wireless Instant Messaging and offers the freedom to chat over a data network or the internet. Instant messaging has indeed enjoyed phenomenal success as a person-to-person communication tool; and in some instances, it has supplanted email as the preferred means of online communication. Many developers are now using this technology for application-to-person and application-to-application communication. Until recently, only a handful of service providers controlled this technology. Currently, the popular instant messaging services are communication islands based upon proprietary protocols. Implementers face a difficult decision: to support multiple protocols or lock into a single one. Regardless of the choice, the implementer must depend on a server owned by the instant messaging (IM) service provider such as America Online™ However, Open protocols offered by this invention can help developers break out of the proprietary trap. There are various advantages. Open protocols encourage development of competing implementations. They encourage widespread adoption of a common protocol, thus preventing the development of communication islands and isolationist approaches to service provisions. In many ways, open protocols made the Internet possible. In the instant messaging realm, open protocols ensure that the interoperability issues of closed systems and protocols won't stunt the growth of IM-based services. This invention also deploys Jabber standards, which is generally defined to be an open protocol for instant messaging and presence services. Jabber has the potential to break the proprietary grip on instant messaging services.

The invention implements a built-in Instant Messaging system running over a high speed computer based wireless device based on internet protocol (ip). The high tech method is suitable for communications from anywhere in the world using the internet and the instant messenger. The most promising aspect of the invention is that it enables customers to instantly communicate in a variety of ways, to place high quality of service (QoS), low cost, Voice Over Internet Protocol (VoIP) calls via the internet or the telephone network. Instant messaging voice/text conversations can be carried on between one or more users using the concept of a wide area network.

Local/Wide Area Networking and instant messaging is well known to the computing industry and is widely used today by many internet users.

Contrary to its name, this invention does not function exactly like a radio based Walkie Talkie. However, it does allow customers, or users of the network or the internet to "Walk and Talk", and communicate on a world wide basis using the internet, satellite communications, cellular communications, and an of course the voice/text instant messaging system.

As previously stated, the device also functions as a regular cellular telephone, or satellite telephone and calls may be placed from anywhere on earth using the internet or a private voice/data network. The internet is not necessarily required for communications, but it is preferred due to the low cost and many other advantages offered by internet connectivity.

The invention serves today's busy professional and the need to instantly communicate. Many of today's computing technologies are built into one convenient package which allow customers the freedom of worldwide communications and hand held robust computing power that fits in the palm of one's hand. Some immediate benefits derived are:

(a) The use of a Personal Digital Assistant (PDA) Compatible with Palm's OS™ the Windows CE™ or Windows Pocket PC 2002™ handheld PDA operating systems, and, (b) Cost effective Integrated Digital Telephone and Instant Messaging Services, and, (c) The use of handheld computer for remote operations to other computers or the customers home/office based computer network, and, (d) The use of digital voice mail transmission device which allows customers and end users the ability to transmit voice or video mail to any device in the world independent of any service provider.

THE GENERAL IDEA OF THE INVENTION

The general idea behind the invention is to provide customers and users with instant voice messaging, advanced on-the-go wireless computing power, which uses Voice Over Internet Protocol low cost communications, and to make this communication available on a world wide basis using the internet.

Ideally, the device should be able to connect from anywhere on earth in order to communicate to anywhere in the world, which is the underlying purpose of the satellite phone functionality. The ability to instantly communicate with any other user on the Internet or the Public Switched Telephone Network is a very attractive asset and major objective of the invention.

For example, a customer located in a remote area of the world such as in the middle of the Atlantic Ocean (on a cruise for example) would still be able to connect and communicate either by voice, fax, email, video/voice mail, etc. with another telephone or computer attached to the internet. Additionally, there has always been a need to have information at one's fingertips and this is evident by the explosion of the many Personal Digital Assistants (PDA's) and laptop computers on the market. The built-in functionality of the PDA provides customers with on-the-go power and computing applications. The use of network communications, the internet, and other established communications strategies present low cost effective and alternative communications. This invention establishes itself to be one of the most useful communications devices ever known to mankind, or the computer and telephony industry. The many novel and unobvious useful features stated herein are beneficial to individuals, and companies and forms the basis for a world wide telecommunication network.

DETAILED DESCRIPTION OF THE INVENTION & PREFERRED EMBODIMENTS

Preferred Embodiment—Description & Operation

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

During the discussion of the detailed description and operation of the invention the term "World-Wide-Walkie-Talkie" is used extensively to refer to both the wireless invention and the data network. The individual functions of the invention and the methods of constructing the data network are explained in detailed below. Sometimes references are made to flow charts (which are part of the specification) in order to better understand different processes and programs used with the invention. The words "Function key" or "Function button" are logically equivalent and means the same thing in the explanation. The term "Data Network" is used interchangeable to mean the World-Wide-Walkie.com data network or any data network that capable of deploying the Voice Over Internet Protocol and switching services and software required to run the network.

The preferred embodiment of the present invention consist of two (2) basic elements: the World-Wide-Walkie- Talkie High speed computing unit, and a high speed Internet Server and network infrastructure which distributes the VoIP and Fax over IP services offered by the invention. The handheld wireless invention is always assumed to be attached to a high speed resilient data network in order to achieve the results offered by the invention. The discussion is divided into two part: Part I and Part II. Part I will address the handheld World-Wide-Walkie-Talkie, programs and functions affiliated with the hand held device. Part II will consist of construction and configuration of the data network affiliated with the device.

The device and the network gives customers advance on-the-go computing power and the powerful ability to instantly communicate world wide using a variety of communications strategies. The most basic of these is the wireless instant messaging strategy which generally allows internet users to instantly communicate with each other while online.

Special attention should be given to the PUSH-TO-TALK-WORLDWIDE function button 21 which is linked directly to the instant messaging software system and which is used to request and initiate a voice conversation between two or more users that appear on the screen as instant messaging buddies or friends. This special button and other functions button are linked to the internal built-in instant messaging program and forms one of the main basis for this invention. It is discussed in more detail below under the special function sections.

Part I—The Handheld Wireless Computing Device

Much of the description and discussion is related to FIG. 1 wherein the functions of the invention are explained and the uses of each function will become apparent after reviewing the explanation and flowcharts related to each function.

The fault-tolerant network is also explained by review the various graphical network configurations depicted in FIG. 11, FIG. 12, FIG. 13, FIG. 14., FIG. 15, FIG. 16, and FIG. 17. Reviewing a brief description of the drawings which is part of this specification is also very helpful and will contribute to an understanding of making and building the invention by one skilled in the art.

FIG. 1 shows a front view of the device with all of its special functions keys. These special function keys or buttons are positioned right above the PUSH TO TALK function key 21 and are described in detail below.

As stated the additional figures, drawings, and flowcharts are also provided to show how the invention work together with the network and internet (the method) to bring about a complete system of Quality of Service voice communications. As the reader progress it will become obvious how the device, the data networks, the internet, satellite networks, cellular networks and the Public Switched telephone network (PSTN) embodied together forms a complete system of global telecommunications for customers and end-users of the World-Wide-Walkie-Talkie high speed internetwork system.

As shown in FIG. 1 the basic multi-function computing and telecommunication device is embodied in its most basic form. It consists generally of a cellular/satellite antenna 1A which is used for reception and transmission over any ordinary cellular or satellite telephone network. The antenna is contained in the physical housing case 2 which is used in conjunction with the inner electronics and outer functions keys and components of the device.

The on/off power button 3 is used to activate and supply power to the unit and also automatically "boots" or loads the World Wide Operating System (WWW-0S) operating system used to control the special functions of the device. It can also be used to load other operating systems such as the Palm OS™ and Windows CE™ hand-held operating system. The basic operating system referred to as "WWW-0S" is described in more detail in FIG. 28. and program flow charts have been adequately described in more detail for persons skilled in the art in manufacturing similar inventions.

Also show in FIG. 1 are several function keys one of which is the TALK function button 4 which is used to initiate normal cellular or satellite telephone calls. This button is used when a user desires to place calls independent of the Internet. In accordance with the invention this button is used in exactly the same fashion as used in the prior art of cellular and satellite telephones.

The TALK-INTERNET function key 5 also shown in FIG. 1. is a special function key linked to an internal software program or algorithm which allows end-users or customers to place telephone calls directly through the internet using Voice Over Internet Protocol (VoIP). It operates on the basis of an internet connection and also communicates and functions in conjunction with an internet based web server which contains all the necessary software, hardware, and gateways for routing telephone calls via the internet. In general the operations of this button is similar to the TALK button. The exception is when a user wishes to place a long distance call over the Internet, he/she would depress this button instead of the Talk button. Depressing this function button results in cost savings because calls are placed over the internet rather than the standard telephone network. Once this Talk-Internet key is depressed, the number dial, and other pertinent user information is transmitted to an internet based web server which then routes the call back to correct telephone number on the Public Switched Telephone Network.

In the event the requested user is a member of the same network, or is present via Instant messaging, the Talk-Internet function is used to "directly connect" the call to the requested user without the need of routing the call to the Public Switched Telephone Network. This would be a computer-to-computer call or chat session. This scenario provides the user with two (2) low cost options when making long distance phone calls. As stated, in computer terminology the latter form of communication would be considered a computer-to-computer data call and is even more cost effective since the call is not routed to the Public Switched Telephone Network, but simply uses the present data network (e.g., the internet) for which the users are simultaneously attached using the Instant Messaging system.

The Talk-Internet function button and program is also described in more detail and flowcharts in FIG. 35 below. However as stated herein this function button is generally used to place low cost wireless long distance Voice Over Internet Protocol telephone calls to users on the Public Switched Telephone Network, or direct calls on the same data network and assuming that both units are running the instant messaging software defined in this invention.

FIG. 1 also illustrates the END function button 6 which is used to disconnect both internet calls and calls placed directly through a normal cellular or satellite service provider. Most cell phone users are familiar with this function button and this button has the same properties and functions as both cellular phones and satellite phones in the prior art. It is basically used to terminate, disconnect, or end a phone call session.

FIG. 1. Illustrates the built-in revolving digital web camera 7 which is very special device of the invention. This built-in camera is used for video conferencing while communicating with other devices, or it may also be used as a still image digital camera. Since the camera revolves it is able to "see" areas pointing to the rear of the unit. Images picked up by the camera, is viewed directly on the invention liquid crystal display screen 8. The camera's also has a physical function button known as the snap button 5A (not shown in this view). This is used to snap digital images and record short real time movies. Movie Mode of this button may be invoke by simply holding the button down for about five (5) seconds. The camera is also controlled within the instant messaging software during a chat session. The instant messaging software will allow users the choice to automatically activate the camera during a voice chat session. The images and movies produced from this camera is stored on a mass storage memory device (not shown) inherent to the design and discussed in more detail and figures below.

As stated it should be noted in the design that the images viewed by the revolving built-in camera also appear on the liquid crystal display screen 8 which is a general display screen used with the Personal Digital Assistant (PDA) and in the same manner as a computer screen and/or a standard cellular telephone screen which displays a variety of information including but not limited to images received from other devices such as, videos, digital images, program functions, display data within the unit or information sent from an external source.

As previously stated the built-in revolving web camera may also be used in a video conferencing session, but may be easily disabled prior to any such session by way of the instant messaging program or by simply turning the camera in a face down position (off) whereby it is not activated once in this position. Very important to note also at this time is that the Liquid Crystal Display Screen 8 may also serve to display the a mini onscreen keyboard 27A (not shown) used in the Personal Digital Assistant application. This is a tiny keyboard used by end users of PDA's for general data entry purposes. This mini onscreen keyboard 27A can be seen in FIG. 3 and has the same properties of the keyboard used by popular PDA operating system such as the Palm VII™ or the Windows Pocket PC 2002™ operating system.

FIG. 1 shows the standard dial pad 10 which has the same exact use as a standard dial pad used in normal telephone implementations. This is used to dial telephone numbers and as a keypad for data entry purposes. As stated, the dial pad may also be used for keyboard entry (number pad and text data) of data in other applications, which require data entry responses.

The built-in revolving mouse ball 11 and the navigation arrow keys 12 illustrated in FIG. 1 serves the same purposes of a mouse device used to point and select screen items in computer applications. The right pointer arrow 12 points to the right arrow, but in this design means all of the arrow pointers including the up, down, right, and left buttons. These navigational arrow keys are used to make selections, which may appear in the liquid crystal display screen and are always active for general operations of the device.

The mouse ball 11 is used in the same manner as a Personal Computer mouse device on a personal computer and may also be used to point to objects on the screen or used to navigate web pages when surfing the web or using web applications.

The ENTER function button 13 is also shown in FIG. 1 is a general-purpose data entry button. It is used in exactly the same manner as the ENTER button on a personal computer. As such, it is used to alert the computing device that data has been entered via the keyboard or the screen and the end-user wishes to have the data processed. This button is self-explanatory as most if not all computer users are aware of the basic function of this button. As with personal computer applications, the ENTER button can also used to select and process "go", "click now" "select" and a variety of other applications which sometimes appear in web page application. This function button is a physical button located on the lower right of the dial pad and as stated has the exact same function of the ENTER button used on a personal computer.

FIG. 1 also illustrates the BlueTooth Infrared wireless port 16 which is used for bluetooth wireless communications to other devices such as personal computers, scanners, printers, and other compatible bluetooth devices. This wireless port will allow for the efficient wireless communications and data transfer between devices without the need for cables. For example, this port is used extensively when the World-Wide-Walkie-Talkie device exchanges information and data with the personal computer or the Personal Digital Assistant which is inherent to the design. PDA HotSynch operation is a prime example. Rather then connect devices through a serial port, this wireless port will allow for the efficient exchange of information between devices without the need for a cable. This also saves the end user or customer time because there are no cables or hook ups to either the personal computer or the World-Wide Walkie-Talkie device. This port will fall into the bluetooth specification which is a well known specification in the computer industry and to those skilled in the art. FIG. 21 also depicts an illustration of a bluetooth wireless link between a local desktop computer and the wireless invention as disclosed herein.

FIG. 1. also illustrates the Universal Serial Bus (USB) port 13A (not shown in this front view but can be plainly seen in FIG. 3 13A from a side view). This port uses a standard USB cable 85 to transfer data and for intercommunications between the World Wide-Walkie-Talkie device and other compatible devices. This includes Personal computer, printers, scanner, and other compatible USB devices. This USB port is provided in the design in the event the personal computers (PC's) or other devices are not bluetooth compatible. Since Bluetooth is a relatively new specification, there are still many non-compliant devices in the industry. In this case, a simple USB cable may be used in lieu of the bluetooth wireless interface for the intercommunications between devices. The Universal Serial Bus or USB ports are also standard to the computer industry and one skilled in the art could easily build such a port into the design. FIG. 24 also demonstrates a graphical depiction of how this USB physical cable is used in the design.

The remaining components in FIG. 1 illustrates other important parts of the invention, which include the Built-in Multi-Media Speaker Microphone 22. This is used as a general loud speaker hands free operation and microphone to transmit the end user's voice and conversations.

The mini listening speaker 25 located in the middle at the top of the device is also used to receive and hear private conversations from other telephony devices The Stylus compartment 9 (not shown in this view) is used to store the stylus pen in support of the design when the device is used as a Personal Digital Assistant (PDA). This compartment can be seen clearing in FIG. 4 wherein the stylus 32 is housed into the invention and the compartment is represented as a hole in top of the unit.

Also shown in FIG. 1 is the power source connection port 23 (not shown in the front view) which is used to connect power source accessories to the device to keep it recharged or to supply power to the wireless device. This port can be seen in a bottom view of the invention in FIG. 7 and is labeled as part 23. This port is also used to mount the portable keyboard 90 which is shown in FIG. 37 thru FIG. 39 in the drawings. As stated, the power source connection port 23 is located on the bottom of the invention and may also be view in FIG. 7. which shows a bottom view of the device. This port is also used as a data port for the portable keyboard. FIG. 39A illustrates how the port is used to mount and support the portable keyboard.

The preceding discussion above discloses the basics of the preferred embodiment of the World-Wide-Walkie-Talkie tele-computing device. However, the special function keys shown on the device is also additionally described below and in program flowcharts drawings shown in FIG. 28 thru FIG. 36 which describe the logical flow and general function of each function key which is apparent to the face of the invention.

New User Registration and Unit Activation

Two special programs are explained prior to explaining the special function keys of the invention. These two (2) programs are labeled as "New User Registration" and "Unit Activation"

New User Registration is illustrated in FIG. 25. This program is used to register new users to the data network. In operates on the general basis that in order to be an authorized user of the network one must always be properly registered on that network. Therefore, New User Registration is simply used to register new users to the World-Wide-Walkie-Talkie Network. Referring to the flowchart in FIG. 25, the program first accepts the user's name, address, city, and state 110. The program also allows the user to enter a desired user_name, and password 110. A verify_password variable can also be used in the program in order to verify the password that the user has just entered.

Once this information has been entered the program then connects to the internet server (worldwidewalketalkie.com) 120 and verifies the entered information with an online database 130. A check is made to see if this user name already exist 140. If the name already exist in the database of users an error message is displayed 190, and the user is allowed to re-enter the information 180 and the process is repeated until a valid username has been entered.

The program provides an option for the new user to long in to the network 160. If the user selects "yes" then communications will be transferred to the wwwalkietoakie.com domain for further processing. If not, then the program comes to a halt.

This is a very simple version of registering a user. The basic program can be amended with new features for the registration process. However, the program as discussed herein is sufficient to explain how a new user is registered to the network for purposes of actually using the data network to make voice over internet protocol calls, and to engage in instant messaging and other services offered by the network.

Unit Activation

Unit Activation is illustrated in FIG. 26. This program is used to activate or register new equipment to the data network. Every World-Wide-Walkie-Talkie unit should also be registered to the network in much the same way cellular telephones are registered on a voice network. This program operates in much the same manner as User registration except that it registers hardware units and serial identification numbers in opposed to human users.

In also operates on the general basis that in order to be an authorized unit of the network a unit or telephone must always be properly registered on that network. Therefore, Unit Registration is simply used to register new World-Wide-Walkie-Talkie devices to the World-Wide-Walkie-Talkie Network. Referring to the flowchart in FIG. 26, the program first accepts the devices serial identification number 210.

Once this information has been ascertained the program then connects to the internet server (worldwidewalketalkie.com) 210 and verifies the serial identification number and other information against an online database 230. A check is made to see if this device and user is already registered 240. If the serial identification number already exists in the database of serial numbers an error message is displayed 290, and the program terminates. There is no need to re-check the serial identification number as in the user registration program, because the serial number is automatically transmitted from the device and the user has no control over this. Serial identification numbers are assigned by manufacturers and customers are generally not able to change this number.

This program is also simple in concept and can be amended to include a much more elaborate process for verifying equipment. However, the basic idea is to register the equipment to the data network in much the same way a cellular telephone is registered to a telephone network.

The Special Function Keys

The preferred embodiment of the invention has basically eight (8) special function keys which perform special tasks. Additionally flowcharts have been provided to provide a better understanding of the functions and program used by the invention.

The function keys are easy to understand in that each of these function keys has an embedded software program related to it. As stated these software programs are described in greater detail using flow charts as stated hereinabove. However this section will provide the user with a detailed general description and operations for each of the function buttons as shown in FIG. 1 and provides an adequate understanding in building and using the invention.

It is specifically understood that the invention relating to the special function keys do not necessarily have to be represented as hardware function keys, but may also be embodied as software keys and may appear under the MENU button 24 as shown in FIG. 1 and also discussed later in this specification. This embodiment may be implemented in order save physical space on the face of the design.

Push-to-Talk Function Key

In accordance with the invention and as shown in FIG. 1 the PUSH-TO-TALK function key 21 is used to instantly connect and initiate a voice chat session with another end user or end users on the same network. It is very important to the reader to note that this button does not function like a standard push-to-talk button on radio based Walkie talkie and should not be confused with such a button.

The instant messenger system is automatically loaded by the Operating System or manually. Once loaded it will display all of the user's friends or chat buddies that the users has designated and these will be shown on the Liquid Crystal Display Screen 8.

The end user will then see all of his/her instant messenger friends which are presently online (see also FIG. 18) and connected through the internet and presently logged into the data network.

The operations of this PUSH-TO-TALK function button is very simple in that an end user would simply highlight or select a particular person in which he/she wishes to chat with and then press the PUSH-TO-TALK button. Once the button has been depressed the action will execute a command to contact a remote user on the network. There is no need to hold down this button like a standard radio frequency Walkie Talkie.

Also important to note is that this PUSH-TO-TALK function key actually works in conjunction with the instant messaging system. Once depressed, this action will attempt to initiate and connect a voice session between two or more users on the network.

For example, a user may chat online (voice or text) when he/she sees one of his/her buddies online, connected to the same network or simply using the same instant messaging system. It is the instant messaging software system that allows users to "see" each other logged in, and the PUSH-TO-TALK function key is ringing a door bell advising the user on the other side that someone wishes to speak or chat with him/her.

In particular the end user of the Wold-Wide-Walkie-Talkie device must first perform the following detailed steps in order to initiate a voice call or chat session with another user(s): (a) select or highlight the desired user in which to chat with using the built-in mouse 11 or the appropriate navigational arrow keys 12 or stylus pen. And (b) once selected the user must then press PUSH-TO-TALK. This tells the device which remote friend the customer wishes to talk to and to initiate a communication sessions between the users. All users in this mode must be connected to the internet or other data network and must also be running the instant messaging software on his remote unit or personal computer.

Once the PUSH-TO-TALK function key 21 has been depressed by an end user the internal instant messenger software program (e.g. imessenger.exe) will attempt to connect to the server and locate the requested user. If the call is accepted by the remote user, then a bisynchronous two-way voice communications or text chat session is established allowing both users to communicate. Again, it is very important to note in this design that the end user of the World-Wide-Walkie-Talkie will only have to press the PUSH-TO-TALK button only once in order to initiate a low cost voice/text chat session world wide. This button should not be confused with the "push to talk" on a standard radio based walkie talkie because it does not function that way.

From a general technical perspective the following action will occur once PUSH-TO-TALK (21) has been depressed. These programmatic step may be described in seven (7) general steps and are as follows:

1. The handheld unit checks for an internet connection to a Server which contains the VoiP software and necessary routing software and telephone gateways, If not, connected, it attempts to log on and connect to the server over the wireless link using Group Packet Radio Service protocol (GPRS) or any other protocol which allows a high-speed wireless connection to the internet and the server.
2. An Internet Protocol or IP address may be dynamically assigned to the device by the main server that initiated the push-to-talk sequence.
3. The user name, password, and other security authentication parameters are transmitted to the server to identify the authorized user and request the communications session.
4. If the user and device passes security authentication from the control access matrix (located on the server), then the server attempts to find the requested remote user online.
5. If the requested user is online, and accepts the call, the server will send back a simulated ring to the user who requested the chat session. A simulated ring is also sent to the remote user's unit or personal computer whichever is the case. The ideal time for this simulated ring to occur is when the server is actually processing the request. Additionally, the server can send back a simulated "busy signal" if the other user is already in chat mode and configured for only one conversation.
6. If the requested user accepts the call a two (2) way bisynchronous communications session is immediately established. If the call is not accepted, then the initiating user will be informed of this fact that his/her call was not accepted by the requested user. For example, the server may send back a voice or text signal indicating "Your call was not accepted by the customer . . . Thank you".
7. Additionally, if the requested user is not available, a simulated busy signal or other message will be sent back to the initiating user informing him/her that the requested user was not available and he/she may try again later.

It is important to note that all users of the system must be registered users of the network as is the case with any network and must also be using the designated instant messaging software provided with the design.

Using a wireless chat session in this manner, and over the Internet reduces long distances charges and also extends the reach of service (worldwide) without the need of actually dialing a long distance number.

This concept is very similar to chatting on the Internet, or a local/wide area network and uses the same basic idea using the wireless computing device, the Internet chat server, and the Internet The PUSH-TO-TALK instant messaging program is also described in a simple flowchart in FIG. 29 which is explained therein.

However, the above seven (7) step process as described above provides sufficient detailed information of the basics and allows one skilled in the art to develop such a program even without the flowchart. The flowchart in FIG. 29 is only provided as an added convenience for one skilled in the art.

Also important to note is that the PUSH-TO-TALK software program is inherent to the design and resides on the computer microchip and can also be viewed in FIG. 10 of the drawings. It also operates in conjunction with the WWWT—INSTANT MESSENGER STAY RESIDENT PROGRAM 35 shown in FIG. 10 of the drawings.

It should be remember that this program is automatically loaded by the Operating System once the unit is powered on by the customer automatically logs in to the network over a wireless GPRS link or other high speed wireless link to make contact with the internet server located over an internet domain called: WorldWideWalkie.com or any other domain chosen by the provider of the network services.

Push-to-Talk Virtual Program

Additionally, the PUSH-TO-TALK program may also be implemented on the internet based VoIP server (or personal computer) for the benefit of individuals who do not have a physical unit, but who wish to talk with other users who have units or who are on the same network or using instant messaging software.

As stated, a Virtual device and image of the World-Wide-Walkie-Talkie wireless invention may also be implemented as a program or software module and provided on the server side of the implementation for the benefit of authorized internet users who wish to communicate over the network.

This virtual implementation of the World-Wide-Walkie-Talkie would have the exact same properties and features of the actual unit. A generalization and conception of this model may be view in FIG. 41 of the drawings. This virtual device may be designed as a java based applet or server program and may also be alternately used by owners of World-Wide-Walkie-Talkie devices. However the owner must also a registered user of the data network.

This program can be written and designed in any language advantageous to the design and can be placed on the main server website (wwwalkietalkie.com) for download by end users. However, designing the program in the Java programming language would be very beneficial and offer a larger and more broader audience. Compatibility and use with a variety of computer systems would not be an issue because many internet browsers including Internet Explorer™, Netscape™ and America Online™ browsers already java enabled enabling the program to be run as a java applet. For these reason, designing the program in java is a preferred method.

Other Third Party Instant Messenger

Jabber Standards Open Systems Architecture

The present invention also allows other third party internet messengers as stated in the claims sections. For example, both the Yahoo™ and America Online™ instant messenger are allowed to operate on the World-Wide-Walkie Talkie invention so that users may of the wireless device and network may also communicate with the users on these large Internet Service Providers and websites.

Additionally, as stated in the claims section, this invention also complies with the Jabber standard and architecture in order to help create a distributed IM system, reminiscent of the email systems distributed across the Internet, with users connecting to these systems locally.

Other IM systems can be developed using this standard to allow for an optional IM systems to be used with the invention. This approach is diametrically opposed to the monolithic system architecture provided by such current service providers as AIM (AOL Instant Messenger), ICQ, MSN (Microsoft Network), and Yahoo, whereby a single central server or group of centralized servers provide the messaging service.

Jabber also resembles the email architecture in other ways: Jabber addresses its end-points (humans, machines, software) with an addressing scheme almost identical to the basic SMTP (Simple Mail Transfer Protocol) scheme. For example, myname@wwwalkietalkie.com is a valid Jabber address, or JID (Jabber ID) in Jabber parlance. For these reasons, Jabber-based systems scale better than existing proprietary systems. Additionally, the protocol allows for gateways to proprietary instant messaging services, should that become necessary. For these reasons it is very important that when designing and laying out the invention that the Jabber standard be allowed This technical configuration and allowance would also allows users of other large huge networks to communicate with the World-Wide-Walkie-Talkie Invention. However a basic IM system should be designed for the invention. This system should also be made available as a FREE download in order to accumulate users of the network. Customers and end-users that use the network are then able to communicate with the invention and other users on the internet who have downloaded and installed the software. For example, this process works the same as America Online™ and Yahoo™ services that allow for the FREE download of their software for internet users to communicate freely with their networks.

This would enhance the World-Wide-Walkie-Talkie invention device because it allows end users from the largest and different networks to reach a wireless device using the instant messaging software from either system.

Interfacing functionality of America Online™ and Yahoo™ messengers both can be built-in to the design of the World-Wide-Walkie-Talkie invention. Hence there is, no need to download the individual messengers from these large services. This concept is illustrated in FIG. 17 of the drawings. In this illustration the a World-Wide-Walkie-Talkie 60 uses the WWW-IM instant messengers 76 to connect to another similar device 61 using the same instant messenger 77 software.

Additionally with the Java™ Virtual Machine 47 programmable interface and environment (shown in FIG. 10) inherent to the design. This means that custom java applets, servlets or other programs can be written to run on the World-Wide-Walkie Talkie or the internet server for instant communications. As previously stated, using third party developed instant messenger broadens the design of the Wireless World-Wide-Walkie-Talkie because it allows the device to reach the largest possible number of users of the internet. This further allows for opens systems and creativity and the end result produces intercommunications between users of the internet and the World-Wide-Walkie-Talkie network and device which a central objective of the invention.

Finally one special consideration is provided for in the design in the unlikely event the device is unable to contact the web based Internet server which connects the users and allows communications between them. As provided for in the drawings and claims section, the individual World-Wide-Walkie Talkie units may also acts as individual "servers" or operate in server mode and communications may still be accomplished as each unit is able to identify itself on the network or internetwork with unique IP or internet protocol addresses. This is a well known concept in the networking world of computers and one skilled in the art can easily build this functionality into design. This provides a "back up" system technique in the unlikely event the server(s) network become unavailable for any reason. FIG. 16 illustrates this concept However this "server functionality" must be provided for in the original design or incorporated into the operating system. As stated this feature would be helpful in the unlikely event that the internet server is unavailable for any reason. With a specific valid IP Address, the device would still be allowed to identify itself to the internet and communications would still be possible in the event of a server failure.

Send Voice Mail Function Key

FIG. 1 illustrates the SEND Voice Mail function key 19. This function key actually maps to a software program that can be loaded into memory once power has been applied to the unit and the Operating system is fully loaded. The program can also alternatively be loaded into memory and executed "on demand" when the user depresses this function key.

The main purpose and function of this program is to allow the end user a means to compose and transmit a pre-recorded digitally produced voice mail and to be able to send it any email address or telephone on the Public Switched Telephone Network.

For example, an end user would only need to depress the function key once to record and subsequently send global voice mail to any telephone, computer, email address, or device connected to the Internet or the public switch telephone network.

FIG. 30 illustrates the general logic of the program. According to the design of the invention, an end-user would be prompted for a destination email address 505 or telephone number which may be selected from the address book or selected by voice command. For example, when prompted by the computer for a valid email address or telephone number, an end user could say a name such as "Al" and the entry corresponding to this name would be selected by the computer.

Once a telephone number or email address is selected the end-user would be allowed to compose a digital recording 510 and to save this recording to a special compressed file type to be subsequently emailed or forwarded by a gateway to any computer, telephone, email address on the internet or the telephone network. Using a simple voice digital recorder built-in to the invention, an end-user is able to compose and store the digital information.

According to the general design of this program shown in FIG. 30—Send Voice Mail Program an end user would be allowed to edit the voice message prior to transmission 515. If the destination address is a telephone number 525, then the voice message is forwarded to a Voice Over IP services gateway for forwarding to the Public Switched Telephone Network 535. Otherwise, the computer program would execute a mailto: web instruction to transfer the file to the selected recipients or email address using an SMTP (Simple Mail Transfer Protocol) protocol.

Once this process has been completed the program then advises the user the desired voice mail created has been delivered, the program terminates, and control is returned to the Operating System for the next command.

In the actual design and implementation of this program a selection should allow the user to transmit another voice mail before terminating. Of course, the user may simply depress the Send Voice Mail Function key again to transmit a new Voice Mail to any desired destination.

The program and process described herein, and in the drawings are not meant to limit the scope or program design to the steps discussed, but on the contrary provides a foundation for a more diverse implementation and contributes to an understanding of program's design by persons skilled in the art. This internal program and all of the special program function keys are stored on the high speed microchip (FIG. 10) and are automatically loaded into memory by the Operating System (FIG. 28) once the unit is powered. As stated previously, this program can also be "loaded on demand" once the end user depress the function key.

This program offers end users a means of an instant wireless communication session and delivery and transmission of low-cost digitally recorded voice messages, which can be sent to any telephone, computer, email address, or device connected to the Internet or the Public Switch Telephone Network.

As the reader can see, the program is very simple in design, but offers a low cost highly effective means of delivering digital voice information over the World-Wide-Walkie-Talkie network using the Internet.

Send Video Mail Function Key

FIG. 1 also shows the SEND Video Mail function key 18 This key also maps to a software program and can be loaded into memory once power has been applied to the unit and the Operating system is fully loaded. The program can also be loaded into memory "on demand" when the function key is depressed by the end user.

The main purpose and function of this program to allow the end user a wireless means to compose and transmit a pre-recorded digitally produced real time video movies which can then be subsequently transmitted to any email address, device, or video capable telephone on the Public Switched Telephone Network. In the event the telephone is not video enabled, then only the audio portion of the message is delivered.

This function is very similar to the Send Voice Mail Function discussed above except that it allows for the transmission of real time movies that is created with the built-in digital web camera.

As an example of the it's operational use, an end user would depress the function key Send Video Mail only once to start the process of sending high quality video mail and real time images to any telephone, computer, email address, or device connected to the internet or the public switch telephone network. The destination device must be capable of viewing multimedia based video mail.

According to the design of the invention and as shown in FIG. 31, an end-user would be prompted for a destination email address or telephone number 602 which may be selected from the address book or selected by voice command. For example, when prompted by the computer for a valid email address or telephone number, an end user could say a name such as "Betty" and the entry corresponding to this name would be selected by the computer. Once a telephone number or email address is selected the end-user would be allowed to compose a video recording (about 1 to 3 minutes) and to save this recording to a special compressed file type to be emailed or forwarded by a voice gateway to any computer, telephone, email address on the internet or the telephone network. Using a simple built-in revolving web camera and real time video recorder software built-in to the invention, an end-user is able to compose and store the digital movie for subsequent transmission to a destination device on the Internet or Public Switched Telephone Network.

According to the general design of this program as shown in FIG. 31—Send Video Mail Program an end user would be allowed to edit the video message prior to transmission 606. If the destination address is a telephone number 610, then the voice message is forwarded to a Voice Over IP services gateway for forwarding to the Public Switched Telephone Network 612. Otherwise, the computer program would execute a mailto: web instruction to transfer the file (e.g., mpeg format or avi format) to the selected recipients or email address. Simple Mail Transfer Protocol (SMTP) can be used to transmit the information to an email address. MPEG, AVI, and other file formats are supported. MPEG-2 is the preferred recording method because of the compression method it uses which would make the data files much smaller than MPEG files. MPEG-2 is simply a method of compressing digital animation and TV signals that reduce their size but still retains their high quality. Digital TV and High Definition TV use MPEG-2. Using this format also reduces the time it takes to transfer the file and also uses less bandwidth for the transaction. These video file formats are very well known to persons skilled in the art as well as the computer manufacturers in the industry and is the preferred method for transmitting the video animations produced with the invention.

Once this process has been completed the program then advises the user that the desired video mail created has been delivered 616. The program then terminates, and control is returned to the Operating System for the next command.

In the actual design of the program a selection should allow the user to transmit another video mail before terminating. Of course, the user may simply depress the Send Voice Mail Function key again to transmit a new Video Mail to any desired destination.

The program and process described herein, and in the drawings are not meant to limit the scope or program design to the steps discussed but on the contrary provides a foundation for a more diverse implementation and contributes to an understanding of program's design by persons skilled in the art. This internal program and all of the special program function keys are stored on the high speed microchip (FIG. 10) and can automatically loaded into memory by the Operating System (FIG. 28) once the unit is powered. As previously stated, the program can also be loaded into memory "on demand" when the user depresses the Send Voice Mail Function button.

This program offers end users a means of an instant wireless communication sessions, high speed data delivery and transmission of low-cost digitally recorded Video Messages and real time movies that can be sent to any telephone, computer, email address, or device connected to the internet or the Public Switch Telephone Network.

As the reader can see, the program is very simple in design, but offers a low cost highly effective means of delivering digital video information over the World-Wide-Walkie-Talkie network using the Internet or any data network.

Record Memo Function Key

FIG. 1 also illustrates the RECORD MEMO function key 14. This function also maps to a software program that can be loaded into main memory once power has been applied to the unit and the Operating system has been fully loaded for operations. Alternatively, this program can also be loaded into memory "on demand" when the end user depresses this function key.

The main purpose and function of this program is to allow the end user a means to record a digital memorandum or digital voice message. The function button allows for quick access to the function. This programs functions provides the advantage of a "voice note pad". Digital messages may be stored and subsequently retrieved by the user for future use.

For operational purposes, an end user needs depress the function key Record Memo 14 and a built-in digital voice recorder is invoked that allows the user to make and compose digital voice memorandums.

The program should also be designed to keep track of the time, and date, that the memorandum was made by the user, and also allow the user to set a specific alarm for the memorandum to be play at a specific time and date.

FIG. 32 illustrates the logical structure of the program. According to the design of the invention, once an end-user depressed the function button on the unit, the computer is invoked which launches a built-in digital recorder. As shown in FIG. 32 the program would prompt the user by "beeps" or a "Please Begin Recording" voice prompts. This prompts the user to being recording. For example, a user could simply press the function button, wait for a beep or beeps, or some other prompt and begin speaking into the microphone of the device.

Once the user has finished the recording he/she can simply depress the button again and the recording is saved to the mass memory of the device as for later reviewing and editing by the user.

The simple voice digital recorder program built-in to the invention, allows an end-user is to compose and store the digital voice information.

According to the general design of this program and shown in FIG. 32—Record Memo Program an end user would be allowed to edit the voice message or recording prior to saving it. 646. As stated, this digital recording is then saved to the internal mass memory. 650.

Once this process has been completed the program then advises the user that the digital recording has been saved 650. The user is then allowed to attach an alarm to the message that could play this message at any date and time in the future.

The program then terminates, and control is returned to the Operating System for the next command.

In the actual design of the program a selection should allow the user to compose another Voice Memo. Of course, the user may simply depress the Record Memo I Function key again to compose and store another memorandum.

The program and process described herein, and in the drawings are not meant to limit the scope of the program's design or the steps discussed herein, but on the contrary provides a foundation for a more diverse implementation and contributes to an understanding of program's design by persons skilled in the art.

This internal program and all of the special program function keys are stored on the high speed microchip (FIG. 10) and are automatically loaded into memory by the Operating System (FIG. 28) once the unit is powered.

This program offers end users a means of instantly recording digital memorandums.

As the reader can see, this program is also very simple in design and concept, and offers a quick alternative to a tape recorder and an effective means of making and storing digital voice messages for future use using the World-Wide-Walkie-Talkie invention.

Send/Receive Fax Function Key

FIG. 1 also shows the Send/Rec FAX function key 20. This function key also maps to a software program that can loaded into memory once power has been applied to the unit and the Operating system fully loaded for operations. Alternatively this program can also be loaded into memory "on demand" when the end users depresses this button.

The main purpose and function of this program to allow the end user a wireless means to compose and transmit a facsimile or fax message to any fax machine, email address or computer located on the internet or Public Switched Telephone Network.

Fax messages may be composed with the Voice-to-Text processor, the portable keyboard, a compatible bluetooth scanner, and may also be document attachments in a variety of popular formats known to persons skilled in the art. These formats includes but is not limited to, MS WORD™, Tiff, WordPerfect™, ASCII text, or any other file format that can be transmitted over a data network and generally used by the computing and telecommunications industry for this purpose.

As an operational example, an end user would depress the function key Send Rec FAX in order to commence the process of transmitting a fax message, to any fax machine, computer, email address, or device connected to the internet or the public switch telephone network.

In the event the fax is being sent to a computer, software can be designed to allow the user to read the fax. Alternatively, this software can be part of the actual fax message sent as an executable .exe file. This software can also be designed and built-in to the INSTANT MESSENGER software discussed in this patent application.

FIG. 33 shows a flowchart depicting the basic logical structure of the program. According to the design of the invention, an end-user would be prompted for a destination email address or telephone number 662 which may be selected from the address book or selected by voice command. For example, when prompted by the computer for a valid fax number, or email address an end user could say a name such as "Bill Bob" and the computer would automatically select the entry corresponding to this name.

Once a fax number, telephone number, or email address or destination device is selected the end-user would be allowed to attach documents such as in email attachments. The attachment would include a cover sheet. The end user could also compose a text based fax message with the portable keyboard, voice-to-text processor, or the onscreen keyboard.

The resulting fax message will be forwarded to any fax machine, computer, telephone, or email address on the Internet or the public switched telephone network. Any java based cellular telephone or other java enabled device could also receive this type of fax if it is equipped with the instant messenger software supported by the World-Wide-Walkie-Talkie device and network.

FIG. 33 is a flowchart depicting the logical structure and program flow. According to this program an end user would be prompted to for a destination fax address 662 and given the option to include a cover sheet 664. The end user is also allowed to add other attachments 670 such as word processing documents. Once the composition of the fax message is complete the user would also be allowed to edit the fax message prior to transmission 672. If the fax message is ready to send, then the fax message is forwarded to a Voice Over IP services gateway for forwarding to the Public Switched Telephone Network 676. Otherwise, the computer program would also execute a mailto: web instruction to transfer the file to the selected recipients or email address. This is accomplished by using Simple Mail Transfer Protocol (SMTP).

Once this process has been completed the program then advises the user the desired fax message created has been delivered 678. The program then terminates, and control is returned to the Operating System for the next command.

In the actual design of the program a selection should allow the user to transmit another fax message before terminating. Of course, the user may simply depress the Send-Rec FAX Function key again to transmit a new FAX Message.

The program and process described herein, and in the drawings are not meant to limit the scope or program's design to the steps discussed herein, but on the contrary provides a foundation for a more diverse implementation and contributes to an understanding of program's design by persons skilled in the art. This internal program and all of the special program function keys are stored on the high speed microchip (FIG. 10) and can be automatically loaded into memory by the Operating System (FIG. 28) once power has been applied to the unit.

This program offers end users a means of an instant wireless communication sessions and fax delivery and transmission of low-cost digitally fax messages which can be sent to any fax machine, computer, email address, or device connected to the internet or the Public Switch Telephone Network. As the reader can see, the program is very simple in design, but offers a low cost highly effective means of delivering digital fax information over the World-Wide-Walkie-Talkie network.

THE Send Email Function Key

FIG. 1 also illustrates the SEND EMAIL function key 17. This function is also mapped to a software program that can loaded into memory once power has been applied to the unit and the Operating system is fully loaded and operational. This program can also be loaded into memory "on demand" when the users depresses the function key.

The main purpose and function of this program to allow the end user a wireless means to compose and transmit an email message to any email address on a data network or the Internet.

For operational purposes the end user would depress this function key to commence sending an email message to any computer, email address, or device connected to a data network or the Internet or even the public switched telephone network. In theory, the program could also send the email to a telephone in a voice format. A text email could easily be converted to voice and the email sent to a telephone.

FIG. 34 shows the logical program structure of this program. According to this design an end-user would be prompted for a destination email address or (telephone number) 704 which may be selected from the address book or selected by voice command.

For example, when prompted by the computer for a valid email address or telephone number, an end user could say a name such as "James" and the entry corresponding to this name would automatically be selected by the computer.

Once a valid email address or other valid entry is selected the end-user would be allowed to compose an email message to be forwarded to any email address, computer, or telephone on the internet or the telephone network.

According to the general design of this program and as shown in FIG. 34—Send EMAIL Program the computer would display the onscreen keyboard and also load the Voice-toText Program 702. Detination email address(es) is entered by the end user 704 and the user is allowed to add an attachment 708. The user will also be allowed to edit the email message 710. If the destination email is ready to be sent then the message is forwarded to the intended recipient (s) via Simple Network Mail Protocol (SNMP) 714 or any other available protocol or means to deliver the email in an expeditious manner.

If the user were to select a telephone number, then the email message would be forwarded to a Voice Over IP services gateway for forwarding to the Public Switched Telephone Network to be delivered as a voice message. Otherwise, the computer program could also execute a mailto: web instruction to transfer the email message to the selected recipients or email address using SNMP protocol. Once this process has been completed the program then advises the user the desired email mail created has been delivered, 716. The program then terminates, and control is returned to the Operating System for the next command.

In the actual design of the program a selection should allow the user to transmit another voice mail before terminating. Of course, the user may simply depress the Send Email Function key again to transmit a new Email Message to any desired destination.

The program and process described herein, and in the drawings are not meant to limit the scope or program design to the steps discussed therein, but on the contrary provides a foundation for a more diverse implementation and contributes to an understanding of program's design by persons skilled in the art. This internal program and all of the special program function keys are stored on the high speed microchip (FIG. 10) and are automatically loaded into memory by the Operating System (FIG. 28) once the unit is powered. This program offers end users a means of an instant wireless communication session and delivery and transmission of low-cost digitally recorded voice messages, which can be sent to any telephone, computer, email address, or device connected to the internet or the Public Switch Telephone Network.

As the reader can see, this program is also very simple in design, but offers a low cost highly effective means of delivering email information over a wireless network such as the World-Wide-Walkie-Talkie network.

PDA—Personal Digital Assistant Function Key

FIG. 1 also illustrates the PDA (Personal Digital Assistant) function key 15. This key also links to a PDA software program that can be loaded once power has been applied to the unit and the Operating system has been fully loaded. Alternatively, it can be loaded "on demand" once the users depresses this key. This program is capable of loading the Palm VII™, Windows CE, or Windows Pocket PC 2002™ Operating Systems.

The main purpose and function of this program is to allow the end user a means to have a fully functional wireless Personal Digital Assistant available for use.

By depressing the PDA function key the end user would simply be invoking a program which transforms the device into a fully functional wireless Personal Digital Assistant (PDA). As stated, either one of the above PDA operating systems may be loaded once this key is depressed.

FIG. 20 illustrates a screen shot of how the display screen would appear once this button is depressed. A familiar group of icons appears on the Liquid Crystal Display screen for the users to select as with the normal PDA processing programs.

Additionally the onscreen keyboard could also be display as shown in FIG. 3. The onscreen keyboard 27A is a general-purpose keyboard used to enter data.

A special PDA basic subsystem may also be designed for the invention in order to carry out this purpose. Persons skilled in the art and computer manufacturers are familiar with this process.

The portable keyboard shown in FIG. 37, FIG. 38, FIG. 38A and FIG. 39 may also be used to enter data into the Personal Digital Assistant.

FIG. 39 illustrates how the World-Wide-Walkie-Talkie invention would be mounted to the keyboard. The keyboard 90 is powered by the hand held unit and is connected to the power port 23 (not shown) of the World-Wide-Walkie-Talkie hand held device. A view of the power port 23 can also be seen in FIG. 3. The power port shown in FIG. 3 can be attached to the keyboard's connecting data port 90A which is shown in FIG. 37.

PDA Operating System

According to the design of the invention, the invention is capable of executing popular handheld operating system such as the Palm OS™ operating system, or the Windows CE™ operating system or the Windows Pocket PC 2002™ operating system.

Using the Palm OS™ or other popular hand held operating systems speed the design process and would enable the end-user to easily transfer existing PDA applications to the World-Wide-Walkie-Talkie device. Many hand held PDA users are already familiar with this hand held operating system and hence, the learning curve would also be easier for individuals who are already familiar with the Palm OS operating system. Additionally the Palm™ operating systems have proven to be one of the most efficient operating system for hand held computing applications and hence would It should be noted herein, that an independent operating system may also be designed to function with the World-Wide-Walkie-Talkie, and should contain many of the features available to popular operating systems.

Regardless of which operating system is used once the PDA function button is depressed the functions of a PDA becomes available to the end user by displaying the basic PDA function as shown in FIG. 20—Personal Digital Assistant.

FIG. 10 shows the microchip design logic board along with the Personal Digital Assistant 39. The PDA system can be stored on the micro chip as shown in FIG. 10.

According to the design of the invention, an end-user would simply depress the PDA function key in order to execute the built-in PDA software. For example, when the user depressed the PDA button, he/she would see something similar to FIG. 20 which shows basic functions of the Personal Digital Assistant. Although the buttons for the PDA are not shown in the inventions diagram, these buttons can appear only as software buttons. Also the invention can be embodied in another form whereby these buttons can be placed on the face plate of the invention.

According to the general design of this program and as shown in FIG. 20—Personal Digital Assistant an end user simply depresses the PDA button and a special screen appears as shown in FIG. 20. This screen allows for the functions and operations of a basic or advanced Personal Digital Assistant.

Once any other function is depressed the status of PDA device would remain in memory in whatever state it was in when the user depressed the other function key.

The program and process described herein, and in the drawings are not meant to limit the scope or program design to the steps discussed therein, but on the contrary provides a foundation for a more diverse implementation and contributes to an understanding of program's design by persons skilled in the art. This internal program and all of the special program function keys are stored on the high speed microchip (FIG. 10) and are automatically loaded into memory by the Operating System (FIG. 28) once the unit is powered.

This program offers end users a means of having a popular Personal Digital Assistant and high speed-computing device while on the road. The user also still retains all the prior uses as discussed herein of the World-Wide-Walkie-Talkie invention including but not limited to instant wireless communications, wireless faxing, wireless email, wireless voice mail, wireless video mail, instant messaging features, and a host of other services which may be deployed with this hand held computer implementation.

Menu Function Key

FIG. 1 also illustrates the Menu function key 24. This function key which is located in the upper right hand corner of the device,. However it be located anywhere which would be convenient for quick access. This menu function key contain a variety of other special functions not available on the face of the device. It can also contain computer programs which may used in conjunction with Desktop programs affiliated with the World-Wide-Walkie-Talkie device.

The main purpose of this program is to have an menu of commands that allow the users to perform a wide variety of functions. Users can also add programs to this menu and the program discussed below are not meant to be all inclusive.

An example of some of the programs that can be included under the MENU button is as follows:
1. A Program for Hot-Sync data transfers of data to Personal Computer which allows the Personal computer to be synchronized with the PDA or data within the handheld invention.
2. A Program To Load the Palm OS™ or Windows CE™ operating System
3. WWW-T Terminal Emulation Software which can be used to connect to remote computers
4. A software program that provides and launches an MP3 Player for playing MP3 Music files.
5. A "Send Page" program which is able to send digital pages similar to the voice mail, email programs, and other programs discussed herein.
6. A Program to Re-Start or Re-Set World-Wide-Walkie-Talkie hardware and Operating System
7. A Program which Launches the Internet Mini Browser
8. A Program to Load other Java application programs
9. A Program to Review Visual Status of a physical location such as Home/Office
10. A Program used to Download World-Wide-Walkie-Talkie Instant Messenger
11. The Send Voice Mail Program discussed previously.
12. The Send Email Program discussed previously.
13. A Program to Locate a User's Physical location using Global Positioning
14. An address Book
15. A digital Voice Recorder.

A variety of system program and user programs can thus be added to the MENU button. It is designed for the expansion of the design according to the user's needs. Products and services offered by other service providers to end users may also be added.

As stated, the many features and functions as discussed herein can also be added on the MENU button and do not necessarily have to be included as a physical function button. This would save physical space on the face plate of the invention. However, having the function buttons on the face plate of the invention is the preferred embodiment, because these function keys make it easier for the user to access the applications.

Destruction of Microchip Logic Operating System

A detailed description of some of the other drawing are also provided herein for a understanding of making and building the invention.

FIG. 10—MicroChip design shows the logical structure of the invention's microchip. Many of the programs such as Send Receive Video Mail 50, Send/Receive Voice Mail 51 and PUSH-TO-TALK 38 have already been discussed. However, it should be noted for descriptive purposes that all of these programs would reside on the microchip with the design setforth in FIG. 10.

Of prime importance is the Mobile Pentium 4 Processor M™ microprocessor chip 45. This chip or comparable microchip should be deployed in the design for maximum bandwidth and operation of the unit.

A Voice Command library 49 is an internal library of basic commands that can be used to control the device. All of the functions stated in the design may also be invoked by voice and many other applications can be developed for the voice command library. For example "voice dialing" is a standard feature used in today's telephones and this option should also be made available to the World-Wide-Walkie-Talkie invention.

FIG. 10 also shows the Java Virtual Machine 47 which is also built-in to the design in order to accommodate present day java based applications. The java user programs library 46 shown is area of storage where end-users are allowed to store java based programs such as an accounting application, a data base application, or java based computer games.

Also shown is the Java Enabled PCS/GS Digital Cell phone logic controller 53 which in concept is a controller which allows the applications of Java enabled applications (e.g. mini web browsers) on digital cellular or satellite telephones.

FIG. 10 also shows the Offline Mass Storage 10/20 Gigabytes 43 which may be used to store large amounts of data used by end user on a daily basis. Digital Videos, email, and other information and files may be transferred to this area. For example information on a user's home or office computer may also be uploaded to this area.

FIG. 10 shows the Artificial Intelligence Voice to Text Processor 40 which is used to convert human speech to text in order to eliminate excessive typing. Many of these human speech to text processor are available on the market today, and persons skilled in the art could easily embedded this program or interface into the design.

This program is used in the SEND EMAIL application which would automatically take the user's speech and convert it to email. This program is very helpful and would reduce the amount of typing needed for data entry into applications.

FIG. 10 also shows the World and U.S. Maps Data Base 41 which is an internal maps data base of the entire world. This data base can be stored on the microchip along with the other applications and used in conjunction the Global Positioning Satellites to locate the exact position of a World-Wide-Walke-Talkie unit or user on earth.

The Satellite Communications Chip 42 shown in FIG. 10 is a sub-chip designed to handle and process all the logistics used by satellite telephones and satellite networks.

FIG. 28—Basic Operating System. This operation system is referred to as World-Wide-Walkie-Talkie Operating System or WWW-OS. This system will illustrate a very simple operating system for the World-Wide-Walkie-Talkie wireless device and computing system. As shown in the FIG. 28 it performs a Power On Self Test 310 to ensure that all system parts are correctly operating and then proceeds to automatically load the instant messenger 312 and connects to the Internet.

Many of the other programs have already been discussed in detail in previous sections. These programs are loaded by the operating system, but can also be loaded "on demand" as the user depresses certain function keys to perform operations of the invention. This could be done in order to preserve memory whereby only portions of the programs may also be loaded and the programs may be paged into memory as they are needed.

The operating system is simple in nature and design and may also be constructed to accept voice commands in order to perform an operation of the device. For example, a user may simple speak a command into the system such as "Voice Mail" and the said voice mail program would automatically be executed in it normal sequence in the same manner as if the program were invoked by the pressing of a function key. FIG. 41 is a server based program 999 which may be designed as a Java applet or other program to allow end users easy access the network with a "virtual walkie talkie". This program has also already been discussed in previous sections of the patent application.

Preferred Embodiment—The Data Network— Operations

The Net2phone™ Preferred OEM Custom Network

Part II of the preferred embodiment consist of setting up or building the data network for the World-Wide-Walkie-Talkie device. A resilient, robust, and totally fault-tolerant network must be in place to support the invention. As such this sections discusses the easiest way in which to deploy such a data network.

It is highly recommended that the preferred embodiment of the network be used for companies who are not generally familiar with Voice Over Internet Protocol application. By using the preferred embodiment of the data network, an organization will avoid costly mistakes and the problems discussed in this patent application. Additionally, the development and deployment time is minimized. Technical support for the network would also be readily available 24 hours a day and the service provider would not have these issues to worry about.

Net2phone's™ OEM Custom Network is the preferred embodiment for the invention. The second part of this invention is the actual high speed robust Voice Over Internet Protocol, fax gateway and data network. This network must be redundant, resilient, and totally fault-tolerant in the event of hardware, software, or system failures.

As previously stated in order to avoid the pitfalls associated with Voice Over Internet protocol networking (e.g. delays, jitters, etc) this method should be used by the service provider. This method also provides a high quality of voice service with an efficient network infrastructure to support the functions of the World-Wide-Walkie-Talkie.

This network is referred to herein as the World-Wide-Walkie-Talkie network, and may exist over a domain called wwwtcom, or WorldWideWalkieTalkie.com, or any other domain name.

Internet Domain Names

The preceeding internet domain names have been reserved for this invention. However, any domain name would work with the invention. However, using a domain name that is easy for people to remember or consistent with the invention would be more preferable. For companies using the device over private network, any domain name or even an Internet Protocol (IP) Address can be used in lieu of a domain name.

The network design should provide for efficient Voice Over Internet Protocol/voice chat which should exist on the domain when a user logs in. In order to provide the most efficient and optimal service of Voice Over Internet Protocol over a wireless link it is important that one not familiar with the use of telephony ip applications build a successful network platform for its customers using the professional services of a company such as net2phone. Net2phone is the world's undisputed Voice Over Internet Protocol service provider. The company also supports the development of devices such as the World-Wide-Walkie-Talkie invention. Examples of the services provided offered by the company may be viewed over the internet located at http://www.net2phone.com.

Therefore, prior to actually building the wireless invention the manufacturer, company, or individual involved in the deployment of this invention should contact Net2phone for assistance in quickly developing the network for unit compatibility and to avoid the pitfalls discussed in the prior art of this patent application. This is by far most the preferred, easiest, and most efficient method in building the high speed data network required to function with the World-Wide-Walkie-Talkie device.

This method of deploying the data network requires very little knowledge of Voice Over Internet Protocol applications because the Net2phone company would handle all of the technical requirements for building of the network for the invention.

FIG. 12 shows an simple conceptual view of the Net2phone OEM network configuration 57. This indicates that the present World-Wide-Walkie Talkie invention device should be deployed over a high speed efficient, redundant, resilient, and fully fault-tolerant Voice Over Internet Protocol network. This network structure is required in order to deliver the high quality services to the customers or end users over the internet using Voice Over Internet Protocol.

FIG. 12 shows the wireless instant messenger devices connecting to a Net2phone OEM configured network via wireless connection in order to make contact with each other and to intercommunicate with entities on the Internet. Telephones and fax machines on the Public Switched Telephone Network may also be reached as net2phone supplies all the equipment and telephony gateways required to produce the actual configuration.

As shown in the FIG. 12, these special services may be deployed over a high speed internet server and setup over an internet server and domain called WorldWideWalkie.com, wwnt.com or any other domain name appropriate for the application. There are a variety of reasons and advantages why this Net2phone OEM configuration is used and these reasons are discussed below.

Also it should be well noted by the reader that the Net2phone company is driving the development of next generation VoIP equipment and services enabled for advance voice services as discussed in this application.

The Net2Phone OEM Development is a special program initiated by the company to enable original equipment manufacturers (OEM) to develop telephony-enabled devices to work with the most advanced network VoIP service provider, Net2Phone.

Net2Phone targets equipment manufacturers who seek to capitalize on the exploding market for telephony-enabled devices. Experts anticipates that the market for telephony-enabled devices will grow to 14.12 million units shipped in 2005 with annual sales of $3.3 billion dollars. Therefore, many major manufacturers are using this service in order to support inventions developed by their companies.

The NET2PHONE OEM Program Description

The Net2Phone OEM Development will provide an accelerated solution to develop and deploy IP telephony products such as the World-Wide-WalkieTalkie wireless invention. This OEM development will also allow interactions between the two companies (manufacturer and net2phone) to develop the solutions setforth in this design. These includes the tools and support needed to integrate the Net2Phone Protocol and VoIP components into a variety of broadband and narrowband devices. The company has a proven track record for providing the type of network services needed to effectively deploy the World-Wide-Walkie network and tele-computing device. Once developed the World-Wide-Walkie-Talkie invention will provide instant access to Net2Phone's managed IP network, leading edge services and back office support. Net2Phone also conducts a rigorous series of certification tests to ensure end-to-end interoperability between Net2Phone's network and the final product such as the present World-Wide-Walkie-Talkie invention. Hence there are many benefits for partnering with Net2Phone's OEM program and some of these benefits are as follows

Some Benefits of Partnering with Net2Phone OEM

Hardware and Software Development Support

Worldwide Reach Through Net2Phone's Private Managed IP Network

Revenue Share Program

Product Certification

Back Office Support

Marketing and Training Support

Competitive Advantage

Low Development Risk

Speed to Market

Net2Phone's Own Private Managed Worldwide IP Network

World-Wide-Walkie-Talkie network requires a high bandwidth resilient data network which should be monitored 24 hours a day in order to provide excellent customer services to consumers that use the network.

Net2Phone's Private IP Network is monitored 24/7 for QoS world-wide. The network is currently OC-12, and is in the process of being upgraded to OC-48. This network transmits millions of minutes per day via POPs (Points of Presence) all around the world. Net2Phone offers some of the most competitive termination rates in the industry.

The services of Net2phone should be leveraged because leveraging Net2Phone's Network and enhanced services, and technology enables manufacturers and companies to provide a complete solution in a wide variety of products for the benefit of consumers worldwide. The reader is also reminded that World-Wide-Walkie-Talkie is generally defined to be a World-Wide Telecommunications Network, so worldwide compatibility is desired.

As stated the Net2phone company presently has and OEM Partnership Program support team to develop server based programs such as the java applet described in FIG. 41 which displays a virtual World Wide Walkie Talkie device. Again using this service will speed the development of the invention and the network.

The OEM Partnership Program supports team presently which consists of three groups that provide product development and certification, training, and marketing. The responsibilities of each group are listed below.

Embedded Solutions:
  Hardware reference design
  Software reference design
  SDK (Software Development Kit)
  Custom Designs
Broadband Software Integration:
  Certification on messaging between client software and Net2Phone platform
  Certification on terminating gateways
  Training on SDK
  Training on troubleshooting Net2Phone Protocol
  Maintenance and Product Enhancements
Marketing:
  Product/service positioning
  Packaging and documentation
  Promotion and pricing
  Other marketing needs to support sales

Net2Phone's Potential Partnership Products

Additionally the Net2Phone company is actually interested in seeking to partner with manufacturers that have established products and distribution channels. In addition, Net2Phone is amenable to collaborate on developing new and innovative Internet appliances such as the World-Wide-Walkie-Talkie invention which can benefit from voice, video, and data communications. The following products are excellent candidates for enhancement to support VoIP applications:

Telephones—handsets, cordless phones, speakerphones, etc.
  Wired and Wireless Routers
  Gaming Consoles
  Cable Boxes
  FAX Machines
  Set-top Boxes
  Desktop Computers
  Laptop Computers
  Internal/External Modems—dialup, cable, or ADSL
  Computer Motherboards
  Sound Cards
  Handheld Computing Devices
  The World-Wide-Walkie-Talkie invention.

Other Net2Phone Partners (Proven Leadership)

It is very important to remember needs the support of proven leadership in this industry because there are many pitfall in Voice Over Internet Protocol applications. So good leadership is important in the success and deployment of this invention.

Net2Phone's leadership in the VoIP market is proven by a long list of industry leading partners. Broadcom®, Motorola®, LINKSYS®, Polycom® and other major manufacturers have developed devices that support Net2Phone software.

These manufacturers choose Net2Phone because the proven technology is the most advanced and, equally important, the most widely used de facto standard protocol stacks in the VoIP industry. By embedding Net2Phone's Protocol, all of Net2phone's partners have leveraged the technology to take advantage of Net2Phone's globally managed IP network to provide superior service to the customer.

Although Net2phone is the preferred embodiment for the invention's network infrastructure and highly desirable, it is to be understood that the present invention may be embodied in other forms with other advanced network configuration that would work equally as well if properly configured.

The other embodiments of the invention along with an enhanced Cisco™ network or compatible network may also be used in the implementation. However, as the reader may note the Net2phone would effectively enable any manufacturer, company, or persons skilled in the art to develop the present invention with ease. This offers many other time saving, profit making alternatives to developing the product without Net2phone's professional expertise. However, inexperienced companies should use the preferred embodiment of Net2phone OEM services to build the network.

Other Embodiment—Destruction & Operation

The invention may be embodied in many different forms. However, once such form is shown in FIG. 27 which is a flip phone implementation of the same invention. Flip phones are presently in large use today with cell phones, and the World-Wide-Walkie-Talkie may also be designed with this embodiment. The functions in this embodiment would work exactly the same manner in which the invention has been described in this specification. Additionally, the invention may also be embodied with the push to talk button placed on the side of the device rather in front as embodied in the drawings.

Cisco AVVID Network Architecture As an Alternative Network Solution

Another embodiment of the invention relating to the network infrastructure is Cisco™ AVVID OEM Configuration as shown in FIG. 13 of the drawings.

Cisco AVVID (architecture for Voice, Video and Integrated Data) solutions enable customers to leverage the framework of Cisco AVVID to rapidly deploy new applications, services, and technologies to meet aggressive e-business goals, enhance their competitive edge, and ultimately reduce or eliminate delay affiliated with Voice Over Internet Protocol Systems.

This Cisco AVVID configuration may be used by a company who may already be experienced in Voice Over Internet Protocol communications.

The Cisco AVVID OEM™ solution would also allow a company or manufacturer to build a viable network infrastructure to be deployed with the World-Wide-Walkie-Talkie wireless computing invention.

It is to be understood that the drawing presented in FIG. 13 and the other figures are not meant to be all inclusive, but on the contrary, meant to provide a general conceptual view of the invention and its associated data network.

Many embodiments exists and the drawings and other examples should not be used to limit the invention, but as a guide to understanding how the invention works and various methods that can be pursued to easily and quickly deploy the invention with minimal effort.

Conclusions, Ramifications, and Scope

Accordingly, it can be seen that the present invention provides a world telecommunications system based upon Voice Over Internet Protocol applications. It provides a wireless access means to low cost international compatible communications from or to anywhere in the world using a variety of strategic communications and methods to communicate wirelessly using the internet and instant messaging. The overall scope of the invention indicates a computer based wireless system and network resulting in a world wide telecommunications system for the Public Switched Telephone Network and the Internet.

The invention deploys opens standards making new applications possible without limitations. The device and network allows intercommunications between data networks such as the Internet and the Public Switched Telephone System with high quality of voice communications is an impressive feature that will be welcomed by many companies and individuals.

The invention ability to be utilized as a normal cellular or satellite telephone is also an impressive features for people and companies who travel to remote areas and need low cost access to voice services on a worldwide basis. The power to compute a global position using satellites is also an impressive feature. Direct connection to low orbiting satellites for communications purposes is a form of communications that will be welcomed by the business world, Government, and the consumer industry.

The ability to eliminate delay, jitters, and other problems associated with Voice Over Internet Protocol is definitely a feature and solution that the world in general have been waiting for. This is an alternative to standard telecommunications without eliminating access to the Public Switched Telephone Network.

The power to instantly communicate in real time or offline communications to virtually any telephone, fax machine, email destination, or internet client in the world through a wireless handheld computing device, at the press of a button, provides an intelligent and efficient means of diverse world communications. Customers are no longer limited a home or office computer in which to use these services.

The use of Group Packet Radio Service (GPRS) along with Instant Messenger provides for the effective deployment of unified instant messaging.

Justifications of this invention becomes evident in the fact that there is a need in the industry to effectively interface the Public Switched Telephone Network (PSTN) with the protocol of the internet to create more robust communications and to integrated digital services as demonstrated in the present invention. The invention is also justified by the extremely high technology customer conveniences associated with the limitless handheld wireless computing and telephony applications, which also provides many growth and expansion opportunities and advantages such as cost reduction in domestic and international communications. Companies and individuals no longer have to worry about scandals or fraud in long distance charges.

Simplifications and standardizations, consolidations in operations and advanced applications including but not limited the unlimited computer software applications that can be executed with the high speed micro processor and other components which are inherent to the design of the invention.

The preferred Net2phone network OEM method and system provides many advantages including but not limited to high bandwidth multimedia applications, robust and clear voice conversations, and many other advantages ad discussed herein. These advantages makes for a more effective communications platform and notable advantages that the Public Switch Telephone Network in and of itself could never hope to achieve. Also developing the World-Wide-Walkie-Talkie product with Net2Phone OEM program will guarantee a high quality of VoIP development and support with the industry leader in Voice Over Internet Protocol and Internet telephony. This saves the manufacturer or service provider much time, and financial resources when constructing the data network.

The general cost reduction realized would obviously result in a real savings in long distance telephone and facsimile cost which is extremely important to most companies and individuals, and particularly those with international markets.

The increased broadband of the device and method allows for enhanced and improved communications, which prompt companies, customers, and end users to deploy the device and network in both personal and business activities. As previously stated, common sense and good business wisdom dictates that customers will not pay for services such as long distance if they are not needed or if they can be accomplished at a lower cost and by more efficient means.

The simplifications of integrated voice/data networks and the use of computer telephony, the internet, and other public and private data networks allows more standardization and reduces total equipment needs.

The ability to consolidate provides for the ability to eliminate points of failure on the network, and to consolidate accounting systems and combine operations is obviously more efficient.

The long term benefits of Advanced Applications of World Wide Walkie Talkie running a high speed microprocessor such as Intel Mobile Pentium 4™ processor, or compatible processor, coupled with the Java™ based applications includes the advanced support for multimedia and multi-service applications, and notable advantages that today's telephone system simply cannot compete with.

The PUSH-TO-TALK instant messenger and instant access to the both the Public Telephone Network, general Internet users, including but not limited to very large services and internet works such as Yahoo™ and America Online™ provides online wireless connectivity to the world of computers, email, telephone, and fax provides an incredible and awesome advantages presently not offered by any wireless telecommunications device on the market today. "Push button" access to programs as described above makes these tasks easier and more accessible.

The use of the Jabber based IM development environment provides opens standards in Instant Messaging systems and will encourage the development of new products, services, and interfaces for the device.

The ability to chose the type of telephone calls, voice chat, send faxes, video message, and video conferencing over an IP based data network with a suitable quality of service (QoS) will have a superior cost benefit to end users.

The advantage of using an end user's choice of carriers or modes of use will be of definite advantage to customers and end users. Additionally no communications options normally offered by Cellular/Satellite phones by using the World Wide Walkie Talkie wireless device are lost.

The advantage of having multiple frequencies and bands available on one device, including satellite access will allow users to move anywhere in the world to communicate to and from any point in the world, at low cost, and without distance limitations.

The advantage and ability to run on-the-go Java™ based Applications, provides for boundless advantages for consumers and companies for executing java™ based software and computer applications. These programs and applications could encompass every phase and facet of the end users life.

The customer and end users are endowed with a powerful PUSH-TO-TALK satellite based, and Global Positioning Satellite (GPS) hand held multimedia based computer and telecommunications system.

The wireless Personal Digital Assistant (PDA) with the popular operating systems are also prime advantages and would be a welcome enhancement since many of these systems are already used worldwide independently on PDA devices.

Internet paging services, and Java™ enabled computing allows for an extremely wide range of telecommunications, network communications, and other wireless applications. e.g. online banking, online bill pay, games, shopping, MP3 music, and a myriad of other applications that companies, customers, and end users have access to on a wireless mobile platform.

Additionally the ability, to execute instructions and run applications from the Palm™ and Windows CE™ operating system on the World Wide Walkie Talkie device offers unparalleled functionality to end users and ease of transfer of data from old devices to present the invention for Personal Digital Assistant (PDA) applications or other computer applications.

Having the power of an Intel based Pentium 4™ processor in a hand held computing wireless device is an advantage that provides users with equivalent power, which is used on a desktop, office or home computer.

Finally bluetooth wireless compatibility of the device coupled with the artificial intelligence and voice commands built-in to the system makes the invention and applications such as voice dialing, sending email and general operations much easier, and more efficient. People generally prefer wireless application to applications that use messy cable configurations.

While the above description contains much specificity, these should not be construed as limitations on the scope of the invention, but as exemplifications of the presently preferred embodiments thereof. Many other ramifications and variations are possible within the teachings of the invention. For example, invention may be used over a company's private data network without or without an internet based served and still provide for all of the features and advantages discussed herein. Because the devices are Internet protocol (IP) based Devices they can used to connect to each other over a local or wide area network in any combination previous demonstrated.

Also embodying the invention as a flip phone is also desirable because many customers are satisfied with this embodiment and is already known to use this style of telephone for handheld wireless applications.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Thus the scope and spirit of the invention should be determined by the appended claims and their legal equivalents, and not by the examples given herein.

What I claim as my invention is:

1. A satellite based/tri-frequency cellular wireless apparatus and network for establishing real time instant messaging, Voice Over IP communications, and global unified telecommunications between wireless networks, the public switched telephone network a data network, and the internet, comprising:

(a) a built-in Instant Messenger software program capable of automatically connecting to the internet and providing a means for real time two way voice chat, text chat, and video conferencing between two or more wireless devices, and, (b) a external Instant Messenger software program capable of being downloaded from a network or internetwork computer allowing internet users to connect to a common network or internetwork providing a means for real time two way voice, chat, text chat, and video conferencing between two or more devices, and, (c) a net2phone™ or equivalent internet based Voice over Internet Protocol (VoIP) gateway server and network system of servers capable of providing high Quality Of Service (Qos) voice calls, voice chat, internet protocol facsimile calls, and managing user and communication sessions between the public switched telephone network, any data network, any wireless network, or the internet, and, (d) a internet domain name identified as worldwidewalkietalkie.com, wwwt.com, or any other internet domain name which establishes a domain name and internet protocol ip address, providing a means for network users or internet users or telephone users to connect to voice chat services provided thru the gateway server and network system of servers, and, (e) a internet email server that provides a means for receiving and delivering e-mail, voice-mail or video mail between the apparatus and users of the internet or the public switched telephone network, and, (f) a global system for mobile communications system which uses general packet radio service, gprs protocol, and instant messaging software providing a means to wirelessly connect to a data network, a wireless network, the internet, or the public switched telephone network for voice and data communications, and, (g) a global positioning satellite communications sub system providing a means to determine the location of the apparatus on earth, and, (h) a bluetooth™ wireless technology sub system that provides a means for establishing a wireless link or wireless communications and enabling wireless links between the apparatus, office computers, mobile computers, printers, scanners, mobile phones, portable handheld devices, other bluetooth compatible devices and connectivity to the Internet, enabling freedom from wired connections, and, (i) a microchip integrated circuit board consisting of a microprocessor, an instant messenger stay resident program, software programs programmatically linked to external function keys, mass memory, offline mass storage, an operating system, a java™ virtual machine, java users program library, artificial intelligence voice to text, text-to-voice interpreter, and Palm VII OS™ or Windows CE OS™, or Windows Pocket PC 2002 operating systems for hand held computers providing a means for storing and using the software programs of the apparatus, and, (j) a Intel™ Pentium™ 4 Mobile processor-M system capable of supporting high speed handheld wireless mobile communications providing a means for high speed data transfers and superior multimedia communications, and (k) a solar recharging sub system with embedded solar panel that provides a means for automatically recharging the batteries with the use of a light source or power from the sun, and, (l) a WWW-OS operating system that provides a means to launch, control, and monitor the operations of the said apparatus, built-in programs, user programs, and communication processes, and, (m) a Microsoft Pocket PC 2002™ built-in operating system which can be loaded on demand or after the start of a new power on self test session which provides a means of diverse mobile computing functionality of the apparatus, and, (n) a removable satellite antenna capable of communicating with both cellular and satellite communications networks, and, (o) a built-in Instant Messenger software program capable of automatically connecting to the internet and providing a means for two way voice chat, text chat, and video communication between two or more devices, and, (p) a push-to-talk-worldwide external function button capable of executing a built-in software program stored on the microchip integrated circuit board providing a means for initiating and establishing instant communications sessions between two or more telephones, computers, or devices connected via any data network, wireless network, the internet, or the public switched telephone network, and, (q) a send voice mail external function button capable of executing a built-in software program stored on the microchip integrated circuit board providing a means for instantly transmitting prerecorded digital voice messages to any telephone, computer, or device connected via any data network, wireless network, the internet, or the public switched telephone network, and, (r) a send video mail external function button capable of instantly executing a built-in software program stored on the microchip integrated circuit board and means for transmitting real time or prerecorded digital video messages to any telephone or computer connected via any data network, wireless network, the internet or the public switched telephone network, and, (s) a record memo external function button capable of instantly executing a built-in software program stored on the microchip integrated circuit board providing a means for efficiently composing storing, and indexing digital voice recording or video recording memo allowing for the efficient storage, access, and retrieval of digital data, and, (t) a send/rec. fax external function button capable of instantly executing a built-in software program stored on the microchip integrated circuit board providing a means for expeditiously composing and transmitting internet protocol based facsimile messages from the said apparatus to any fax machine, computer, or compatible device connected via any data network, a wireless network, the internet or the public switched telephone network, and, (u) a send email external function button capable of executing a built-in software program stored on the microchip integrated circuit board providing a means for instantly composing voice-to-text or keyboard generated messages for transmitting email messages to any email address, telephone, computer, or internet device via any data network, wireless network, the public switched telephone network, or the internet, and, (v) a PDA external function button capable of executing a built-in software program stored on the microchip integrated circuit board providing a means for launching and communicating with the built-in personal digital assistant handheld software applications that provides computing and information storage and retrieval capabilities for personal or business use or for keeping schedule calendars and address book information handy, and, (w) a stylus pen which provides a convenient object or means of making selections and operations of the personal digital assistant, and, (x) a stylus pen compartment which provides a means of storage for the stylus pen, and, (y) a TALK-INTERNET external function button capable of executing a built-in software program stored on the microchip integrated circuit board providing a means for instantly initiating computer to computer voice calls or voice over internet protocol telephone calls to any telephone, computer, or internet device via any data network, a wireless network, the public switched telephone network, or the internet, and, (z) a END external function button capable of terminating voice or voice over internet protocol telephone calls, and, (aa) a ENTER external function button providing a means for obtaining terminal or keyboard input from a human user to be sent to the apparatus for subsequent processing, and, (bb) a MENU external function button capable of display internal software menus providing a means for the selection of generic software programs, and computer applications, and, (cc) a external dialing pad providing a means for dialing or entering a telephone number and the entry of numeric and alphanumeric data, and, (dd) a external revolving built-in web camera capable of a minimum resolution of 320×240 pixels providing a means for real time videoconference or for producing digital still images, and, (ee) a external snap button which provides a means for taking digital pictures or recording digital real time movies, and, (ff) a reflective touch sensitive display screen with a minimum of 4096 color Resolution and 240×320 graphic display system providing a means for displaying real time video communications, internet content, and general data and device information, and, (gg) a navigational key set having four distinct arrow keys which point in the up, down, left and right directions providing an alternate means for a user or operator of the apparatus to make menu or screen selections of items displayed on the touch sensitive display screen, and, (hh) a revolving mouse ball which provides a means for a user or operator of the apparatus to select items displayed on a screen from software applications, and, (ii) a mini listening speaker providing a means for hearing telephone or chat conversations, and, (jj) a multimedia loud speaker and microphone which provides a means of hearing hands free telephone conversation, and a general multimedia speaker and microphone for multimedia application, and, (kk) a flip cover case which provides a means of protective covering for the apparatus and for hearing telephone or chat conversation with the built-in mini listening speaker, and, (ll) a universal serial bus port having both USB 1.1 and USB 2.0 compatibility which provides a means and a solution for any personal computer user to exchange data with the apparatus and other USB compatible devices, and, (mm) a infrared port capable of using bluetooth™ or compatible wireless communications which provides a means for wireless upload and download of data between the apparatus and a personal computer and which provides a wireless link to compatible devices for wireless connectivity purposes or to wireless exchange data, and, (nn) a WAP or wireless access protocol system which provides a means to allow users to access information from a data network, a wireless network, or the internet, and, (oo) a short message service which provides a means for the said apparatus to send text messages to other cell phones, and, (pp) a simple mail transfer protocol that provides a standard means for sending email messages via the internet, and, (qq) a builtin I-mode™ system of communications which interacts with the instant messenger system providing an alternatives means for mobile internet access system or service to users in Japan, and all countries of the world, and, (rr) a built-in personal communications system for providing global system for mobile communications, Time Division Multiple Access technology, and code division multiple access services which utilize 800/1800/1900 frequencies to provide worldwide compatibility and alternative means of accessing cellular networks around the world, and, (ss) a belt clip attachment which is affixed on the rear of the apparatus that provides a means of attaching the apparatus to a waist belt and, (tt) a battery compartment which provides a means of housing rechargeable batteries used to power the apparatus, and, (uu) a voice-to-text processor which translates voice input to text output and providing a means for composing email messages, and chat messages without the need for a keyboard and, (vv) a world U.S. maps data base that operates independently or with global positioning satellites that provides a means for navigation and displaying a graphical location on earth on the apparatus and for provide driving directions, and, (ww) a satellite communications chip which provides a means for managing the logistics and functions required in satellite telephone and internet communications, and, (xx) a desktop communications program which executes on a personal computer providing a means for intercommunications, synchronization, and data exchange between a personal computer and the apparatus, and, (yy) a java™ programs library that provides a means for storage of java based computer programs, and, (zz) a java™ virtual machine that provides a means for the execution of java enabled or java compiled programs to be run in real-time, and, (aaa) a built-in microbrowser the provides a means to browse web pages and content on the internet or the world wide web, and (bbb) a power source connection port which allows for the connections of external power sources or data sources to be connected as a means for providing power or data transfers, and, (ccc) a portable keyboard which folds and unfolds into a full size computer keyboard providing a means for convenient data entry, and, (ddd) a physical housing which provides a convenient means of housing the integrated microchip circuit board and the parts of the apparatus, and, (eee) a bluetooth™ stereo wireless headset which connects directly to the apparatus via a wireless connection which provides means of monitoring voice communications and for executing voice commands to the apparatus, and, (fff) a voice command library capable of executing voice commands to control operations, and, (ggg) a registered user data base for storing registered users of the voice over internet protocol network, and, (hhh) a security access control matrix program for controlling authorized access to the data or network server, and, (iii) a voice over internet protocol fax gateway system for forwarding fax messages to any fax machine or computer, and, (jjj) a ac/dc 120 v/220 v power charger (32A) for an alternative charging power source, and, (kkk) a 12 Volt DC power adapter (33) for an alternative charging power source, and, (lll) a hotsync button (32B) used to sychronize data of the apparatus with a Personal computer, and, (mmm) a java™ based virtual push-to-talk-worldwide program which executes on the voice over internet protocol server capable or executing computer instructions over the internet or any data network that allows internet uses to intercommunicate with the apparatus, telephones, and any computer attached to the network.

2. The invention of claim 1 further including a high speed resilient, robost computer distributed networked based system, virtual wireless device, hardware, software, and voice over internet protocol based network capable of eliminating delay, echo, accumulation delay, jitters, and lost packets that affect voice quality capable for superior quality of service (Qos) for voice quality over a wireless network, using Voice Over Internet Protocol communications further comprising:

(a) a internet based web server and ip managed network for providing voice and text based instant messenger communications services, enhanced Quality of Services, and, (b) a server based virtual communications interface software program embodied with a computer based representation of a standard telephone dial pad, a virtual screen, a virtual push-to-talk-worldwide button for initiating instant messaging, and voice over internet protocol sessions, and, (c) a server based universal instant messenger software program for allowing end-users and internet computer users and other cellular telephone users to instantly communicate via voice, text chat, and video conferencing in real time using voice, text and video messaging, and, (d) a computer based virtual PUSH-TO-TALK-WORLDWIDE function protocol button programmed in Java, flash, or any suitable programming language which when depressed has the capability of initiating real time bisynchronous voice over internet protocol calls between internet computers, any wireless network, and the public switched telephone network providing for material cost reduction involved in long distance telephone, facsimile, and data communications, and, (e) a computer based virtual SEND VOICE MAIL button which when selected or clicked with a computer mouse is capable of providing digital recordings that can be stored, or forwarded to any other apparatus, telephone, or computer attached to the internet, and, (f) a computer based virtual SEND FAX MESSAGE button which when selected or clicked with a computer mouse will allow the attachment of data files that can be sent to any apparatus, fax machine or computer attached to the internet, and, (g) a computer based virtual SEND EMAIL button which when selected or clicked with a computer mouse will launch or execute email client software instructions to allow the transmission of email messages from the server to any email address, telephone, or computer attached to the internet, and, (h) a computer based virtual SEND VIDEO MAIL button which when selected or clicked with a computer mouse will allow the transmission of pre-recorded video messages from the server to any email address, telephone, or computer attached to the internet, and, (i) a computer based virtual MESSAGE MEMO button which when selected or clicked with a navigational computer mouse will function with a computer microphone and will allows the composition of digital memos that can be subsequently stored, played, or forwarded to any telephone, or computer attached to the internet, and, (j) a computer based virtual TALK-INTERNET button which functions with the instant messenger system and which when selected or clicked with a nagivational computer mouse will allows for Voice Over Internet Protocol or VoIP calls to be placed to any telephone or computer attached to the internet, and, (k) a computer based virtual MENU button which is used to stored computer programs and data on the server and wireless apparatus, and, (l) a computer based virtual ON/OFF button for enabling and disabling PUSH-TO-TALK-WORLDWIDE operations, voice over ip operations, and other virtual function buttons, system programs and applications of the virtual apparatus, and, (m) a computer based interface software program that allows login, entry of user name and password for user identification, and authentication providing a means for controlling access to software programs and communications services stored on the server or data network.

3. The instant Messenger software program of claim 1 that is capable of being executed on a Java™ based software platform or any hardware platform capable of running java™ programs further comprising:

(a) a software program which provides a means to automatically interface or connect to the America Online™ instant messenger or American Online™ computer network, and, (b) a software program which provides a means to automatically interface or connect to the Yahoo™ instant messenger or Yahoo™ computer network, and, (c) a software module for inviting non-users to download and install the instant messenger software providing a means for other users to intercommunicate using other network devices, computers, cellular telephones, and, (d) A Jabber XML-based data model and protocol for instant messaging service providing a protocol and means for easy software development and breaking out of proprietary instant messaging services, and, (e) a software program which automatically connects to a internet based voice over internet protocol server or gateway providing a means of indicating the online status of the apparatus, and, (f) a software program which indicates the online status for broadcasting the said status to other computers or devices on the same network or internetwork using the said instant messenger software, and, (g) a software program which allows end-users of the apparatus to change the status to offline or any other state, or to disable the instant messenger features, and, (h) a software program which functions in conjunction with the instant messenger allowing end-users of the apparatus to enable or disable operations of the built-in web camera, and, (i) a software program for storing and accessing the details of an instant messaging contact record, and, (j) a software program that allows the additions, deletions, and modifications of instant messaging user names in any category providing a means for maintenance of the instant messenger buddy list, and, (k) a software program having the capability of transmitting short text messages and interfacing with the voice-to-text processor providing a means to send short text messages using a human voice, and, (l) a software program that function in conjunction with the wireless apparatus and network having the capability of executing voice over ip services to any computer, telephone, or device connected to a wireless network, the public telephone network, or the internet, and, (m) a software program that functions in conjunctions with the wireless apparatus and push-to-talk-worldwide button that is capable of connecting voice over internet protocol sessions between two or more computers, telephone, or internet devices which use the same instant messenger and internetwork.

4. The Menu function key of claim 1 that is linked to internal software modules capable of displaying a list of commands, internal programs, and executable software programs, comprising:

(a) a hot-sync data transfer software program providing a means for synchronizing data between a personal computer and the apparatus of claim 1, and, (b) a loader program capable of loading into memory the Palm OS™ operating system, Windows CE™ operating System, or the Windows Pocket PC 2000 operating system, and, (c) a loader program capable of loading into memory any terminal emulation or remote control program providing a means for access to remote computer systems, and, (d) a software based MP3 player for playing mp3 sound files, and, (e) a send page function capable of transmitting paging messages to any pager or device connected via the internet or the public switched telephone network, and, (f) A re-boot or restart program capable for allowing a hardware reset of the apparatus, and, (g) A software program used to launch the internal microbrowser providing a means for browsing the world wide web, and, (h) A registration program that provides a means of registering the apparatus to the data or wireless network, and, (i) A software program used in conjunction with the internal global position satellite system and the world U.S. maps data base which is capable of computing and displaying the current physical position on earth of the apparatus, and, (j) A loader system program that can be used to launch or load any other computer program residing in the apparatus, and, (k) A WWW-T terminal emulation software program for connecting to remote computers, and, (l) a software program for loading any Java based application programs, and, (m) a software program or webpage link for downloading the instant messenger from a network or webserver, and, (n) a software program for querying a user's global position location via the voice over Internet protocol gateway server, and, (o) a software program which functions in conjunction with the WWW-OS operating system that allows for the storing, modification, and accessing, of electronic addresses and contact information, and, (p) a digital voice recorder software program which functions in conjunction with the WWW-OS operating system for creating and storing digital voice recordings, and, (q) a software program which functions in conjunction with the WWW-OS operating system that allows any java software program to be uploaded to the java program library.

5. The satellite based wireless apparatus and network of claim 1 having the dual ability to function as a standard satellite telephone and VoIP computer capable of automatically executing the internal instant messenger software to connect to the internet gateway server and network over a wireless connection, providing a means for, standard satellite telephone communications, and satellite voice over Internet protocol (VoIP) services to any telephone, computer, or device on the public switch telephone network, a wireless network, or the internet, comprising:

(a) a software program which automatically transmits logon information and parameters providing a means to authenticate users to the internet gateway server and network, and, (b) a software program which transmits serial number information and subscriber identity parameters to the satellite network and internet gateway server providing a means for authentication and to register the apparatus, and, (c) a built-in instant messenger software program capable of automatically connecting to the internet over a satellite frequency providing a means for internet connectivity, real time two way voice chat, text chat, and videoconferencing between two or more devices connected to the internet, satellite frequency, or public switched telephone network, and, (d) a standard satellite telephone communication system capable of connecting to global system for mobile communications networks, low orbiting satellites frequencies, or other satellites frequencies, providing a means for standard satellite telephone communications, and, (e) a standard satellite telephone communications system capable of using the group packet radio service communications protocol over a satellite frequency providing a means to simultaneously connect to the internet, gateway server enabling voice over ip communications and internet connectivity.

6. The cellular based wireless apparatus and network of claim 1 having the ability to function as a standard tri-frequency GSM cellular world telephone operating in GSM 900/1800/1900 Mhz capable of automatically executing the internal instant messenger program to connect to an internet based gateway server and network providing a means for low cost voice over Internet protocol (VoIP) services to any telephone, computer, or device on the public switch telephone network or the internet, comprising:

(a) a program which automatically transmits logon information and parameters providing a means to authenticate users to the network and, (b) a software program which transmits serial number information and parameters providing a means for device authentication and to register the apparatus to the network, and, (c) a built-in instant messenger software program capable of automatically connecting to the internet over a cellular wireless frequency providing a simultaneous connection to the internet for real time two way voice chat, text chat, and videoconferencing between two or more devices connected to a wireless network, the public switch telephone network or the internet, and, (d) a standard cellular telephone communication system capable of connecting to a wireless network providing a means for standard cellular telephone communications, and, (e) a standard cellular telephone communications system capable of using a wireless access protocol, or group packet radio service communications protocol over a cellular frequency providing a means to simultaneously connect to a wireless telephone network and the internet gateway server enabling voice over ip communications and internet connectivity, and, (f) a personal digital assistant or virtual personal digital assistant software program capable of executing on the wireless apparatus or the VoIP network providing a means for storing, accessing, and reviewing data on the wireless apparatus, a wireless network, or the voice over internet protocol network, and, (g) a software program for synchronization of data between the apparatus, a desktop computer, or the internet VoIP server.

7. The wireless apparatus of claim 1 capable of connecting and communicating directly with low orbiting satellites and receiving and storing navigational information from global positioning satellites, for direct communications to internet based connected devices including the internet gateway server, computers, telephones, or any other apparatus connected on the same data network, wireless network, or internetwork.

8. The wireless apparatus of claim 1 which is further capable of identifying itself on any data or wireless network, or the internet, as a server or standalone internet protocol based computer providing a means for continuous communications in the event the main internet gateway server becomes unavailable due to hardware failures and software failures.

9. The wireless apparatus described in claim 1 above which has the capability of assigning itself an internet protocol (ip) address or which may be assigned an internet protocol address by an internet based server and which is further capable of being addressed by any other user, computer, or ip based device on a data network, wireless network, or the internet, whereby the apparatus is able to function as an internet voice over ip server able to stand alone without the use of a gateway server, enabling the apparatus to function as a valid voice over ip device on a data network, a wireless network, or the internet.

10. The wireless apparatus and network of claim 1 capable of accessing third party internet protocol (IP) telephony gateways or internet fax gateways, whereby the apparatus is able to connect to third party networks, comprising:

(a) software modules capable of interfacing with third party equipment and a means for executing any third party voice over internet protocol software used in telephony applications, and, (b) software modules capable of interfacing with third party equipment and a means for executing any third party software to connect to any data or wireless network, and, (c) software modules capable of executing or interfacing with the America Online™ instant messenger system, and, (d) software modules capable executing or interfacing with the Yahoo™ instant messenger system, and, (e) software modules capables of interfacing with third party equipment and a means for using voice over internet protocol and ip based fax software for transmitting voice, fascimiles, and email messages to any telephone, computer, or fax machine in the world.

11. The network of claim 1 configured as Cisco™ AVVID Network Architecture™ or equivalent internet based Voice over Internet Protocol (VoIP) server and network system of servers capable of providing high Quality Of Service (Qos) voice calls, video chat, internet protocol facsimile calls, and managing user and communication sessions between the public switched telephone network, any data network, a wireless network, or the internet.

12. Multifunctional World Wide Walkie Talkie, a high speed interstellar wireless IP based computer/instant messenger, GSM global communicator, Personal Digital Assistant, coupled with a robust, resilient VoIP data network server, and wireless network deploying multiple wireless protocols and personal communication services, including GPRS, WAP, Bluetooth, CDMA, PCS, Voice Over IP Communications, and I-mode service, whereby quality of service (QoS) VoIP and Instant Messenger services are used over a GPRS, or WAP wireless connection allowing Internet users, land line telephones, and cellular/satellite telephone users to videoconference, chat, talk, and intercommunicate worldwide via the internet, comprising:

(a) a high speed Intel Pentium 4 Mobile-M or equivalent microprocessor which deploy data prefetch logic, and rapid execution engine that guarantee continuous power to the computer for processing the most data-intensive and graphic rich applications, and, (b) a cellular telephone shaped physical water proof housing comprised of solar conducive material for charging batteries, and a face plate, which functions as a protective cover and to contain special function buttons used by the wireless computer/instant messenger, providing a protective housing for function buttons, circuit boards, and the Intel Pentium 4 Mobile-M or equivalent microprocessor, and, (c) a VoIP gateway server that functions in conjunction with the wireless computer instant messaging computer for establishing quality of voice over internet protocol services, low cost, real time global communications, and videoconferencing over any wireless network to the public switched telephone network via a data network, VoIP gateway server, and the internet, and, (d) a internal stay resident Instant Messenger software system that executes within the random access mass memory of the computer/instant messenger, through and with the VoIP gateway server for establishing a high speed wireless internet connection to a VoIP gateway server allowing real time wireless VoIP voice messaging, video conferencing, terminal online and presence functions, and text chatting, over a wireless network, via the internet, and, (e). a global system for mobile communications (gsm) wireless telephone network that uses group packet radio service protocol allowing for a dual connection to a wireless gsm network and the VoIP internet gateway server, and, (f) a built-in satellite communications subsystem which functions in conjunction with satellite networks, the VoIP gateway server, global system for mobile communications (gsm) and providing simultaneous dual communication links to low earth orbiting satellites, the internet, and the public switched telephone network, providing a means for wireless internet/satellite communication to the public switched telephone network available anywhere on earth, and, (g) a random access mass memory for processing and executing computer programs and software instructions, and, (h) a offline mass storage for storing digital data, voice data, and data in various known formats, and, (i) a java™ enabled pcs/gsm digital cell phone logic controller microchip for processing java based computer programs within the wireless computer/instant messenger, and, (j) a java™ based user program library for storing java based computer programs within the wireless computer/instant messenger, and, (k) a java™ virtual machine which operates within the wireless computer/instant messenger for viewing java™ based web pages, and applications designed with the java programming language, and, (l) a send/receive fax function button located on the face plate of the wireless computer/instant messenger, and, (m) a send/receive fax software program that functions in conjunction with the send/receive fax function button and operating system that allow for the transmission and reception of data files, attachments, and facsimile messages through the internet gateway server to any fax machine, or computer attached to the internet, and, (n) a voice command library that functions in conjunction with the operating system used to store and process voice commands for executing specific functions within the wireless computer/instant messenger, and, (o) a mini web camera positioned on the face plate of the wireless computer/instant messenger for videoconferencing, recording real time video movies, and recording still digital pictures or digital images, and, (p) a built-in highly sensitive multi-media loudspeaker/microphone (22) for hearing audio output and recording digital voice recordings, and, (q) a built-in mini speaker for hearing telephone conversations and playing audio files stored within the wireless computer/instant messenger, and, (r) a send/receive video mail function button located on the face plate of the wireless computer/instant messenger, and, (s) a send/receive video mail software program that functions in conjunction with the send/receive video mail function button, web camera, and operating system that allows for the transmission and reception of real time video messages, or digital pictures, to any telephone, internet computer, or internet based communications device able to receive digitally produced data, and, (t) a send/receive voice mail function button located on the face plate of the wireless computer/instant messenger, and, (u) a send/receive voice mail software program that functions in conjunction with the send/receive voice mail function button, highly sensitive microphone, and operating system that allows for the recording of digitally produced voice recordings, and, (v) a simple mail transfer protocol system that functions in conjunction with the operating system, and the VoIP gateway server, for transmission and reception of email messages via the internet, and, (w) a send/receive email function button located on the face plate of the computer/instant messenger, and, (x) a send/receive email software program that functions in conjunction with the simple mail transfer protocol system, the operating system, and the VoIP server for transmission and reception of email messages over the internet, and, (y) a record message memo function button located on the face plate of the wireless computer/instant messenger, and, (z) a on/off function button for applying power and tuning off the wireless computer/instant messenger, and, (aa) a builtin I-mode™ system of communications which functions with the operating system, and instant messenger that provides alternatives for mobile internet access system, and, (bb) a menu function button for displaying a menu of computer software applications within the wireless computer/instant messenger, and, (cc) a revolving mouse ball positioned on the face of the wireless computer/instant messenger for making menu selections or executing programs within the wireless computer/instant messenger, and, (dd) a record message memo software program that functions in conjunction with the operating system within the computer/instant messenger for recording digital voice recordings for storage within the wireless computer/instant messenger, and, (ee) a push-to-talk-worldwide function button located on face plate of the wireless computer/instant messenger, and, (ff) a push-to-talk-worldwide software program that functions in conjunction with the push-to-talk-worldwide function button, the instant messenger, the operating system, web camera, a wireless network, and the VoIP server, for initiating video conferencing and wireless voice over internet protocol communications between two or more internet users allowing global communications, and, (gg) a talk-internet function button located on the face plate of computer instant messenger, and, (hh) a talk-internet software program that functions in conjunction with the talk-internet function button, the operating system, web camera, and the VoIP server for initiating wireless voice over internet protocol telephone calls to any telephone or between interconnected internet computers, and, (ii) a PDA function button located on the face plate of the computer instant messenger, and, (jj) a PDA software program that functions in conjunction with the PDA function button, and operating system capable of launching or executing any personal digital assistant software, and, (kk) a built-in artificial intelligence voice to text interpreter which functions in conjunction with the operating system for converting human voice to text, and, (ll) a built-in global position system or GPS receiver for receiving information from gps satellites for computing a physical location on earth of the wireless computer/instant messenger, and, (mm) a high definition television screen which uses MPEG-2 and other compressed digital formats for viewing visual data on the computer/instant messenger, and, (nn) a internal world and united states maps data base that functions in conjunction with the operating system, satellite communications subsystem, and the built-in global position system or gps receiver for graphically or visually displaying a physical location, and, (oo) a security access control matrix program (56) for controlling access to the VoIP gateway server, and, (pp) a registered user data base (58) for registering and storing registered users of the VoIP gateway server, and, (qq) a java applet instant messenger program (66) which functions in conjunction with the VoIP gateway server, an internet service provider, and the internet, for allowing instant messaging between internet users, internet protocol based devices, the computer/instant messenger, a wireless network, the public switched telephone network, and internet, and, (rr) a infrared port capable of using bluetooth wireless communication for allowing bluetooth wireless communications and data exchanges to other enabled bluetooth devices including computers, personal digital assistants, printers, and scanners, and, (ss) a bluetooth intelligent wireless voice command stereo headset for hearing audio signals, and transmitting wireless voice commands to the wireless computer/instant messenger providing a means for remote operations, remote control, and hands free telephone and chat conversations and, (tt) a navigational keyset (12) pointing in all four directions located on the face of the computer/instant messenger for navigating web pages and selecting information displayed within the video screen of the computer/instant messenger, and, (uu) a onscreen keyboard (27A) for data entry of information to the wireless computer/instant messenger, and, (vv) a internal mini web browser that functions in conjunction with the operating system for surfing the web, and, (ww) a standard telephone dialing pad having standard telephone dialing keys for entering alphanumeric data and initiating standard wireless telephone calls, and, (xx) a universal serial bus port located on the side of the computer/instant messenger for USB connectivity with any compatible usb device, and, (yy) a ac/dc 120 v/220 v power charger (32A) providing for electrical charging of the computer/instant messenger, and, (zz) a 12 volt dc power adapter (33) for charging or applying power to the computer/instant messenger, and, (aaa) a power source connection data port (23) allowing for an external power source and data to be used with external (bbb) a built-in self recharging solar sub-system that provide continuous recharging to the wireless computer/instant messenger with direct sun light or from any artificial light source, and, (ccc) a removable cellular/satellite antenna (1A) for communicating with cellular networks and low orbiting satellites in low earth orbit, and, (ddd) a foldable keyboard (90) that can be mounted on the data port (23) providing a full size keyboard for data entry into the wireless computer/instant messenger, and, (eee) a virtual world wide walkie talkie server interface program (999) that provides VoIP network interfaces between the internet, a any wireless network, and the public switched telephone network having quality of voice (QoS) voice over internet protocol services, telephony application programmable interface (TAPI) standards, and java telephony application programmable interfaces, (JTAPI).

* * * * *